United States Patent
DelSantro et al.

(10) Patent No.: US 11,311,015 B2
(45) Date of Patent: Apr. 26, 2022

(54) HERBICIDAL COMBINATION

(71) Applicant: UPL LIMITED, West Bengal (IN)

(72) Inventors: Mark Vincent DelSantro, Glenmore, PA (US); Beth Erickson Sears, Lincoln University, PA (US); Jaidev Rajnikant Shroff, Dubai (AE); Vikram Rajnikant Shroff, Dubai (AE)

(73) Assignee: UPL LIMITED, West Bengal (IN)

( * ) Notice: Subject to any disclaimer, the term of this patent is extended or adjusted under 35 U.S.C. 154(b) by 91 days.

(21) Appl. No.: 16/681,072

(22) Filed: Nov. 12, 2019

(65) Prior Publication Data
US 2020/0146291 A1 May 14, 2020

Related U.S. Application Data

(60) Provisional application No. 62/760,149, filed on Nov. 13, 2018.

(51) Int. Cl.
*A01N 43/88* (2006.01)
*A01N 43/56* (2006.01)
*A01N 43/653* (2006.01)

(52) U.S. Cl.
CPC ............ *A01N 43/88* (2013.01); *A01N 43/56* (2013.01); *A01N 43/653* (2013.01)

(58) Field of Classification Search
CPC ....... A01N 43/88; A01N 43/56; A01N 43/653
See application file for complete search history.

(56) References Cited

U.S. PATENT DOCUMENTS

| | | | |
|---|---|---|---|
| 8,785,351 B2 | 7/2014 | Mann et al. | |
| 2002/0004457 A1* | 1/2002 | Nevill | A01N 61/00 504/138 |
| 2004/0033897 A1* | 2/2004 | Haas | A01N 43/40 504/255 |
| 2018/0064111 A1* | 3/2018 | Massa | A01N 33/22 |
| 2020/0045964 A1* | 2/2020 | Fabri | A01N 43/54 |
| 2020/0396998 A1* | 12/2020 | Kumar | A01N 43/54 |

FOREIGN PATENT DOCUMENTS

| | | | |
|---|---|---|---|
| CN | 105994331 | * | 6/2016 |
| CN | 105994331 A | | 10/2016 |
| CN | 108651490 A | | 10/2018 |
| EP | WO2016116531 | * | 7/2016 |
| WO | 2000027203 A1 | | 5/2000 |
| WO | 2009141367 A2 | | 11/2009 |
| WO | 2014013998 A1 | | 1/2014 |
| WO | 2016116531 A1 | | 7/2016 |

OTHER PUBLICATIONS

Blum, R. et al.; "Purple (*Cyperus rotundus*) and Yellow Nutsedge (*C. esculentus*) Control in Bermudagrass (*Cynodon dactylon*) Turf"; Weed Technology, vol. 14, Issue No. 2; 2000; pp. 357-365.
International Search Report and Written Opinion for International Application PCT/US2019/061135 International Filing Date: Nov. 13, 2019; dated Feb. 18, 2020; 17 pages.
Soltani, N. et al.; "Weed management in white beans with postemergence herbicide tankmixes"; Canadian Journal of Plant Science, vol. 93; 2013; pp. 669-674.
Taziar, A. et al.; "Sulfentrazone plus a Low Rate of Halosulfuron for Weed Control in White Bean (*Phaseolus vulgaris* L.)" Agricultural Sciences, vol. 8; 2017; pp. 227-238.

* cited by examiner

*Primary Examiner* — Mina Haghighatian
(74) *Attorney, Agent, or Firm* — Cantor Colburn LLP

(57) ABSTRACT

An herbicidal combination including a photosystem II inhibitor, an ALS inhibitor, and a chlorophyll and heme biosynthesis inhibitor, a composition comprising the combination, and methods of using these combinations are described.

4 Claims, No Drawings

HERBICIDAL COMBINATION

CROSS-REFERENCE TO RELATED APPLICATIONS

This application claims priority to U.S. Provisional Application 62/760,149 filed on Nov. 13, 2018, which is incorporated herein by reference in its entirety.

TECHNICAL FIELD

The present disclosure relates to combinations of herbicides for controlling harmful undesirable plants. The present disclosure more specifically relates to a synergistic combination of herbicides.

BACKGROUND AND PRIOR ART

Weeds are undesirable plants that can severely damage yield in crops. Farmers usually control these plants at the pre-plant stage as well as after sowing. Modern herbicides are used to either control or suppress these undesirable plants so as to allow sown crops a greater share of nutrient.

Current practices include combining herbicides with varied modes of action, which allows for broader spectrum of control and resistance management. However, the combinations currently known are not sufficient to control the resistant and persistent weeds. Growers increasingly face complex weed situations that may not be controlled with just one herbicide.

Combinations of herbicides are used to control a broader range of weeds. However, the combination of herbicides may not always result in the desired effect. Combination of herbicides may lead to an additive effect or an antagonistic effect. It may also result in phytotoxicity to the crops making it an undesirable combination. Agronomists must therefore carefully select the herbicides that can be combined to offer a synergistic effect that would control weeds while having no phytotoxic effect on the crop, and reduce the chances of development of herbicide resistant weeds.

U.S. Pat. No. 8,785,351 discloses a combination comprising bentazon, an acetolactate synthase (ALS) inhibitor and an ACCase inhibitor. Sulfonylureas are indicated as potential long list of ALS inhibitors, while some PPO inhibitors are merely indicated as a possible additional herbicide, amongst an equally large number of herbicides. This disclosure is generic and does not provide guidance towards the present combinations.

There is therefore a need in the art for combinations that have advantageous properties such as a herbicidal combination that is synergistic, helps in resistance management, reduces dosage of herbicides used thus causing minimal damage to the environment, and a herbicidal combination that has excellent residual effects.

Embodiments of the present invention may therefore ameliorate one or more of the above-mentioned problems:

SUMMARY

Therefore, in one aspect, the present invention may provide an herbicidal combination comprises:
(a) at least one photosystem II inhibitor selected from the group consisting of:
  (i) a phenylcarbamate herbicide;
  (ii) a triazine herbicide;
  (iii) a triazinone herbicide;
  (iv) an uracil herbicide;
  (v) a benthiadiazole herbicide;
  (vi) a nitrile herbicide; and
  (vii) an urea herbicide;
(b) at least one ALS inhibitor selected from the group consisting of:
  (i) an imidazolinone herbicide;
  (ii) a sulfonylamino-carbonyltriazolinone herbicide;
  (iii) a sulfonylurea herbicide;
  (iv) a pyrazole herbicide;
  (v) a triazolpyramidine herbicide; and
  (vi) a triazolone herbicide;
and
(c) at least one chlorophyll and heme biosynthesis inhibitor.

In another aspect, a method of controlling weeds at a locus comprises applying to the locus an herbicidal combination comprising:
(a) at least one photosystem II inhibitor selected from the group consisting of:
  (i) a phenylcarbamate herbicide;
  (ii) a triazine herbicide;
  (iii) a triazinone herbicide;
  (iv) an uracil herbicide;
  (v) a benthiadiazole herbicide;
  (vi) a nitrile herbicide; and
  (vii) an urea herbicide;
(b) at least one ALS inhibitor selected from the group consisting of:
  (i) an imidazolinone herbicide;
  (ii) a sulfonylamino-carbonyltriazolinone herbicide;
  (iii) a sulfonylurea herbicide;
  (iv) a pyrazole herbicide;
  (v) a triazolpyramidine herbicide; and
  (vi) a triazolone herbicide;
and
(c) at least one chlorophyll and heme biosynthesis inhibitor.

In an aspect, an herbicidal composition comprises
(a) at least one photosystem II inhibitor selected from the group consisting of:
  (i) a phenylcarbamate herbicide;
  (ii) a triazine herbicide;
  (iii) a triazinone herbicide;
  (iv) an uracil herbicide;
  (v) a benthiadiazole herbicide;
  (vi) a nitrile herbicide; and
  (vii) an urea herbicide;
(b) at least one ALS inhibitor selected from the group consisting of:
  (i) an imidazolinone herbicide;
  (ii) a sulfonylamino-carbonyltriazolinone herbicide;
  (iii) a sulfonylurea herbicide;
  (iv) a pyrazole herbicide;
  (v) a triazolpyramidine herbicide; and
  (vi) a triazolone herbicide;
(c) at least one chlorophyll and heme biosynthesis inhibitor; and
(d) at least one agrochemically acceptable excipient.

Yet another aspect comprises a method of increasing yield in a crop by application of a combination comprising:
(a) at least one photosystem II inhibitor selected from the group consisting of:
  (i) a phenylcarbamate herbicide;
  (ii) a triazine herbicide;
  (iii) a triazinone herbicide;
  (iv) an uracil herbicide;
  (v) a benthiadiazole herbicide;

(vi) a nitrile herbicide; and
(vii) an urea herbicide;
(b) at least one ALS inhibitor selected from the group consisting of:
(i) an imidazolinone herbicide;
(ii) a sulfonylamino-carbonyltriazolinone herbicide;
(iii) a sulfonylurea herbicide;
(iv) a pyrazole herbicide;
(v) a triazolpyramidine herbicide; and
(vi) a triazolone herbicide;
and
(c) at least one chlorophyll and heme biosynthesis inhibitor.

Another aspect provides a method of improving plant health, said method comprising application at the locus of the plant a combination comprising:
(a) at least one photosystem II inhibitor selected from the group consisting of:
(i) a phenylcarbamate herbicide;
(ii) a triazine herbicide;
(iii) a triazinone herbicide;
(iv) an uracil herbicide;
(v) a benthiadiazole herbicide;
(vi) a nitrile herbicide; and
(vii) an urea herbicide;
(b) at least one ALS inhibitor selected from the group consisting of:
(i) an imidazolinone herbicide;
(ii) a sulfonylamino-carbonyltriazolinone herbicide;
(iii) a sulfonylurea herbicide;
(iv) a pyrazole herbicide;
(v) a triazolpyramidine herbicide; and
(vi) a triazolone herbicide;
and
(c) at least one chlorophyll and heme biosynthesis inhibitor.

DETAILED DESCRIPTION

The term herbicide, as used herein, shall mean an active ingredient that kills, controls or otherwise adversely modifies the growth of weeds. As used herein, an herbicidally effective or vegetation controlling amount is an amount of active ingredient that causes an "herbicidal effect," i.e., an adversely modifying effect and includes deviations from natural development, killing, regulation, desiccation, retardation. The terms "plants" and "vegetation" include, but are not limited to, germinant seeds, emerging seedlings, plants emerging from vegetative propagules, and established vegetation. The term "locus" as used herein shall denote the vicinity of a desired crop in which weed control, typically selective weed control, of weeds is desired. The locus includes the vicinity of desired crop plants wherein the weed infestation has either emerged or is yet to emerge. The term crop shall include a multitude of desired crop plants or an individual crop plant growing at a locus.

Surprisingly, it has been found by the present inventors that a combination of a photosystem II inhibitor, an ALS inhibitor, and a chlorophyll and heme biosynthesis inhibitor results in a synergistic control of undesirable plants, at the locus of the desired plant.

Therefore, in one aspect, the present invention may provide an herbicidal combination comprising:
(a) at least one photosystem II inhibitor selected from the group consisting of:
(i) a phenylcarbamate herbicide;
(ii) a triazine herbicide;
(iii) a triazinone herbicide;
(iv) an uracil herbicide;
(v) a benthiadiazole herbicide;
(vi) a nitrile herbicide; and
(vii) an urea herbicide;
(b) at least one ALS inhibitor selected from the group consisting of:
(i) an imidazolinone herbicide;
(ii) a sulfonylamino-carbonyltriazolinone herbicide;
(iii) a sulfonylurea herbicide;
(iv) a pyrazole herbicide;
(v) a triazolpyramidine herbicide; and
(vi) a triazolone herbicide;
and
(c) at least one chlorophyll and heme biosynthesis inhibitor.

In an embodiment, the herbicidal combinations of the present invention comprise one herbicide from these three classes of herbicides.

Therefore, in one aspect, the present invention may provide a herbicidal combination comprising:
(a) at least one photosystem II inhibitor selected from the group consisting of (i) a phenylcarbamate herbicide; (ii) a triazine herbicide; (iii) a triazinone herbicide; (iv) an uracil herbicide; (v) a benthiadiazole herbicide; (vi) a nitrile herbicide; and (vii) an urea herbicide;
(b) at least one ALS inhibitor selected from the group consisting of (i) an imidazolinone herbicide; (ii) a sulfonylamino-carbonyltriazolinone herbicide; (iii) a sulfonylurea herbicide; (iv) a pyrazole herbicide; (v) a triazolpyramidine herbicide; and (vi) a triazolone herbicide; and
(c) at least one chlorophyll and heme biosynthesis inhibitor herbicide.

In another aspect, the present invention provides a method of controlling weeds at a locus by applying the combination of the present invention to the locus.

Thus, in this aspect, the present invention may provide a method of controlling weeds at a locus, said method comprising applying to the locus a combination comprising:
(a) at least one photosystem II inhibitor selected from the group consisting of (i) a phenylcarbamate herbicide; (ii) a triazine herbicide; (iii) a triazinone herbicide; (iv) an uracil herbicide; (v) a benthiadiazole herbicide; (vi) a nitrile herbicide; and (vii) an urea herbicide;
(b) at least one ALS inhibitor selected from the group consisting of (i) an imidazolinone herbicide; (ii) a sulfonylamino-carbonyltriazolinone herbicide; (iii) a sulfonylurea herbicide; (iv) a pyrazole herbicide; (v) a triazolpyramidine herbicide; and (vi) a triazolone herbicide; and
(c) at least one chlorophyll and heme biosynthesis inhibitor herbicide.

In another aspect, the present invention provides a composition comprising the combinations of the present invention.

Therefore, in this aspect, the present invention may provide a composition comprising:
(a) at least one photosystem II inhibitor selected from the group consisting of (i) a phenylcarbamate herbicide; (ii) a triazine herbicide; (iii) a triazinone herbicide; (iv) an uracil herbicide; (v) a benthiadiazole herbicide; (vi) a nitrile herbicide; and (vii) an urea herbicide;
(b) at least one ALS inhibitor selected from the group consisting of (i) an imidazolinone herbicide; (ii) a sulfonylamino-carbonyltriazolinone herbicide; (iii) a sulfonylurea herbicide; (iv) a pyrazole herbicide; (v) a triazolpyramidine herbicide; and (vi) a triazolone herbicide;
(c) at least one chlorophyll and heme biosynthesis inhibitor herbicide; and
(d) at least one agrochemically acceptable excipient.

In another aspect, the present invention provides a method for increasing yield in a crop by using the combinations of the present invention.

Therefore, in this aspect, the present invention may provide a method of increasing yield in a crop by application to the crop a combination comprising:
(a) at least one photosystem II inhibitor selected from the group consisting of (i) a phenylcarbamate herbicide; (ii) a triazine herbicide; (iii) a triazinone herbicide; (iv) an uracil herbicide; (v) a benthiadiazole herbicide; (vi) a nitrile herbicide; and (vii) an urea herbicide;
(b) at least one ALS inhibitor selected from the group consisting of (i) an imidazolinone herbicide; (ii) a sulfonylamino-carbonyltriazolinone herbicide; (iii) a sulfonylurea herbicide; (iv) a pyrazole herbicide; (v) a triazolpyramidine herbicide; and (vi) a triazolone herbicide; and
(c) at least one chlorophyll and heme biosynthesis inhibitor herbicide.

In another aspect, the present invention may provide a method of improving plant health comprising applying to the plant the combinations of the present invention.

Therefore, in this aspect, the present invention may provide a method of improving the plant health, said method comprising application at the locus of the plant a combination comprising:
(a) at least one photosystem II inhibitor selected from the group consisting of (i) a phenylcarbamate herbicide; (ii) a triazine herbicide; (iii) a triazinone herbicide; (iv) an uracil herbicide; (v) a benthiadiazole herbicide; (vi) a nitrile herbicide; and (vii) an urea herbicide;
(b) at least one ALS inhibitor selected from the group consisting of (i) an imidazolinone herbicide; (ii) a sulfonylamino-carbonyltriazolinone herbicide; (iii) a sulfonylurea herbicide; (iv) a pyrazole herbicide; (v) a triazolpyramidine herbicide; and (vi) a triazolone herbicide; and
(c) at least one chlorophyll and heme biosynthesis inhibitor herbicide.

Each of the aspect described above may have one or more embodiments.

Each of the embodiments described hereinafter may apply to one or all of the aspects described hereinabove. These embodiments are intended to be read as being preferred features of one or all of the aspects described hereinabove. Each of the embodiments described hereinafter applies to each of the aspects described hereinabove individually.

In an embodiment, the photosystem II inhibitor is a phenylcarbamate herbicide. In an embodiment, the phenylcarbamate herbicide is selected from the group consisting of barban, (RS)-sec-butyl 3-chlorocarbanilate (BCPC), carbasulam, carbetamide, 2-chloroethyl 3-chlorocarbanilate (CEPC), chlorbufam, chlorpropham, (RS)-2-chloro-1-methylethyl 3-chlorocarbanilate (CPPC), desmedipham, phenisopham, phenmedipham, phenmedipham-ethyl, propham and methyl(3,4 dichlorophenyl)carbamate (swep).

In an embodiment, the phenylcarbamate herbicide is selected from the group consisting of chlorpropham, desmedipham, phenmedipham, and phenmedipham-ethyl. In an embodiment, the phenylcarbamate herbicide is chlorpropham. In an embodiment, the phenylcarbamate herbicide is desmedipham. In an embodiment, the phenylcarbamate herbicide is phenmedipham. In an embodiment, the phenylcarbamate herbicide is phenmedipham-ethyl. In an embodiment, the photosystem II inhibitor is a triazine herbicide.

In an embodiment, the triazine herbicide is selected from the group consisting of dipropetryn, fucaojing, trihydroxytriazine, atrazine, chlorazine, cyanazine, cyprazine, eglinazine, ipazine, mesoprazine, procyazine, proglinazine, propazine, sebuthylazine, simazine, terbuthylazine, trietazine, indaziflam, triaziflam, atraton, methometon, prometon, secbumeton, simeton, terbumeton, ametryn, aziprotryne, cyanatryn, desmetryn, dimethametryn, methoprotiyne, propmetryn, simetryn, and terbutryn.

In an embodiment, the triazine herbicide is atrazine. In an embodiment, the triazine herbicide is ametryn. In an embodiment, the photosystem II inhibitor is a triazinone herbicide.

In an embodiment, the triazinone herbicide is selected from the group consisting of ametridione, amibuzin, ethiozin, hexazinone, isomethiozin, metamitron, metribuzin and trifludimoxazin. In an embodiment, the triazinone herbicide is hexazinone. In an embodiment, the triazinone herbicide is metamitron. In an embodiment, the triazinone herbicide is metribuzin. In an embodiment, the photosystem II inhibitor is a uracil herbicide.

In an embodiment, the uracil herbicide is selected from the group consisting of benzfendizone, bromacil, butafenacil, flupropacil, isocil, lenacil, saflufenacil, terbacil and tiafenacil. In an embodiment, the uracil herbicide is bromacil. In an embodiment, the uracil herbicide is saflufenacil.

In an embodiment, the photosystem II inhibitor is a benzothiazole herbicide or a benzothiadiazole herbicide. In an embodiment, the benzothiazole herbicide is selected from the group consisting of benazolin, benzthiazuron, fenthiaprop, mefenacet, and methabenzthiazuron. In an embodiment, the photosystem II inhibitor is a benzothiadiazole herbicide. In an embodiment, the benzothiadiazole herbicide is bentazone or bentazone-sodium.

In an embodiment, the photosystem II inhibitor is a nitrile herbicide. In an embodiment, the nitrile herbicide is selected from the group consisting of bromobonil, bromoxynil, chloroxynil, cyclopyranil, dichlobenil, iodobenil, ioxynil and pyraclonil. In an embodiment, the nitrile herbicide is bromoxynil. In an embodiment, the photosystem II inhibitor is a urea herbicide. In an embodiment, the urea herbicide is a phenylurea herbicide.

In an embodiment, the phenylurea herbicide is selected from the group consisting of anisuron, buturon, chlorbromuron, chloreturon, chlorotoluron, chloroxuron, daimuron, difenoxuron, dimefuron, diruon, fenuron, fluometuron, fluothiuron, isoproturon, linuron, methiruon, methyldymuron, metobenzuron, metobromuron, metoxuron, monolinuron, monuron, neburon, parafluron, phenobenzuron, siduron, tetrafluron, and thidiazuron. In an embodiment, the phenylurea herbicide is diruon. In an embodiment, the phenylurea herbicide is linuron.

In an embodiment, the photosystem II inhibitor is selected from the group consisting of chlorpropham, desmedipham, phenmedipham, phenmedipham-ethyl, atrazine, hexazinone, metamitron, metribuzin, bromacil, saflufenacil, bentazone, bentazone-sodium, bromoxynil, diruon, and linuron.

In an embodiment, the ALS inhibitor herbicide is an imidazolinone herbicide. In an embodiment, the imidazolinone herbicide is selected from the group consisting of imazamethabenz, imazamox, imazapic, imazapyr, imazaquin, and imazethapyr. In an embodiment, the imidazolinone herbicide is imazamox. In an embodiment, the imidazolinone herbicide is imazapic. In an embodiment, the imidazolinone herbicide is imazapyr. In an embodiment, the imidazolinone herbicide is imazethapyr. In an embodiment, the ALS inhibitor is a triazolone herbicide.

In an embodiment, the triazolone herbicide is selected from the group consisting of amicarbazone, bencarbazone, carfentrazone, flucarbazone, ipfencarbazone, propoxycarbazone, sulfentrazone, and thiencarbazone. In an embodiment, the triazolone herbicide is carfentrazone. In an embodiment, the triazolone herbicide is flucarbazone. In an embodiment, the triazolone herbicide is sulfentrazone. In an embodiment, the triazolone herbicide is amicarbazone.

In an embodiment, the ALS inhibitor herbicide is a sulfonylamino-carbonyltriazolinone herbicide. In an embodiment, the sulfonylamino-carbonyltriazolinone herbicide is flucarbazone. In an embodiment, the sulfonylamino-carbonyltriazolinone herbicide is flucarbazone-sodium.

In an embodiment, the ALS inhibitor herbicide is a sulfonylurea herbicide. In an embodiment, the sulfonylurea herbicide is selected from the group consisting of amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, metazosulfuron, methiopyrisulfuron, monosulfuron, nicosulfuron, orthosulfamuron, oxasulfuron, primisulfuron, propyrisulfuron, pyrazosulfuron, rimsulfuron, sulfometuron, sulfosulfuron, trifloxysulfuron, zuomihuanglong, chlorsulfuron, cinosulfuron, ethametsulfuron, iodosulfuron, iofensulfuron, metsulfuron, prosulfuron, thifensulfuron, triasulfuron, tribenuron, trflusulfuron, and tritosulfuron. In an embodiment, the sulfonylurea herbicide is bensulfuron. In an embodiment, the sulfonylurea herbicide is halosulfuron. In an embodiment, the sulfonylurea herbicide is pyrazosulfuron. In an embodiment, the sulfonylurea herbicide is sulfosulfuron.

In an embodiment, the sulfonylurea herbicide is trifloxysulfuron. In an embodiment, the sulfonylurea herbicide is metsulfuron. In an embodiment, the sulfonylurea herbicide is flazasulfuron. In an embodiment, the ALS inhibitor herbicide is a pyrazole herbicide.

In an embodiment, the pyrazole herbicide is selected from the group consisting of azimsulfuron, cyclopyranil, difenzoquat, halosulfuron, flazasulfuron, metazachlor, metazosulfuron, pyrazosulfuron, pyraclonil, pyroxasulfone, benzofenap, pyrasulfotole, pyrazolynate, pyrazoxyfen, tolpyralate, topramezone, fluazolate, nipyraclofen, pinoxaden, and pyraflufen. In an embodiment, the pyrazole herbicide is metazachlor. In an embodiment, the pyrazole herbicide is pinoxaden. In an embodiment, the pyrazole herbicide is pyraflufen. In an embodiment, the ALS inhibitor herbicide is a triazolopyrimidine herbicide. In an embodiment, the triazolopyrimidine herbicide is selected from the group consisting of chloransulam, diclosulam, florasulam, flumetsulam, metosulam, penoxsulam, and pyroxsulam. In an embodiment, the triazolopyrimidine herbicide is diclosulam. In an embodiment, the triazolopyrimidine herbicide is penoxsulam.

In an embodiment, the ALS inhibitor herbicide is selected from the group consisting of imazamox, imazapic, imazapyr, imazethapyr, carfentrazone, flucarbazone, sulfentrazone, flucarbazone, amicarbazone, flucarbazone-sodium, bensulfuron, halosulfuron, pyrazosulfuron, flazasulfuron, sulfosulfuron, trifloxysulfuron, metsulfuron, metazachlor, pinoxaden, pyraflufen, diclosulam, and penoxsulam.

In an embodiment, the combinations of the present invention comprise a chlorophyll and heme biosynthesis inhibitor. In an embodiment, the chlorophyll and heme biosynthesis inhibitor is a triazolone herbicide. In an embodiment, the triazolone herbicide is selected from the group consisting of amicarbazone, bencarbazone, carfentrazone, flucarbazone, ipfencarbazone, propoxycarbazone, sulfentrazone, and thiencarbazone. In an embodiment, the triazolone herbicide is carfentrazone. In an embodiment, the triazolone herbicide is flucarbazone. In an embodiment, the triazolone herbicide is sulfentrazone. In an embodiment, the triazolone herbicide is amicarbazone.

In an embodiment, the chlorophyll and heme biosynthesis inhibitor is a uracil herbicide. In an embodiment, the uracil herbicide is selected from the group consisting of benzfendizone, bromacil, butafenacil, flupropacil, isocil, lenacil, saflufenacil, terbacil and tiafenacil. In an embodiment, the uracil herbicide is bromacil. In an embodiment, the uracil herbicide is saflufenacil.

In an embodiment, the chlorophyll and heme biosynthesis inhibitor is a dicarboximide herbicide. In an embodiment, the dicarboximide herbicide is selected from the group consisting of cinidon-ethyl, flumezin, flumiclorac, flumioxazin, and flumipropyn. In an embodiment, the dicarboximide herebicide is flumioxazin.

In an embodiment, the chlorophyll and heme biosynthesis inhibitor is a pyrazole herbicide. In an embodiment, the pyrazole herbicide is selected from the group consisting of azimsulfuron, cyclopyranil, difenzoquat, halosulfuron, metazachlor, flazasulfuron, metazosulfuron, pyrazosulfuron, pyraclonil, pyroxasulfone, benzofenap, pyrasulfotole, pyrazolynate, pyrazoxyfen, tolpyralate, topramezone, fluazolate, nipyraclofen, pinoxaden, and pyraflufen. In an embodiment, the pyrazole herbicide is metazachlor. In an embodiment, the pyrazole herbicide is pinoxaden. In an embodiment, the pyrazole herbicide is pyraflufen.

In an embodiment, the chlorophyll and heme biosynthesis inhibitor is selected from the group consisting of carfentrazone, amicarbazone, flucarbazone, sulfentrazone, bromacil, saflufenacil, flumioxazin, metazachlor, amicarbazone, pinoxaden, and pyraflufen.

Thus, in an embodiment, the present invention provides an herbicidal combination comprising:
  (a) a photosystem II inhibitor selected from the group consisting of chlorpropham, desmedipham, phenmedipham, phenmedipham-ethyl, atrazine, hexazinone, metamitron, metribuzin, bromacil, saflufenacil, bentazone, bentazone-sodium, bromoxynil, diruon, and linuron;
  (b) an ALS inhibitor selected from the group consisting of imazamox, imazapic, imazapyr, imazethapyr, carfentrazone, amicarbazone, flucarbazone, sulfentrazone, flucarbazone, flucarbazone-sodium, bensulfuron, halosulfuron, pyrazosulfuron, sulfosulfuron, flazasulfuron, trifloxysulfuron, metsulfuron, metazachlor, pinoxaden, pyraflufen, diclosulam, and penoxsulam; and
  (c) a chlorophyll and heme biosynthesis inhibitor selected from the group consisting of carfentrazone, amicarbazone, flucarbazone, sulfentrazone, bromacil, saflufenacil, flumioxazin, metazachlor, pinoxaden, and pyraflufen.

In an embodiment, the photosystem II inhibitor, the ALS inhibitor and the chlorophyll and heme biosynthesis inhibitor herbicides are not the same. In this embodiment, the three herbicides are selected such that the selected herbicides are different from each other.

In an embodiment, the combinations of the present invention comprise at least three different herbicides.

In an embodiment, the present invention provides preferred combinations, compositions and methods thereof.

The methods of the invention include a method of controlling weeds at a locus by applying to the locus of the weeds the combination or the composition, a method of increasing yield in a crop by application of the combination or composition to the crop, or a method of improving the plant health by application at the locus of the plant the combination or the composition. The embodiments described herein describe the preferred embodiments of all these possible combinations, compositions and methods of the invention.

In an embodiment, the preferred photosystem II inhibitor is bentazone or bentazone-sodium.

Thus, in an embodiment, the present invention provides an herbicidal combination comprising:
(a) bentazone or bentazone-sodium;
(b) an ALS inhibitor selected from the group consisting of imazamox, imazapic, imazapyr, imazethapyr, carfentrazone, amicarbazone, flucarbazone, sulfentrazone, flucarbazone, flucarbazone-sodium, bensulfuron, halosulfuron, pyrazosulfuron, flazasulfuron, sulfosulfuron, trifloxysulfuron, metsulfuron, metazachlor, pinoxaden, pyraflufen, diclosulam, and penoxsulam; and
(c) a chlorophyll and heme biosynthesis inhibitor is selected from the group consisting of carfentrazone, amicarbazone, flucarbazone, sulfentrazone, bromacil, saflufenacil, flumioxazin, metazachlor, pinoxaden, and pyraflufen.

In an embodiment, the present invention provides an herbicidal combination comprising:
(a) bentazone or bentazone-sodium;
(b) imazamox; and
(c) a chlorophyll and heme biosynthesis inhibitor is selected from the group consisting of carfentrazone, amicarbazone, flucarbazone, sulfentrazone, bromacil, saflufenacil, flumioxazin, metazachlor, pinoxaden, and pyraflufen.

In an embodiment, the present invention provides an herbicidal combination comprising:
(a) bentazone or bentazone-sodium;
(b) imazapic; and
(c) a chlorophyll and heme biosynthesis inhibitor is selected from the group consisting of carfentrazone, amicarbazone, flucarbazone, sulfentrazone, bromacil, saflufenacil, flumioxazin, metazachlor, pinoxaden, and pyraflufen.

Thus, in an embodiment, the present invention provides an herbicidal combination comprising:
(a) bentazone or bentazone-sodium;
(b) imazapyr; and
(c) a chlorophyll and heme biosynthesis inhibitor is selected from the group consisting of carfentrazone, amicarbazone, flucarbazone, sulfentrazone, bromacil, saflufenacil, flumioxazin, metazachlor, pinoxaden, and pyraflufen.

Thus, in an embodiment, the present invention provides an herbicidal combination comprising:
(a) bentazone or bentazone-sodium;
(b) imazethapyr; and
(c) a chlorophyll and heme biosynthesis inhibitor is selected from the group consisting of carfentrazone, amicarbazone, flucarbazone, sulfentrazone, bromacil, saflufenacil, flumioxazin, metazachlor, pinoxaden, and pyraflufen.

In an embodiment, the present invention provides an herbicidal combination comprising:
(a) bentazone or bentazone-sodium;
(b) carfentrazone; and
(c) a chlorophyll and heme biosynthesis inhibitor is selected from the group consisting of carfentrazone, amicarbazone, flucarbazone, sulfentrazone, bromacil, saflufenacil, flumioxazin, metazachlor, pinoxaden, and pyraflufen.

In an embodiment, the present invention provides an herbicidal combination comprising:
(a) bentazone or bentazone-sodium;
(b) flucarbazone; and
(c) a chlorophyll and heme biosynthesis inhibitor is selected from the group consisting of carfentrazone, amicarbazone, flucarbazone, sulfentrazone, bromacil, saflufenacil, flumioxazin, metazachlor, pinoxaden, and pyraflufen.

In an embodiment, the present invention provides an herbicidal combination comprising:
(a) bentazone or bentazone-sodium;
(b) sulfentrazone; and
(c) a chlorophyll and heme biosynthesis inhibitor is selected from the group consisting of carfentrazone, flucarbazone, amicarbazone, bromacil, saflufenacil, flumioxazin, metazachlor, pinoxaden, and pyraflufen.

In an embodiment, the present invention provides an herbicidal combination comprising:
(a) bentazone or bentazone-sodium;
(b) amicarbazone; and
(c) a chlorophyll and heme biosynthesis inhibitor is selected from the group consisting of carfentrazone, flucarbazone, amicarbazone, bromacil, saflufenacil, flumioxazin, metazachlor, pinoxaden, and pyraflufen.

In an embodiment, the present invention provides an herbicidal combination comprising:
(a) bentazone or bentazone-sodium;
(b) flucarbazone-sodium; and
(c) a chlorophyll and heme biosynthesis inhibitor is selected from the group consisting of carfentrazone, amicarbazone, flucarbazone, sulfentrazone, bromacil, saflufenacil, flumioxazin, metazachlor, pinoxaden, and pyraflufen.

In an embodiment, the present invention provides an herbicidal combination comprising:
(a) bentazone or bentazone-sodium;
(b) bensulfuron; and
(c) a chlorophyll and heme biosynthesis inhibitor is selected from the group consisting of carfentrazone, amicarbazone, flucarbazone, sulfentrazone, bromacil, saflufenacil, flumioxazin, metazachlor, pinoxaden, and pyraflufen.

In an embodiment, the present invention provides an herbicidal combination comprising:
(a) bentazone or bentazone-sodium;
(b) halosulfuron; and
(c) a chlorophyll and heme biosynthesis inhibitor is selected from the group consisting of carfentrazone, amicarbazone, flucarbazone, sulfentrazone, bromacil, saflufenacil, flumioxazin, metazachlor, pinoxaden, and pyraflufen.

In an embodiment, the present invention provides an herbicidal combination comprising:
(a) bentazone or bentazone-sodium;
(b) flazasulfuron; and
(c) a chlorophyll and heme biosynthesis inhibitor is selected from the group consisting of carfentrazone, amicarbazone, flucarbazone, sulfentrazone, bromacil, saflufenacil, flumioxazin, metazachlor, pinoxaden, and pyraflufen.

In an embodiment, the present invention provides an herbicidal combination comprising:
(a) bentazone or bentazone-sodium;
(b) pyrazosulfuron; and
(c) a chlorophyll and heme biosynthesis inhibitor is selected from the group consisting of carfentrazone, amicarbazone, flucarbazone, sulfentrazone, bromacil, saflufenacil, flumioxazin, metazachlor, pinoxaden, and pyraflufen.

In an embodiment, the present invention provides an herbicidal combination comprising:
(a) bentazone or bentazone-sodium;
(b) sulfosulfuron; and
(c) a chlorophyll and heme biosynthesis inhibitor is selected from the group consisting of carfentrazone, amicarbazone, flucarbazone, sulfentrazone, bromacil, saflufenacil, flumioxazin, metazachlor, pinoxaden, and pyraflufen.

In an embodiment, the present invention provides an herbicidal combination comprising:
(a) bentazone or bentazone-sodium;
(b) trifloxysulfuron; and
(c) a chlorophyll and heme biosynthesis inhibitor is selected from the group consisting of carfentrazone, amicarbazone, flucarbazone, sulfentrazone, bromacil, saflufenacil, flumioxazin, metazachlor, pinoxaden, and pyraflufen.

In an embodiment, the present invention provides an herbicidal combination comprising:
(a) bentazone or bentazone-sodium;
(b) metsulfuron; and
(c) a chlorophyll and heme biosynthesis inhibitor is selected from the group consisting of carfentrazone, amicarbazone, flucarbazone, sulfentrazone, bromacil, saflufenacil, flumioxazin, metazachlor, pinoxaden, and pyraflufen.

In an embodiment, the present invention provides an herbicidal combination comprising:
(a) bentazone or bentazone-sodium;
(b) metazachlor; and
(c) a chlorophyll and heme biosynthesis inhibitor is selected from the group consisting of carfentrazone, amicarbazone, flucarbazone, sulfentrazone, bromacil, saflufenacil, flumioxazin, metazachlor, pinoxaden, and pyraflufen.

In an embodiment, the present invention provides an herbicidal combination comprising:
(a) bentazone or bentazone-sodium;
(b) pinoxaden; and
(c) a chlorophyll and heme biosynthesis inhibitor is selected from the group consisting of carfentrazone, amicarbazone, flucarbazone, sulfentrazone, bromacil, saflufenacil, flumioxazin, metazachlor, pinoxaden, and pyraflufen.

TABLE 1

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 1 | Chlorpropham | Imazamox | Carfentrazone | 31 | Chlorpropham | Imazethapyr | Bromacil |
| 2 | Chlorpropham | Imazamox | Flucarbazone | 32 | Chlorpropham | Imazethapyr | Saflufenacil |
| 3 | Chlorpropham | Imazamox | Sulfentrazone | 33 | Chlorpropham | Imazethapyr | Flumioxazin |
| 4 | Chlorpropham | Imazamox | Bromacil | 34 | Chlorpropham | Imazethapyr | Metazachlor |
| 5 | Chlorpropham | Imazamox | Saflufenacil | 35 | Chlorpropham | Imazethapyr | Pinoxaden |
| 6 | Chlorpropham | Imazamox | Flumioxazin | 36 | Chlorpropham | Imazethapyr | Pyraflufen |
| 7 | Chlorpropham | Imazamox | Metazachlor | 37 | Chlorpropham | Carfentrazone | Carfentrazone |
| 8 | Chlorpropham | Imazamox | Pinoxaden | 38 | Chlorpropham | Carfentrazone | Flucarbazone |
| 9 | Chlorpropham | Imazamox | Pyraflufen | 39 | Chlorpropham | Carfentrazone | Sulfentrazone |
| 10 | Chlorpropham | Imazapic | Carfentrazone | 40 | Chlorpropham | Carfentrazone | Bromacil |
| 11 | Chlorpropham | Imazapic | Flucarbazone | 41 | Chlorpropham | Carfentrazone | Saflufenacil |
| 12 | Chlorpropham | Imazapic | Sulfentrazone | 42 | Chlorpropham | Carfentrazone | Flumioxazin |
| 13 | Chlorpropham | Imazapic | Bromacil | 43 | Chlorpropham | Carfentrazone | Metazachlor |
| 14 | Chlorpropham | Imazapic | Saflufenacil | 44 | Chlorpropham | Carfentrazone | Pinoxaden |
| 15 | Chlorpropham | Imazapic | Flumioxazin | 45 | Chlorpropham | Carfentrazone | Pyraflufen |
| 16 | Chlorpropham | Imazapic | Metazachlor | 46 | Chlorpropham | Flucarbazone | Carfentrazone |
| 17 | Chlorpropham | Imazapic | Pinoxaden | 47 | Chlorpropham | Flucarbazone | Flucarbazone |
| 18 | Chlorpropham | Imazapic | Pyraflufen | 48 | Chlorpropham | Flucarbazone | Sulfentrazone |
| 19 | Chlorpropham | Imazapyr | Carfentrazone | 49 | Chlorpropham | Flucarbazone | Bromacil |
| 20 | Chlorpropham | Imazapyr | Flucarbazone | 50 | Chlorpropham | Flucarbazone | Saflufenacil |
| 21 | Chlorpropham | Imazapyr | Sulfentrazone | 51 | Chlorpropham | Flucarbazone | Flumioxazin |
| 22 | Chlorpropham | Imazapyr | Bromacil | 52 | Chlorpropham | Flucarbazone | Metazachlor |
| 23 | Chlorpropham | Imazapyr | Saflufenacil | 53 | Chlorpropham | Flucarbazone | Pinoxaden |
| 24 | Chlorpropham | Imazapyr | Flumioxazin | 54 | Chlorpropham | Flucarbazone | Pyraflufen |
| 25 | Chlorpropham | Imazapyr | Metazachlor | 55 | Chlorpropham | Sulfentrazone | Carfentrazone |
| 26 | Chlorpropham | Imazapyr | Pinoxaden | 56 | Chlorpropham | Sulfentrazone | Flucarbazone |
| 27 | Chlorpropham | Imazapyr | Pyraflufen | 57 | Chlorpropham | Sulfentrazone | Amicarbazone |
| 28 | Chlorpropham | Imazethapyr | Carfentrazone | 58 | Chlorpropham | Sulfentrazone | Bromacil |
| 29 | Chlorpropham | Imazethapyr | Flucarbazone | 59 | Chlorpropham | Sulfentrazone | Saflufenacil |
| 30 | Chlorpropham | Imazethapyr | Sulfentrazone | 60 | Chlorpropham | Sulfentrazone | Flumioxazin |
| 61 | Chlorpropham | Sulfentrazone | Metazachlor | 91 | Chlorpropham | Pyrazosulfuron | Carfentrazone |
| 62 | Chlorpropham | Sulfentrazone | Pinoxaden | 92 | Chlorpropham | Pyrazosulfuron | Flucarbazone |
| 63 | Chlorpropham | Sulfentrazone | Pyraflufen | 93 | Chlorpropham | Pyrazosulfuron | Sulfentrazone |
| 64 | Chlorpropham | Flucarbazone-sodium | Carfentrazone | 94 | Chlorpropham | Pyrazosulfuron | Bromacil |
| 65 | Chlorpropham | Flucarbazone-sodium | Flucarbazone | 95 | Chlorpropham | Pyrazosulfuron | Saflufenacil |
| 66 | Chlorpropham | Flucarbazone-sodium | Sulfentrazone | 96 | Chlorpropham | Pyrazosulfuron | Flumioxazin |

TABLE 1-continued

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 67 | Chlorpropham | Flucarbazone-sodium | Bromacil | 97 | Chlorpropham | Pyrazosulfuron | Metazachlor |
| 68 | Chlorpropham | Flucarbazone-sodium | Saflufenacil | 98 | Chlorpropham | Pyrazosulfuron | Pinoxaden |
| 69 | Chlorpropham | Flucarbazone-sodium | Flumioxazin | 99 | Chlorpropham | Pyrazosulfuron | Pyraflufen |
| 70 | Chlorpropham | Flucarbazone-sodium | Metazachlor | 100 | Chlorpropham | Sulfosulfuron | Carfentrazone |
| 71 | Chlorpropham | Flucarbazone-sodium | Pinoxaden | 101 | Chlorpropham | Sulfosulfuron | Flucarbazone |
| 72 | Chlorpropham | Flucarbazone-sodium | Pyraflufen | 102 | Chlorpropham | Sulfosulfuron | Sulfentrazone |
| 73 | Chlorpropham | Bensulfuron | Carfentrazone | 103 | Chlorpropham | Sulfosulfuron | Bromacil |
| 74 | Chlorpropham | Bensulfuron | Flucarbazone | 104 | Chlorpropham | Sulfosulfuron | Saflufenacil |
| 75 | Chlorpropham | Bensulfuron | Sulfentrazone | 105 | Chlorpropham | Sulfosulfuron | Flumioxazin |
| 76 | Chlorpropham | Bensulfuron | Bromacil | 106 | Chlorpropham | Sulfosulfuron | Metazachlor |
| 77 | Chlorpropham | Bensulfuron | Saflufenacil | 107 | Chlorpropham | Sulfosulfuron | Pinoxaden |
| 78 | Chlorpropham | Bensulfuron | Flumioxazin | 108 | Chlorpropham | Sulfosulfuron | Pyraflufen |
| 79 | Chlorpropham | Bensulfuron | Metazachlor | 109 | Chlorpropham | Trifloxysulfuron | Carfentrazone |
| 80 | Chlorpropham | Bensulfuron | Pinoxaden | 110 | Chlorpropham | Trifloxysulfuron | Flucarbazone |
| 81 | Chlorpropham | Bensulfuron | Pyraflufen | 111 | Chlorpropham | Trifloxysulfuron | Sulfentrazone |
| 82 | Chlorpropham | Halosulfuron | Carfentrazone | 112 | Chlorpropham | Trifloxysulfuron | Bromacil |
| 83 | Chlorpropham | Halosulfuron | Flucarbazone | 113 | Chlorpropham | Trifloxysulfuron | Saflufenacil |
| 84 | Chlorpropham | Halosulfuron | Sulfentrazone | 114 | Chlorpropham | Trifloxysulfuron | Flumioxazin |
| 85 | Chlorpropham | Halosulfuron | Bromacil | 115 | Chlorpropham | Trifloxysulfuron | Metazachlor |
| 86 | Chlorpropham | Halosulfuron | Saflufenacil | 116 | Chlorpropham | Trifloxysulfuron | Pinoxaden |
| 87 | Chlorpropham | Halosulfuron | Flumioxazin | 117 | Chlorpropham | Trifloxysulfuron | Pyraflufen |
| 88 | Chlorpropham | Halosulfuron | Metazachlor | 118 | Chlorpropham | Metsulfuron | Carfentrazone |
| 89 | Chlorpropham | Halosulfuron | Pinoxaden | 119 | Chlorpropham | Metsulfuron | Flucarbazone |
| 90 | Chlorpropham | Halosulfuron | Pyraflufen | 120 | Chlorpropham | Metsulfuron | Sulfentrazone |
| 121 | Chlorpropham | Metsulfuron | Bromacil | 151 | Chlorpropham | Pyraflufen | Metazachlor |
| 122 | Chlorpropham | Metsulfuron | Saflufenacil | 152 | Chlorpropham | Pyraflufen | Pinoxaden |
| 123 | Chlorpropham | Metsulfuron | Flumioxazin | 153 | Chlorpropham | Diclosulam | Carfentrazone |
| 124 | Chlorpropham | Metsulfuron | Metazachlor | 154 | Chlorpropham | Diclosulam | Flucarbazone |
| 125 | Chlorpropham | Metsulfuron | Pinoxaden | 155 | Chlorpropham | Diclosulam | Sulfentrazone |
| 126 | Chlorpropham | Metsulfuron | Pyraflufen | 156 | Chlorpropham | Diclosulam | Bromacil |
| 127 | Chlorpropham | Metazachlor | Carfentrazone | 157 | Chlorpropham | Diclosulam | Saflufenacil |
| 128 | Chlorpropham | Metazachlor | Flucarbazone | 158 | Chlorpropham | Diclosulam | Flumioxazin |
| 129 | Chlorpropham | Metazachlor | Sulfentrazone | 159 | Chlorpropham | Diclosulam | Metazachlor |
| 130 | Chlorpropham | Metazachlor | Bromacil | 160 | Chlorpropham | Diclosulam | Pinoxaden |
| 131 | Chlorpropham | Metazachlor | Saflufenacil | 161 | Chlorpropham | Diclosulam | Pyraflufen |
| 132 | Chlorpropham | Metazachlor | Flumioxazin | 162 | Chlorpropham | Penoxsulam | Carfentrazone |
| 133 | Chlorpropham | Metazachlor | Metazachlor | 163 | Chlorpropham | Penoxsulam | Flucarbazone |
| 134 | Chlorpropham | Metazachlor | Pinoxaden | 164 | Chlorpropham | Penoxsulam | Sulfentrazone |
| 135 | Chlorpropham | Metazachlor | Pyraflufen | 165 | Chlorpropham | Penoxsulam | Bromacil |
| 136 | Chlorpropham | Pinoxaden | Carfentrazone | 166 | Chlorpropham | Penoxsulam | Saflufenacil |
| 137 | Chlorpropham | Pinoxaden | Flucarbazone | 167 | Chlorpropham | Penoxsulam | Flumioxazin |
| 138 | Chlorpropham | Pinoxaden | Sulfentrazone | 168 | Chlorpropham | Penoxsulam | Metazachlor |
| 139 | Chlorpropham | Pinoxaden | Bromacil | 169 | Chlorpropham | Penoxsulam | Pinoxaden |
| 140 | Chlorpropham | Pinoxaden | Saflufenacil | 170 | Chlorpropham | Penoxsulam | Pyraflufen |
| 141 | Chlorpropham | Pinoxaden | Flumioxazin | 171 | Desmedipham | Imazamox | Carfentrazone |
| 142 | Chlorpropham | Pinoxaden | Metazachlor | 172 | Desmedipham | Imazamox | Flucarbazone |
| 143 | Chlorpropham | Pinoxaden | Pinoxaden | 173 | Desmedipham | Imazamox | Sulfentrazone |
| 144 | Chlorpropham | Pinoxaden | Pyraflufen | 174 | Desmedipham | Imazamox | Bromacil |
| 145 | Chlorpropham | Pyraflufen | Carfentrazone | 175 | Desmedipham | Imazamox | Saflufenacil |
| 146 | Chlorpropham | Pyraflufen | Flucarbazone | 176 | Desmedipham | Imazamox | Flumioxazin |
| 147 | Chlorpropham | Pyraflufen | Sulfentrazone | 177 | Desmedipham | Imazamox | Metazachlor |
| 148 | Chlorpropham | Pyraflufen | Bromacil | 178 | Desmedipham | Imazamox | Pinoxaden |
| 149 | Chlorpropham | Pyraflufen | Saflufenacil | 179 | Desmedipham | Imazamox | Pyraflufen |
| 150 | Chlorpropham | Pyraflufen | Flumioxazin | 180 | Desmedipham | Imazapic | Carfentrazone |
| 181 | Desmedipham | Imazapic | Flucarbazone | 211 | Desmedipham | Carfentrazone | Saflufenacil |
| 182 | Desmedipham | Imazapic | Sulfentrazone | 212 | Desmedipham | Carfentrazone | Flumioxazin |
| 183 | Desmedipham | Imazapic | Bromacil | 213 | Desmedipham | Carfentrazone | Metazachlor |
| 184 | Desmedipham | Imazapic | Saflufenacil | 214 | Desmedipham | Carfentrazone | Pinoxaden |
| 185 | Desmedipham | Imazapic | Flumioxazin | 215 | Desmedipham | Carfentrazone | Pyraflufen |
| 186 | Desmedipham | Imazapic | Metazachlor | 216 | Desmedipham | Flucarbazone | Carfentrazone |
| 187 | Desmedipham | Imazapic | Pinoxaden | 217 | Desmedipham | Flucarbazone | Flucarbazone |
| 188 | Desmedipham | Imazapic | Pyraflufen | 218 | Desmedipham | Flucarbazone | Sulfentrazone |
| 189 | Desmedipham | Imazapyr | Carfentrazone | 219 | Desmedipham | Flucarbazone | Bromacil |
| 190 | Desmedipham | Imazapyr | Flucarbazone | 220 | Desmedipham | Flucarbazone | Saflufenacil |
| 191 | Desmedipham | Imazapyr | Sulfentrazone | 221 | Desmedipham | Flucarbazone | Flumioxazin |
| 192 | Desmedipham | Imazapyr | Bromacil | 222 | Desmedipham | Flucarbazone | Metazachlor |
| 193 | Desmedipham | Imazapyr | Saflufenacil | 223 | Desmedipham | Flucarbazone | Pinoxaden |
| 194 | Desmedipham | Imazapyr | Flumioxazin | 224 | Desmedipham | Flucarbazone | Pyraflufen |
| 195 | Desmedipham | Imazapyr | Metazachlor | 225 | Desmedipham | Sulfentrazone | Carfentrazone |

TABLE 1-continued

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 196 | Desmedipham | Imazapyr | Pinoxaden | 226 | Desmedipham | Sulfentrazone | Flucarbazone |
| 197 | Desmedipham | Imazapyr | Pyraflufen | 227 | Desmedipham | Sulfentrazone | Amicarbazone |
| 198 | Desmedipham | Imazethapyr | Carfentrazone | 228 | Desmedipham | Sulfentrazone | Bromacil |
| 199 | Desmedipham | Imazethapyr | Flucarbazone | 229 | Desmedipham | Sulfentrazone | Saflufenacil |
| 200 | Desmedipham | Imazethapyr | Sulfentrazone | 230 | Desmedipham | Sulfentrazone | Flumioxazin |
| 201 | Desmedipham | Imazethapyr | Bromacil | 231 | Desmedipham | Sulfentrazone | Metazachlor |
| 202 | Desmedipham | Imazethapyr | Saflufenacil | 232 | Desmedipham | Sulfentrazone | Pinoxaden |
| 203 | Desmedipham | Imazethapyr | Flumioxazin | 233 | Desmedipham | Sulfentrazone | Pyraflufen |
| 204 | Desmedipham | Imazethapyr | Metazachlor | 234 | Desmedipham | Flucarbazone-sodium | Carfentrazone |
| 205 | Desmedipham | Imazethapyr | Pinoxaden | 235 | Desmedipham | Flucarbazone-sodium | Flucarbazone |
| 206 | Desmedipham | Imazethapyr | Pyraflufen | 236 | Desmedipham | Flucarbazone-sodium | Sulfentrazone |
| 207 | Desmedipham | Carfentrazone | Carfentrazone | 237 | Desmedipham | Flucarbazone-sodium | Bromacil |
| 208 | Desmedipham | Carfentrazone | Flucarbazone | 238 | Desmedipham | Flucarbazone-sodium | Saflufenacil |
| 209 | Desmedipham | Carfentrazone | Sulfentrazone | 239 | Desmedipham | Flucarbazone-sodium | Flumioxazin |
| 210 | Desmedipham | Carfentrazone | Bromacil | 240 | Desmedipham | Flucarbazone-sodium | Metazachlor |
| 241 | Desmedipham | Flucarbazone-sodium | Pinoxaden | 271 | Desmedipham | Sulfosulfuron | Flucarbazone |
| 242 | Desmedipham | Flucarbazone-sodium | Pyraflufen | 272 | Desmedipham | Sulfosulfuron | Sulfentrazone |
| 243 | Desmedipham | Bensulfuron | Carfentrazone | 273 | Desmedipham | Sulfosulfuron | Bromacil |
| 244 | Desmedipham | Bensulfuron | Flucarbazone | 274 | Desmedipham | Sulfosulfuron | Saflufenacil |
| 245 | Desmedipham | Bensulfuron | Sulfentrazone | 275 | Desmedipham | Sulfosulfuron | Flumioxazin |
| 246 | Desmedipham | Bensulfuron | Bromacil | 276 | Desmedipham | Sulfosulfuron | Metazachlor |
| 247 | Desmedipham | Bensulfuron | Saflufenacil | 277 | Desmedipham | Sulfosulfuron | Pinoxaden |
| 248 | Desmedipham | Bensulfuron | Flumioxazin | 278 | Desmedipham | Sulfosulfuron | Pyraflufen |
| 249 | Desmedipham | Bensulfuron | Metazachlor | 279 | Desmedipham | Trifloxysulfuron | Carfentrazone |
| 250 | Desmedipham | Bensulfuron | Pinoxaden | 280 | Desmedipham | Trifloxysulfuron | Flucarbazone |
| 251 | Desmedipham | Bensulfuron | Pyraflufen | 281 | Desmedipham | Trifloxysulfuron | Sulfentrazone |
| 252 | Desmedipham | Halosulfuron | Carfentrazone | 282 | Desmedipham | Trifloxysulfuron | Bromacil |
| 253 | Desmedipham | Halosulfuron | Flucarbazone | 283 | Desmedipham | Trifloxysulfuron | Saflufenacil |
| 254 | Desmedipham | Halosulfuron | Sulfentrazone | 284 | Desmedipham | Trifloxysulfuron | Flumioxazin |
| 255 | Desmedipham | Halosulfuron | Bromacil | 285 | Desmedipham | Trifloxysulfuron | Metazachlor |
| 256 | Desmedipham | Halosulfuron | Saflufenacil | 286 | Desmedipham | Trifloxysulfuron | Pinoxaden |
| 257 | Desmedipham | Halosulfuron | Flumioxazin | 287 | Desmedipham | Trifloxysulfuron | Pyraflufen |
| 258 | Desmedipham | Halosulfuron | Metazachlor | 288 | Desmedipham | Metsulfuron | Carfentrazone |
| 259 | Desmedipham | Halosulfuron | Pinoxaden | 289 | Desmedipham | Metsulfuron | Flucarbazone |
| 260 | Desmedipham | Halosulfuron | Pyraflufen | 290 | Desmedipham | Metsulfuron | Sulfentrazone |
| 261 | Desmedipham | Pyrazosulfuron | Carfentrazone | 291 | Desmedipham | Metsulfuron | Bromacil |
| 262 | Desmedipham | Pyrazosulfuron | Flucarbazone | 292 | Desmedipham | Metsulfuron | Saflufenacil |
| 263 | Desmedipham | Pyrazosulfuron | Sulfentrazone | 293 | Desmedipham | Metsulfuron | Flumioxazin |
| 264 | Desmedipham | Pyrazosulfuron | Bromacil | 294 | Desmedipham | Metsulfuron | Metazachlor |
| 265 | Desmedipham | Pyrazosulfuron | Saflufenacil | 295 | Desmedipham | Metsulfuron | Pinoxaden |
| 266 | Desmedipham | Pyrazosulfuron | Flumioxazin | 296 | Desmedipham | Metsulfuron | Pyraflufen |
| 267 | Desmedipham | Pyrazosulfuron | Metazachlor | 297 | Desmedipham | Metazachlor | Carfentrazone |
| 268 | Desmedipham | Pyrazosulfuron | Pinoxaden | 298 | Desmedipham | Metazachlor | Flucarbazone |
| 269 | Desmedipham | Pyrazosulfuron | Pyraflufen | 299 | Desmedipham | Metazachlor | Sulfentrazone |
| 270 | Desmedipham | Sulfosulfuron | Carfentrazone | 300 | Desmedipham | Metazachlor | Bromacil |
| 301 | Desmedipham | Metazachlor | Saflufenacil | 331 | Desmedipham | Diclosulam | Pyraflufen |
| 302 | Desmedipham | Metazachlor | Flumioxazin | 332 | Desmedipham | Penoxsulam | Carfentrazone |
| 303 | Desmedipham | Metazachlor | Metazachlor | 333 | Desmedipham | Penoxsulam | Flucarbazone |
| 304 | Desmedipham | Metazachlor | Pinoxaden | 334 | Desmedipham | Penoxsulam | Sulfentrazone |
| 305 | Desmedipham | Metazachlor | Pyraflufen | 335 | Desmedipham | Penoxsulam | Bromacil |
| 306 | Desmedipham | Pinoxaden | Carfentrazone | 336 | Desmedipham | Penoxsulam | Saflufenacil |
| 307 | Desmedipham | Pinoxaden | Flucarbazone | 337 | Desmedipham | Penoxsulam | Flumioxazin |
| 308 | Desmedipham | Pinoxaden | Sulfentrazone | 338 | Desmedipham | Penoxsulam | Metazachlor |
| 309 | Desmedipham | Pinoxaden | Bromacil | 339 | Desmedipham | Penoxsulam | Pinoxaden |
| 310 | Desmedipham | Pinoxaden | Saflufenacil | 340 | Desmedipham | Penoxsulam | Pyraflufen |
| 311 | Desmedipham | Pinoxaden | Flumioxazin | 341 | Phenmedipham | Imazamox | Carfentrazone |
| 312 | Desmedipham | Pinoxaden | Metazachlor | 342 | Phenmedipham | Imazamox | Flucarbazone |
| 313 | Desmedipham | Pinoxaden | Pinoxaden | 343 | Phenmedipham | Imazamox | Sulfentrazone |
| 314 | Desmedipham | Pinoxaden | Pyraflufen | 344 | Phenmedipham | Imazamox | Bromacil |
| 315 | Desmedipham | Pyraflufen | Carfentrazone | 345 | Phenmedipham | Imazamox | Saflufenacil |
| 316 | Desmedipham | Pyraflufen | Flucarbazone | 346 | Phenmedipham | Imazamox | Flumioxazin |
| 317 | Desmedipham | Pyraflufen | Sulfentrazone | 347 | Phenmedipham | Imazamox | Metazachlor |
| 318 | Desmedipham | Pyraflufen | Bromacil | 348 | Phenmedipham | Imazamox | Pinoxaden |
| 319 | Desmedipham | Pyraflufen | Saflufenacil | 349 | Phenmedipham | Imazamox | Pyraflufen |
| 320 | Desmedipham | Pyraflufen | Flumioxazin | 350 | Phenmedipham | Imazapic | Carfentrazone |
| 321 | Desmedipham | Pyraflufen | Metazachlor | 351 | Phenmedipham | Imazapic | Flucarbazone |

TABLE 1-continued

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 322 | Desmedipham | Pyraflufen | Pinoxaden | 352 | Phenmedipham | Imazapic | Sulfentrazone |
| 323 | Desmedipham | Diclosulam | Carfentrazone | 353 | Phenmedipham | Imazapic | Bromacil |
| 324 | Desmedipham | Diclosulam | Flucarbazone | 354 | Phenmedipham | Imazapic | Saflufenacil |
| 325 | Desmedipham | Diclosulam | Sulfentrazone | 355 | Phenmedipham | Imazapic | Flumioxazin |
| 326 | Desmedipham | Diclosulam | Bromacil | 356 | Phenmedipham | Imazapic | Metazachlor |
| 327 | Desmedipham | Diclosulam | Saflufenacil | 357 | Phenmedipham | Imazapic | Pinoxaden |
| 328 | Desmedipham | Diclosulam | Flumioxazin | 358 | Phenmedipham | Imazapic | Pyraflufen |
| 329 | Desmedipham | Diclosulam | Metazachlor | 359 | Phenmedipham | Imazapyr | Carfentrazone |
| 330 | Desmedipham | Diclosulam | Pinoxaden | 360 | Phenmedipham | Imazapyr | Flucarbazone |
| 361 | Phenmedipham | Imazapyr | Sulfentrazone | 391 | Phenmedipham | Flucarbazone | Flumioxazin |
| 362 | Phenmedipham | Imazapyr | Bromacil | 392 | Phenmedipham | Flucarbazone | Metazachlor |
| 363 | Phenmedipham | Imazapyr | Saflufenacil | 393 | Phenmedipham | Flucarbazone | Pinoxaden |
| 364 | Phenmedipham | Imazapyr | Flumioxazin | 394 | Phenmedipham | Flucarbazone | Pyraflufen |
| 365 | Phenmedipham | Imazapyr | Metazachlor | 395 | Phenmedipham | Sulfentrazone | Carfentrazone |
| 366 | Phenmedipham | Imazapyr | Pinoxaden | 396 | Phenmedipham | Sulfentrazone | Flucarbazone |
| 367 | Phenmedipham | Imazapyr | Pyraflufen | 397 | Phenmedipham | Sulfentrazone | Amicarbazone |
| 368 | Phenmedipham | Imazethapyr | Carfentrazone | 398 | Phenmedipham | Sulfentrazone | Bromacil |
| 369 | Phenmedipham | Imazethapyr | Flucarbazone | 399 | Phenmedipham | Sulfentrazone | Saflufenacil |
| 370 | Phenmedipham | Imazethapyr | Sulfentrazone | 400 | Phenmedipham | Sulfentrazone | Flumioxazin |
| 371 | Phenmedipham | Imazethapyr | Bromacil | 401 | Phenmedipham | Sulfentrazone | Metazachlor |
| 372 | Phenmedipham | Imazethapyr | Saflufenacil | 402 | Phenmedipham | Sulfentrazone | Pinoxaden |
| 373 | Phenmedipham | Imazethapyr | Flumioxazin | 403 | Phenmedipham | Sulfentrazone | Pyraflufen |
| 374 | Phenmedipham | Imazethapyr | Metazachlor | 404 | Phenmedipham | Flucarbazone-sodium | Carfentrazone |
| 375 | Desmedipham | Imazethapyr | Pinoxaden | 405 | Phenmedipham | Flucarbazone-sodium | Flucarbazone |
| 376 | Phenmedipham | Imazethapyr | Pyraflufen | 406 | Phenmedipham | Flucarbazone-sodium | Sulfentrazone |
| 377 | Phenmedipham | Carfentrazone | Carfentrazone | 407 | Phenmedipham | Flucarbazone-sodium | Bromacil |
| 378 | Phenmedipham | Carfentrazone | Flucarbazone | 408 | Phenmedipham | Flucarbazone-sodium | Saflufenacil |
| 379 | Phenmedipham | Carfentrazone | Sulfentrazone | 409 | Phenmedipham | Flucarbazone-sodium | Flumioxazin |
| 380 | Phenmedipham | Carfentrazone | Bromacil | 410 | Phenmedipham | Flucarbazone-sodium | Metazachlor |
| 381 | Phenmedipham | Carfentrazone | Saflufenacil | 411 | Phenmedipham | Flucarbazone-sodium | Pinoxaden |
| 382 | Phenmedipham | Carfentrazone | Flumioxazin | 412 | Phenmedipham | Flucarbazone-sodium | Pyraflufen |
| 383 | Phenmedipham | Carfentrazone | Metazachlor | 413 | Phenmedipham | Bensulfuron | Carfentrazone |
| 384 | Phenmedipham | Carfentrazone | Pinoxaden | 414 | Phenmedipham | Bensulfuron | Flucarbazone |
| 385 | Phenmedipham | Carfentrazone | Pyraflufen | 415 | Phenmedipham | Bensulfuron | Sulfentrazone |
| 386 | Phenmedipham | Flucarbazone | Carfentrazone | 416 | Phenmedipham | Bensulfuron | Bromacil |
| 387 | Phenmedipham | Flucarbazone | Flucarbazone | 417 | Phenmedipham | Bensulfuron | Saflufenacil |
| 388 | Phenmedipham | Flucarbazone | Sulfentrazone | 418 | Phenmedipham | Bensulfuron | Flumioxazin |
| 389 | Phenmedipham | Flucarbazone | Bromacil | 419 | Phenmedipham | Bensulfuron | Metazachlor |
| 390 | Phenmedipham | Flucarbazone | Saflufenacil | 420 | Phenmedipham | Bensulfuron | Pinoxaden |
| 421 | Phenmedipham | Bensulfuron | Pyraflufen | 451 | Phenmedipham | Trifloxysulfuron | Sulfentrazone |
| 422 | Phenmedipham | Halosulfuron | Carfentrazone | 452 | Phenmedipham | Trifloxysulfuron | Bromacil |
| 423 | Phenmedipham | Halosulfuron | Flucarbazone | 453 | Phenmedipham | Trifloxysulfuron | Saflufenacil |
| 424 | Phenmedipham | Halosulfuron | Sulfentrazone | 454 | Phenmedipham | Trifloxysulfuron | Flumioxazin |
| 425 | Phenmedipham | Halosulfuron | Bromacil | 455 | Phenmedipham | Trifloxysulfuron | Metazachlor |
| 426 | Phenmedipham | Halosulfuron | Saflufenacil | 456 | Phenmedipham | Trifloxysulfuron | Pinoxaden |
| 427 | Phenmedipham | Halosulfuron | Flumioxazin | 457 | Phenmedipham | Trifloxysulfuron | Pyraflufen |
| 428 | Phenmedipham | Halosulfuron | Metazachlor | 458 | Phenmedipham | Metsulfuron | Carfentrazone |
| 429 | Phenmedipham | Halosulfuron | Pinoxaden | 459 | Phenmedipham | Metsulfuron | Flucarbazone |
| 430 | Phenmedipham | Halosulfuron | Pyraflufen | 460 | Phenmedipham | Metsulfuron | Sulfentrazone |
| 431 | Phenmedipham | Pyrazosulfuron | Carfentrazone | 461 | Phenmedipham | Metsulfuron | Bromacil |
| 432 | Phenmedipham | Pyrazosulfuron | Flucarbazone | 462 | Phenmedipham | Metsulfuron | Saflufenacil |
| 433 | Phenmedipham | Pyrazosulfuron | Sulfentrazone | 463 | Phenmedipham | Metsulfuron | Flumioxazin |
| 434 | Phenmedipham | Pyrazosulfuron | Bromacil | 464 | Phenmedipham | Metsulfuron | Metazachlor |
| 435 | Phenmedipham | Pyrazosulfuron | Saflufenacil | 465 | Phenmedipham | Metsulfuron | Pinoxaden |
| 436 | Phenmedipham | Pyrazosulfuron | Flumioxazin | 466 | Phenmedipham | Metsulfuron | Pyraflufen |
| 437 | Phenmedipham | Pyrazosulfuron | Metazachlor | 467 | Phenmedipham | Metazachlor | Carfentrazone |
| 438 | Phenmedipham | Pyrazosulfuron | Pinoxaden | 468 | Phenmedipham | Metazachlor | Flucarbazone |
| 439 | Phenmedipham | Pyrazosulfuron | Pyraflufen | 469 | Phenmedipham | Metazachlor | Sulfentrazone |
| 440 | Phenmedipham | Sulfosulfuron | Carfentrazone | 470 | Phenmedipham | Metazachlor | Bromacil |
| 441 | Phenmedipham | Sulfosulfuron | Flucarbazone | 471 | Phenmedipham | Metazachlor | Saflufenacil |
| 442 | Phenmedipham | Sulfosulfuron | Sulfentrazone | 472 | Phenmedipham | Metazachlor | Flumioxazin |
| 443 | Phenmedipham | Sulfosulfuron | Bromacil | 473 | Phenmedipham | Metazachlor | Metazachlor |
| 444 | Phenmedipham | Sulfosulfuron | Saflufenacil | 474 | Phenmedipham | Metazachlor | Pinoxaden |
| 445 | Phenmedipham | Sulfosulfuron | Flumioxazin | 475 | Phenmedipham | Metazachlor | Pyraflufen |
| 446 | Phenmedipham | Sulfosulfuron | Metazachlor | 476 | Phenmedipham | Pinoxaden | Carfentrazone |
| 447 | Phenmedipham | Sulfosulfuron | Pinoxaden | 477 | Phenmedipham | Pinoxaden | Flucarbazone |

TABLE 1-continued

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 448 | Phenmedipham | Sulfosulfuron | Pyraflufen | 478 | Phenmedipham | Pinoxaden | Sulfentrazone |
| 449 | Phenmedipham | Trifloxysulfuron | Carfentrazone | 479 | Phenmedipham | Pinoxaden | Bromacil |
| 450 | Phenmedipham | Trifloxysulfuron | Flucarbazone | 480 | Phenmedipham | Pinoxaden | Saflufenacil |
| 481 | Phenmedipham | Pinoxaden | Flumioxazin | 511 | Phenmedipham-ethyl | Imazamox | Carfentrazone |
| 482 | Phenmedipham | Pinoxaden | Metazachlor | 512 | Phenmedipham-ethyl | Imazamox | Flucarbazone |
| 483 | Phenmedipham | Pinoxaden | Pinoxaden | 513 | Phenmedipham-ethyl | Imazamox | Sulfentrazone |
| 484 | Phenmedipham | Pinoxaden | Pyraflufen | 514 | Phenmedipham-ethyl | Imazamox | Bromacil |
| 485 | Phenmedipham | Pyraflufen | Carfentrazone | 515 | Phenmedipham-ethyl | Imazamox | Saflufenacil |
| 486 | Phenmedipham | Pyraflufen | Flucarbazone | 516 | Phenmedipham-ethyl | Imazamox | Flumioxazin |
| 487 | Phenmedipham | Pyraflufen | Sulfentrazone | 517 | Phenmedipham-ethyl | Imazamox | Metazachlor |
| 488 | Phenmedipham | Pyraflufen | Bromacil | 518 | Phenmedipham-ethyl | Imazamox | Pinoxaden |
| 489 | Phenmedipham | Pyraflufen | Saflufenacil | 519 | Phenmedipham-ethyl | Imazamox | Pyraflufen |
| 490 | Phenmedipham | Pyraflufen | Flumioxazin | 520 | Phenmedipham-ethyl | Imazapic | Carfentrazone |
| 491 | Phenmedipham | Pyraflufen | Metazachlor | 521 | Phenmedipham-ethyl | Imazapic | Flucarbazone |
| 492 | Phenmedipham | Pyraflufen | Pinoxaden | 522 | Phenmedipham-ethyl | Imazapic | Sulfentrazone |
| 493 | Phenmedipham | Diclosulam | Carfentrazone | 523 | Phenmedipham-ethyl | Imazapic | Bromacil |
| 494 | Phenmedipham | Diclosulam | Flucarbazone | 524 | Phenmedipham-ethyl | Imazapic | Saflufenacil |
| 495 | Phenmedipham | Diclosulam | Sulfentrazone | 525 | Phenmedipham-ethyl | Imazapic | Flumioxazin |
| 496 | Phenmedipham | Diclosulam | Bromacil | 526 | Phenmedipham-ethyl | Imazapic | Metazachlor |
| 497 | Phenmedipham | Diclosulam | Saflufenacil | 527 | Phenmedipham-ethyl | Imazapic | Pinoxaden |
| 498 | Phenmedipham | Diclosulam | Flumioxazin | 528 | Phenmedipham-ethyl | Imazapic | Pyraflufen |
| 499 | Phenmedipham | Diclosulam | Metazachlor | 529 | Phenmedipham-ethyl | Imazapyr | Carfentrazone |
| 500 | Phenmedipham | Diclosulam | Pinoxaden | 530 | Phenmedipham-ethyl | Imazapyr | Flucarbazone |
| 501 | Phenmedipham | Diclosulam | Pyraflufen | 531 | Phenmedipham-ethyl | Imazapyr | Sulfentrazone |
| 502 | Phenmedipham | Penoxsulam | Carfentrazone | 532 | Phenmedipham-ethyl | Imazapyr | Bromacil |
| 503 | Phenmedipham | Penoxsulam | Flucarbazone | 533 | Phenmedipham-ethyl | Imazapyr | Saflufenacil |
| 504 | Phenmedipham | Penoxsulam | Sulfentrazone | 534 | Phenmedipham-ethyl | Imazapyr | Flumioxazin |
| 505 | Phenmedipham | Penoxsulam | Bromacil | 535 | Phenmedipham-ethyl | Imazapyr | Metazachlor |
| 506 | Phenmedipham | Penoxsulam | Saflufenacil | 536 | Phenmedipham-ethyl | Imazapyr | Pinoxaden |
| 507 | Phenmedipham | Penoxsulam | Flumioxazin | 537 | Phenmedipham-ethyl | Imazapyr | Pyraflufen |
| 508 | Phenmedipham | Penoxsulam | Metazachlor | 538 | Phenmedipham-ethyl | Imazethapyr | Carfentrazone |
| 509 | Phenmedipham | Penoxsulam | Pinoxaden | 539 | Phenmedipham-ethyl | Imazethapyr | Flucarbazone |
| 510 | Phenmedipham | Penoxsulam | Pyraflufen | 540 | Phenmedipham-ethyl | Imazethapyr | Sulfentrazone |
| 541 | Phenmedipham-ethyl | Imazethapyr | Bromacil | 571 | Phenmedipham-ethyl | Sulfentrazone | Metazachlor |
| 542 | Phenmedipham-ethyl | Imazethapyr | Saflufenacil | 572 | Phenmedipham-ethyl | Sulfentrazone | Pinoxaden |
| 543 | Phenmedipham-ethyl | Imazethapyr | Flumioxazin | 573 | Phenmedipham-ethyl | Sulfentrazone | Pyraflufen |
| 544 | Phenmedipham-ethyl | Imazethapyr | Metazachlor | 574 | Phenmedipham-ethyl | Flucarbazone-sodium | Carfentrazone |
| 545 | Phenmedipham-ethyl | Imazethapyr | Pinoxaden | 575 | Phenmedipham-ethyl | Flucarbazone-sodium | Flucarbazone |
| 546 | Phenmedipham-ethyl | Imazethapyr | Pyraflufen | 576 | Phenmedipham-ethyl | Flucarbazone-sodium | Sulfentrazone |

TABLE 1-continued

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 547 | Phenmedipham-ethyl | Carfentrazone | Carfentrazone | 577 | Phenmedipham-ethyl | Flucarbazone-sodium | Bromacil |
| 548 | Phenmedipham-ethyl | Carfentrazone | Flucarbazone | 578 | Phenmedipham-ethyl | Flucarbazone-sodium | Saflufenacil |
| 549 | Phenmedipham-ethyl | Carfentrazone | Sulfentrazone | 579 | Phenmedipham-ethyl | Flucarbazone-sodium | Flumioxazin |
| 550 | Phenmedipham-ethyl | Carfentrazone | Bromacil | 580 | Phenmedipham-ethyl | Flucarbazone-sodium | Metazachlor |
| 551 | Phenmedipham-ethyl | Carfentrazone | Saflufenacil | 581 | Phenmedipham-ethyl | Flucarbazone-sodium | Pinoxaden |
| 552 | Phenmedipham-ethyl | Carfentrazone | Flumioxazin | 582 | Phenmedipham-ethyl | Flucarbazone-sodium | Pyraflufen |
| 553 | Phenmedipham-ethyl | Carfentrazone | Metazachlor | 583 | Phenmedipham-ethyl | Bensulfuron | Carfentrazone |
| 554 | Phenmedipham-ethyl | Carfentrazone | Pinoxaden | 584 | Phenmedipham-ethyl | Bensulfuron | Flucarbazone |
| 555 | Phenmedipham-ethyl | Carfentrazone | Pyraflufen | 585 | Phenmedipham-ethyl | Bensulfuron | Sulfentrazone |
| 556 | Phenmedipham-ethyl | Flucarbazone | Carfentrazone | 586 | Phenmedipham-ethyl | Bensulfuron | Bromacil |
| 557 | Phenmedipham-ethyl | Flucarbazone | Flucarbazone | 587 | Phenmedipham-ethyl | Bensulfuron | Saflufenacil |
| 558 | Phenmedipham-ethyl | Flucarbazone | Sulfentrazone | 588 | Phenmedipham-ethyl | Bensulfuron | Flumioxazin |
| 559 | Phenmedipham-ethyl | Flucarbazone | Bromacil | 589 | Phenmedipham-ethyl | Bensulfuron | Metazachlor |
| 560 | Phenmedipham-ethyl | Flucarbazone | Saflufenacil | 590 | Phenmedipham-ethyl | Bensulfuron | Pinoxaden |
| 561 | Phenmedipham-ethyl | Flucarbazone | Flumioxazin | 591 | Phenmedipham-ethyl | Bensulfuron | Pyraflufen |
| 562 | Phenmedipham-ethyl | Flucarbazone | Metazachlor | 592 | Phenmedipham-ethyl | Halosulfuron | Carfentrazone |
| 563 | Phenmedipham-ethyl | Flucarbazone | Pinoxaden | 593 | Phenmedipham-ethyl | Halosulfuron | Flucarbazone |
| 564 | Phenmedipham-ethyl | Flucarbazone | Pyraflufen | 594 | Phenmedipham-ethyl | Halosulfuron | Sulfentrazone |
| 565 | Phenmedipham-ethyl | Sulfentrazone | Carfentrazone | 595 | Phenmedipham-ethyl | Halosulfuron | Bromacil |
| 566 | Phenmedipham-ethyl | Sulfentrazone | Flucarbazone | 596 | Phenmedipham-ethyl | Halosulfuron | Saflufenacil |
| 567 | Phenmedipham-ethyl | Sulfentrazone | Amicarbazone | 597 | Phenmedipham-ethyl | Halosulfuron | Flumioxazin |
| 568 | Phenmedipham-ethyl | Sulfentrazone | Bromacil | 598 | Phenmedipham-ethyl | Halosulfuron | Metazachlor |
| 569 | Phenmedipham-ethyl | Sulfentrazone | Saflufenacil | 599 | Phenmedipham-ethyl | Halosulfuron | Pinoxaden |
| 570 | Phenmedipham-ethyl | Sulfentrazone | Flumioxazin | 600 | Phenmedipham-ethyl | Halosulfuron | Pyraflufen |
| 601 | Phenmedipham-ethyl | Pyrazosulfuron | Carfentrazone | 631 | Phenmedipham-ethyl | Metsulfuron | Bromacil |
| 602 | Phenmedipham-ethyl | Pyrazosulfuron | Flucarbazone | 632 | Phenmedipham-ethyl | Metsulfuron | Saflufenacil |
| 603 | Phenmedipham-ethyl | Pyrazosulfuron | Sulfentrazone | 633 | Phenmedipham-ethyl | Metsulfuron | Flumioxazin |
| 604 | Phenmedipham-ethyl | Pyrazosulfuron | Bromacil | 634 | Phenmedipham-ethyl | Metsulfuron | Metazachlor |
| 605 | Phenmedipham-ethyl | Pyrazosulfuron | Saflufenacil | 635 | Phenmedipham-ethyl | Metsulfuron | Pinoxaden |
| 606 | Phenmedipham-ethyl | Pyrazosulfuron | Flumioxazin | 636 | Phenmedipham-ethyl | Metsulfuron | Pyraflufen |
| 607 | Phenmedipham-ethyl | Pyrazosulfuron | Metazachlor | 637 | Phenmedipham-ethyl | Metazachlor | Carfentrazone |
| 608 | Phenmedipham-ethyl | Pyrazosulfuron | Pinoxaden | 638 | Phenmedipham-ethyl | Metazachlor | Flucarbazone |
| 609 | Phenmedipham-ethyl | Pyrazosulfuron | Pyraflufen | 639 | Phenmedipham-ethyl | Metazachlor | Sulfentrazone |
| 610 | Phenmedipham-ethyl | Sulfosulfuron | Carfentrazone | 640 | Phenmedipham-ethyl | Metazachlor | Bromacil |
| 611 | Phenmedipham-ethyl | Sulfosulfuron | Flucarbazone | 641 | Phenmedipham-ethyl | Metazachlor | Saflufenacil |
| 612 | Phenmedipham-ethyl | Sulfosulfuron | Sulfentrazone | 642 | Phenmedipham-ethyl | Metazachlor | Flumioxazin |
| 613 | Phenmedipham-ethyl | Sulfosulfuron | Bromacil | 643 | Phenmedipham-ethyl | Metazachlor | Metazachlor |

TABLE 1-continued

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 614 | Phenmedipham-ethyl | Sulfosulfuron | Saflufenacil | 644 | Phenmedipham-ethyl | Metazachlor | Pinoxaden |
| 615 | Phenmedipham-ethyl | Sulfosulfuron | Flumioxazin | 645 | Phenmedipham-ethyl | Metazachlor | Pyraflufen |
| 616 | Phenmedipham-ethyl | Sulfosulfuron | Metazachlor | 646 | Phenmedipham-ethyl | Pinoxaden | Carfentrazone |
| 617 | Phenmedipham-ethyl | Sulfosulfuron | Pinoxaden | 647 | Phenmedipham-ethyl | Pinoxaden | Flucarbazone |
| 618 | Phenmedipham-ethyl | Sulfosulfuron | Pyraflufen | 648 | Phenmedipham-ethyl | Pinoxaden | Sulfentrazone |
| 619 | Phenmedipham-ethyl | Trifloxysulfuron | Carfentrazone | 649 | Phenmedipham-ethyl | Pinoxaden | Bromacil |
| 620 | Phenmedipham-ethyl | Trifloxysulfuron | Flucarbazone | 650 | Phenmedipham-ethyl | Pinoxaden | Saflufenacil |
| 621 | Phenmedipham-ethyl | Trifloxysulfuron | Sulfentrazone | 651 | Phenmedipham-ethyl | Pinoxaden | Flumioxazin |
| 622 | Phenmedipham-ethyl | Trifloxysulfuron | Bromacil | 652 | Phenmedipham-ethyl | Pinoxaden | Metazachlor |
| 623 | Phenmedipham-ethyl | Trifloxysulfuron | Saflufenacil | 653 | Phenmedipham-ethyl | Pinoxaden | Pinoxaden |
| 624 | Phenmedipham-ethyl | Trifloxysulfuron | Flumioxazin | 654 | Phenmedipham-ethyl | Pinoxaden | Pyraflufen |
| 625 | Phenmedipham-ethyl | Trifloxysulfuron | Metazachlor | 655 | Phenmedipham-ethyl | Pyraflufen | Carfentrazone |
| 626 | Phenmedipham-ethyl | Trifloxysulfuron | Pinoxaden | 656 | Phenmedipham-ethyl | Pyraflufen | Flucarbazone |
| 627 | Phenmedipham-ethyl | Trifloxysulfuron | Pyraflufen | 657 | Phenmedipham-ethyl | Pyraflufen | Sulfentrazone |
| 628 | Phenmedipham-ethyl | Metsulfuron | Carfentrazone | 658 | Phenmedipham-ethyl | Pyraflufen | Bromacil |
| 629 | Phenmedipham-ethyl | Metsulfuron | Flucarbazone | 659 | Phenmedipham-ethyl | Pyraflufen | Saflufenacil |
| 630 | Phenmedipham-ethyl | Metsulfuron | Sulfentrazone | 660 | Phenmedipham-ethyl | Pyraflufen | Flumioxazin |
| 661 | Phenmedipham-ethyl | Pyraflufen | Metazachlor | 691 | Atrazine | Imazapic | Flucarbazone |
| 662 | Phenmedipham-ethyl | Pyraflufen | Pinoxaden | 692 | Atrazine | Imazapic | Sulfentrazone |
| 663 | Phenmedipham-ethyl | Diclosulam | Carfentrazone | 693 | Atrazine | Imazapic | Bromacil |
| 664 | Phenmedipham-ethyl | Diclosulam | Flucarbazone | 694 | Atrazine | Imazapic | Saflufenacil |
| 665 | Phenmedipham-ethyl | Diclosulam | Sulfentrazone | 695 | Atrazine | Imazapic | Flumioxazin |
| 666 | Phenmedipham-ethyl | Diclosulam | Bromacil | 696 | Atrazine | Imazapic | Metazachlor |
| 667 | Phenmedipham-ethyl | Diclosulam | Saflufenacil | 697 | Atrazine | Imazapic | Pinoxaden |
| 668 | Phenmedipham-ethyl | Diclosulam | Flumioxazin | 698 | Atrazine | Imazapic | Pyraflufen |
| 669 | Phenmedipham-ethyl | Diclosulam | Metazachlor | 699 | Atrazine | Imazapyr | Carfentrazone |
| 670 | Phenmedipham-ethyl | Diclosulam | Pinoxaden | 700 | Atrazine | Imazapyr | Flucarbazone |
| 671 | Phenmedipham-ethyl | Diclosulam | Pyraflufen | 701 | Atrazine | Imazapyr | Sulfentrazone |
| 672 | Phenmedipham-ethyl | Penoxsulam | Carfentrazone | 702 | Atrazine | Imazapyr | Bromacil |
| 673 | Phenmedipham-ethyl | Penoxsulam | Flucarbazone | 703 | Atrazine | Imazapyr | Saflufenacil |
| 674 | Phenmedipham-ethyl | Penoxsulam | Sulfentrazone | 704 | Atrazine | Imazapyr | Flumioxazin |
| 675 | Phenmedipham-ethyl | Penoxsulam | Bromacil | 705 | Atrazine | Imazapyr | Metazachlor |
| 676 | Phenmedipham-ethyl | Penoxsulam | Saflufenacil | 706 | Atrazine | Imazapyr | Pinoxaden |
| 677 | Phenmedipham-ethyl | Penoxsulam | Flumioxazin | 707 | Atrazine | Imazapyr | Pyraflufen |
| 678 | Phenmedipham-ethyl | Penoxsulam | Metazachlor | 708 | Atrazine | Imazethapyr | Carfentrazone |
| 679 | Phenmedipham-ethyl | Penoxsulam | Pinoxaden | 709 | Atrazine | Imazethapyr | Flucarbazone |
| 680 | Phenmedipham-ethyl | Penoxsulam | Pyraflufen | 710 | Atrazine | Imazethapyr | Sulfentrazone |
| 681 | Atrazine | Imazamox | Carfentrazone | 711 | Atrazine | Imazethapyr | Bromacil |

TABLE 1-continued

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 682 | Atrazine | Imazamox | Flucarbazone | 712 | Atrazine | Imazethapyr | Saflufenacil |
| 683 | Atrazine | Imazamox | Sulfentrazone | 713 | Atrazine | Imazethapyr | Flumioxazin |
| 684 | Atrazine | Imazamox | Bromacil | 714 | Atrazine | Imazethapyr | Metazachlor |
| 685 | Atrazine | Imazamox | Saflufenacil | 715 | Atrazine | Imazethapyr | Pinoxaden |
| 686 | Atrazine | Imazamox | Flumioxazin | 716 | Atrazine | Imazethapyr | Pyraflufen |
| 687 | Atrazine | Imazamox | Metazachlor | 717 | Atrazine | Carfentrazone | Carfentrazone |
| 688 | Atrazine | Imazamox | Pinoxaden | 718 | Atrazine | Carfentrazone | Flucarbazone |
| 689 | Atrazine | Imazamox | Pyraflufen | 719 | Atrazine | Carfentrazone | Sulfentrazone |
| 690 | Atrazine | Imazapic | Carfentrazone | 720 | Atrazine | Carfentrazone | Bromacil |
| 721 | Atrazine | Carfentrazone | Saflufenacil | 751 | Atrazine | Flucarbazone-sodium | Pinoxaden |
| 722 | Atrazine | Carfentrazone | Flumioxazin | 752 | Atrazine | Flucarbazone-sodium | Pyraflufen |
| 723 | Atrazine | Carfentrazone | Metazachlor | 753 | Atrazine | Bensulfuron | Carfentrazone |
| 724 | Atrazine | Carfentrazone | Pinoxaden | 754 | Atrazine | Bensulfuron | Flucarbazone |
| 725 | Atrazine | Carfentrazone | Pyraflufen | 755 | Atrazine | Bensulfuron | Sulfentrazone |
| 726 | Atrazine | Flucarbazone | Carfentrazone | 756 | Atrazine | Bensulfuron | Bromacil |
| 727 | Atrazine | Flucarbazone | Flucarbazone | 757 | Atrazine | Bensulfuron | Saflufenacil |
| 728 | Atrazine | Flucarbazone | Sulfentrazone | 758 | Atrazine | Bensulfuron | Flumioxazin |
| 729 | Atrazine | Flucarbazone | Bromacil | 759 | Atrazine | Bensulfuron | Metazachlor |
| 730 | Atrazine | Flucarbazone | Saflufenacil | 760 | Atrazine | Bensulfuron | Pinoxaden |
| 731 | Atrazine | Flucarbazone | Flumioxazin | 761 | Atrazine | Bensulfuron | Pyraflufen |
| 732 | Atrazine | Flucarbazone | Metazachlor | 762 | Atrazine | Halosulfuron | Carfentrazone |
| 733 | Atrazine | Flucarbazone | Pinoxaden | 763 | Atrazine | Halosulfuron | Flucarbazone |
| 734 | Atrazine | Flucarbazone | Pyraflufen | 764 | Atrazine | Halosulfuron | Sulfentrazone |
| 735 | Atrazine | Sulfentrazone | Carfentrazone | 765 | Atrazine | Halosulfuron | Bromacil |
| 736 | Atrazine | Sulfentrazone | Flucarbazone | 766 | Atrazine | Halosulfuron | Saflufenacil |
| 737 | Atrazine | Sulfentrazone | Amicarbazone | 767 | Atrazine | Halosulfuron | Flumioxazin |
| 738 | Atrazine | Sulfentrazone | Bromacil | 768 | Atrazine | Halosulfuron | Metazachlor |
| 739 | Atrazine | Sulfentrazone | Saflufenacil | 769 | Atrazine | Halosulfuron | Pinoxaden |
| 740 | Atrazine | Sulfentrazone | Flumioxazin | 770 | Atrazine | Halosulfuron | Pyraflufen |
| 741 | Atrazine | Sulfentrazone | Metazachlor | 771 | Atrazine | Pyrazosulfuron | Carfentrazone |
| 742 | Atrazine | Sulfentrazone | Pinoxaden | 772 | Atrazine | Pyrazosulfuron | Flucarbazone |
| 743 | Atrazine | Sulfentrazone | Pyraflufen | 773 | Atrazine | Pyrazosulfuron | Sulfentrazone |
| 744 | Atrazine | Flucarbazone-sodium | Carfentrazone | 774 | Atrazine | Pyrazosulfuron | Bromacil |
| 745 | Atrazine | Flucarbazone-sodium | Flucarbazone | 775 | Atrazine | Pyrazosulfuron | Saflufenacil |
| 746 | Atrazine | Flucarbazone-sodium | Sulfentrazone | 776 | Atrazine | Pyrazosulfuron | Flumioxazin |
| 747 | Atrazine | Flucarbazone-sodium | Bromacil | 777 | Atrazine | Pyrazosulfuron | Metazachlor |
| 748 | Atrazine | Flucarbazone-sodium | Saflufenacil | 778 | Atrazine | Pyrazosulfuron | Pinoxaden |
| 749 | Atrazine | Flucarbazone-sodium | Flumioxazin | 779 | Atrazine | Pyrazosulfuron | Pyraflufen |
| 750 | Atrazine | Flucarbazone-sodium | Metazachlor | 780 | Atrazine | Sulfosulfuron | Carfentrazone |
| 781 | Atrazine | Sulfosulfuron | Flucarbazone | 811 | Atrazine | Metazachlor | Saflufenacil |
| 782 | Atrazine | Sulfosulfuron | Sulfentrazone | 812 | Atrazine | Metazachlor | Flumioxazin |
| 783 | Atrazine | Sulfosulfuron | Bromacil | 813 | Atrazine | Metazachlor | Metazachlor |
| 784 | Atrazine | Sulfosulfuron | Saflufenacil | 814 | Atrazine | Metazachlor | Pinoxaden |
| 785 | Atrazine | Sulfosulfuron | Flumioxazin | 815 | Atrazine | Metazachlor | Pyraflufen |
| 786 | Atrazine | Sulfosulfuron | Metazachlor | 816 | Atrazine | Pinoxaden | Carfentrazone |
| 787 | Atrazine | Sulfosulfuron | Pinoxaden | 817 | Atrazine | Pinoxaden | Flucarbazone |
| 788 | Atrazine | Sulfosulfuron | Pyraflufen | 818 | Atrazine | Pinoxaden | Sulfentrazone |
| 789 | Atrazine | Trifloxysulfuron | Carfentrazone | 819 | Atrazine | Pinoxaden | Bromacil |
| 790 | Atrazine | Trifloxysulfuron | Flucarbazone | 820 | Atrazine | Pinoxaden | Saflufenacil |
| 791 | Atrazine | Trifloxysulfuron | Sulfentrazone | 821 | Atrazine | Pinoxaden | Flumioxazin |
| 792 | Atrazine | Trifloxysulfuron | Bromacil | 822 | Atrazine | Pinoxaden | Metazachlor |
| 793 | Atrazine | Trifloxysulfuron | Saflufenacil | 823 | Atrazine | Pinoxaden | Pinoxaden |
| 794 | Atrazine | Trifloxysulfuron | Flumioxazin | 824 | Atrazine | Pinoxaden | Pyraflufen |
| 795 | Atrazine | Trifloxysulfuron | Metazachlor | 825 | Atrazine | Pyraflufen | Carfentrazone |
| 796 | Atrazine | Trifloxysulfuron | Pinoxaden | 826 | Atrazine | Pyraflufen | Flucarbazone |
| 797 | Atrazine | Trifloxysulfuron | Pyraflufen | 827 | Atrazine | Pyraflufen | Sulfentrazone |
| 798 | Atrazine | Metsulfuron | Carfentrazone | 828 | Atrazine | Pyraflufen | Bromacil |
| 799 | Atrazine | Metsulfuron | Flucarbazone | 829 | Atrazine | Pyraflufen | Saflufenacil |
| 800 | Atrazine | Metsulfuron | Sulfentrazone | 830 | Atrazine | Pyraflufen | Flumioxazin |
| 801 | Atrazine | Metsulfuron | Bromacil | 831 | Atrazine | Pyraflufen | Metazachlor |
| 802 | Atrazine | Metsulfuron | Saflufenacil | 832 | Atrazine | Pyraflufen | Pinoxaden |
| 803 | Atrazine | Metsulfuron | Flumioxazin | 833 | Atrazine | Diclosulam | Carfentrazone |
| 804 | Atrazine | Metsulfuron | Metazachlor | 834 | Atrazine | Diclosulam | Flucarbazone |
| 805 | Atrazine | Metsulfuron | Pinoxaden | 835 | Atrazine | Diclosulam | Sulfentrazone |
| 806 | Atrazine | Metsulfuron | Pyraflufen | 836 | Atrazine | Diclosulam | Bromacil |
| 807 | Atrazine | Metazachlor | Carfentrazone | 837 | Atrazine | Diclosulam | Saflufenacil |

TABLE 1-continued

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 808 | Atrazine | Metazachlor | Flucarbazone | 838 | Atrazine | Diclosulam | Flumioxazin |
| 809 | Atrazine | Metazachlor | Sulfentrazone | 839 | Atrazine | Diclosulam | Metazachlor |
| 810 | Atrazine | Metazachlor | Bromacil | 840 | Atrazine | Diclosulam | Pinoxaden |
| 841 | Atrazine | Diclosulam | Pyraflufen | 871 | Hexazinone | Imazapyr | Sulfentrazone |
| 842 | Atrazine | Penoxsulam | Carfentrazone | 872 | Hexazinone | Imazapyr | Bromacil |
| 843 | Atrazine | Penoxsulam | Flucarbazone | 873 | Hexazinone | Imazapyr | Saflufenacil |
| 844 | Atrazine | Penoxsulam | Sulfentrazone | 874 | Hexazinone | Imazapyr | Flumioxazin |
| 845 | Atrazine | Penoxsulam | Bromacil | 875 | Hexazinone | Imazapyr | Metazachlor |
| 846 | Atrazine | Penoxsulam | Saflufenacil | 876 | Hexazinone | Imazapyr | Pinoxaden |
| 847 | Atrazine | Penoxsulam | Flumioxazin | 877 | Hexazinone | Imazapyr | Pyraflufen |
| 848 | Atrazine | Penoxsulam | Metazachlor | 878 | Hexazinone | Imazethapyr | Carfentrazone |
| 849 | Atrazine | Penoxsulam | Pinoxaden | 879 | Hexazinone | Imazethapyr | Flucarbazone |
| 850 | Atrazine | Penoxsulam | Pyraflufen | 880 | Hexazinone | Imazethapyr | Sulfentrazone |
| 851 | Hexazinone | Imazamox | Carfentrazone | 881 | Hexazinone | Imazethapyr | Bromacil |
| 852 | Hexazinone | Imazamox | Flucarbazone | 882 | Hexazinone | Imazethapyr | Saflufenacil |
| 853 | Hexazinone | Imazamox | Sulfentrazone | 883 | Hexazinone | Imazethapyr | Flumioxazin |
| 854 | Hexazinone | Imazamox | Bromacil | 884 | Hexazinone | Imazethapyr | Metazachlor |
| 855 | Hexazinone | Imazamox | Saflufenacil | 885 | Hexazinone | Imazethapyr | Pinoxaden |
| 856 | Hexazinone | Imazamox | Flumioxazin | 886 | Hexazinone | Imazethapyr | Pyraflufen |
| 857 | Hexazinone | Imazamox | Metazachlor | 887 | Hexazinone | Carfentrazone | Carfentrazone |
| 858 | Hexazinone | Imazamox | Pinoxaden | 888 | Hexazinone | Carfentrazone | Flucarbazone |
| 859 | Hexazinone | Imazamox | Pyraflufen | 889 | Hexazinone | Carfentrazone | Sulfentrazone |
| 860 | Hexazinone | Imazapic | Carfentrazone | 890 | Hexazinone | Carfentrazone | Bromacil |
| 861 | Hexazinone | Imazapic | Flucarbazone | 891 | Hexazinone | Carfentrazone | Saflufenacil |
| 862 | Hexazinone | Imazapic | Sulfentrazone | 892 | Hexazinone | Carfentrazone | Flumioxazin |
| 863 | Hexazinone | Imazapic | Bromacil | 893 | Hexazinone | Carfentrazone | Metazachlor |
| 864 | Hexazinone | Imazapic | Saflufenacil | 894 | Hexazinone | Carfentrazone | Pinoxaden |
| 865 | Hexazinone | Imazapic | Flumioxazin | 895 | Hexazinone | Carfentrazone | Pyraflufen |
| 866 | Hexazinone | Imazapic | Metazachlor | 896 | Hexazinone | Flucarbazone | Carfentrazone |
| 867 | Hexazinone | Imazapic | Pinoxaden | 897 | Hexazinone | Flucarbazone | Flucarbazone |
| 868 | Hexazinone | Imazapic | Pyraflufen | 898 | Hexazinone | Flucarbazone | Sulfentrazone |
| 869 | Hexazinone | Imazapyr | Carfentrazone | 899 | Hexazinone | Flucarbazone | Bromacil |
| 870 | Hexazinone | Imazapyr | Flucarbazone | 900 | Hexazinone | Flucarbazone | Saflufenacil |
| 901 | Hexazinone | Flucarbazone | Flumioxazin | 931 | Hexazinone | Bensulfuron | Pyraflufen |
| 902 | Hexazinone | Flucarbazone | Metazachlor | 932 | Hexazinone | Halosulfuron | Carfentrazone |
| 903 | Hexazinone | Flucarbazone | Pinoxaden | 933 | Hexazinone | Halosulfuron | Flucarbazone |
| 904 | Hexazinone | Flucarbazone | Pyraflufen | 934 | Hexazinone | Halosulfuron | Sulfentrazone |
| 905 | Hexazinone | Sulfentrazone | Carfentrazone | 935 | Hexazinone | Halosulfuron | Bromacil |
| 906 | Hexazinone | Sulfentrazone | Flucarbazone | 936 | Hexazinone | Halosulfuron | Saflufenacil |
| 907 | Hexazinone | Sulfentrazone | Amicarbazone | 937 | Hexazinone | Halosulfuron | Flumioxazin |
| 908 | Hexazinone | Sulfentrazone | Bromacil | 938 | Hexazinone | Halosulfuron | Metazachlor |
| 909 | Hexazinone | Sulfentrazone | Saflufenacil | 939 | Hexazinone | Halosulfuron | Pinoxaden |
| 910 | Hexazinone | Sulfentrazone | Flumioxazin | 940 | Hexazinone | Halosulfuron | Pyraflufen |
| 911 | Hexazinone | Sulfentrazone | Metazachlor | 941 | Hexazinone | Pyrazosulfuron | Carfentrazone |
| 912 | Hexazinone | Sulfentrazone | Pinoxaden | 942 | Hexazinone | Pyrazosulfuron | Flucarbazone |
| 913 | Hexazinone | Sulfentrazone | Pyraflufen | 943 | Hexazinone | Pyrazosulfuron | Sulfentrazone |
| 914 | Hexazinone | Flucarbazone-sodium | Carfentrazone | 944 | Hexazinone | Pyrazosulfuron | Bromacil |
| 915 | Hexazinone | Flucarbazone-sodium | Flucarbazone | 945 | Hexazinone | Pyrazosulfuron | Saflufenacil |
| 916 | Hexazinone | Flucarbazone-sodium | Sulfentrazone | 946 | Hexazinone | Pyrazosulfuron | Flumioxazin |
| 917 | Hexazinone | Flucarbazone-sodium | Bromacil | 947 | Hexazinone | Pyrazosulfuron | Metazachlor |
| 918 | Hexazinone | Flucarbazone-sodium | Saflufenacil | 948 | Hexazinone | Pyrazosulfuron | Pinoxaden |
| 919 | Hexazinone | Flucarbazone-sodium | Flumioxazin | 949 | Hexazinone | Pyrazosulfuron | Pyraflufen |
| 920 | Hexazinone | Flucarbazone-sodium | Metazachlor | 950 | Hexazinone | Sulfosulfuron | Carfentrazone |
| 921 | Hexazinone | Flucarbazone-sodium | Pinoxaden | 951 | Hexazinone | Sulfosulfuron | Flucarbazone |
| 922 | Hexazinone | Flucarbazone-sodium | Pyraflufen | 952 | Hexazinone | Sulfosulfuron | Sulfentrazone |
| 923 | Hexazinone | Bensulfuron | Carfentrazone | 953 | Hexazinone | Sulfosulfuron | Bromacil |
| 924 | Hexazinone | Bensulfuron | Flucarbazone | 954 | Hexazinone | Sulfosulfuron | Saflufenacil |
| 925 | Hexazinone | Bensulfuron | Sulfentrazone | 955 | Hexazinone | Sulfosulfuron | Flumioxazin |
| 926 | Hexazinone | Bensulfuron | Bromacil | 956 | Hexazinone | Sulfosulfuron | Metazachlor |
| 927 | Hexazinone | Bensulfuron | Saflufenacil | 957 | Hexazinone | Sulfosulfuron | Pinoxaden |
| 928 | Hexazinone | Bensulfuron | Flumioxazin | 958 | Hexazinone | Sulfosulfuron | Pyraflufen |
| 929 | Hexazinone | Bensulfuron | Metazachlor | 959 | Hexazinone | Trifloxysulfuron | Carfentrazone |
| 930 | Hexazinone | Bensulfuron | Pinoxaden | 960 | Hexazinone | Trifloxysulfuron | Flucarbazone |
| 961 | Hexazinone | Trifloxysulfuron | Sulfentrazone | 991 | Hexazinone | Pinoxaden | Flumioxazin |
| 962 | Hexazinone | Trifloxysulfuron | Bromacil | 992 | Hexazinone | Pinoxaden | Metazachlor |
| 963 | Hexazinone | Trifloxysulfuron | Saflufenacil | 993 | Hexazinone | Pinoxaden | Pinoxaden |

TABLE 1-continued

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 964 | Hexazinone | Trifloxysulfuron | Flumioxazin | 994 | Hexazinone | Pinoxaden | Pyraflufen |
| 965 | Hexazinone | Trifloxysulfuron | Metazachlor | 995 | Hexazinone | Pyraflufen | Carfentrazone |
| 966 | Hexazinone | Trifloxysulfuron | Pinoxaden | 996 | Hexazinone | Pyraflufen | Flucarbazone |
| 967 | Hexazinone | Trifloxysulfuron | Pyraflufen | 997 | Hexazinone | Pyraflufen | Sulfentrazone |
| 968 | Hexazinone | Metsulfuron | Carfentrazone | 998 | Hexazinone | Pyraflufen | Bromacil |
| 969 | Hexazinone | Metsulfuron | Flucarbazone | 999 | Hexazinone | Pyraflufen | Saflufenacil |
| 970 | Hexazinone | Metsulfuron | Sulfentrazone | 1000 | Hexazinone | Pyraflufen | Flumioxazin |
| 971 | Hexazinone | Metsulfuron | Bromacil | 1001 | Hexazinone | Pyraflufen | Metazachlor |
| 972 | Hexazinone | Metsulfuron | Saflufenacil | 1002 | Hexazinone | Pyraflufen | Pinoxaden |
| 973 | Hexazinone | Metsulfuron | Flumioxazin | 1003 | Hexazinone | Diclosulam | Carfentrazone |
| 974 | Hexazinone | Metsulfuron | Metazachlor | 1004 | Hexazinone | Diclosulam | Flucarbazone |
| 975 | Hexazinone | Metsulfuron | Pinoxaden | 1005 | Hexazinone | Diclosulam | Sulfentrazone |
| 976 | Hexazinone | Metsulfuron | Pyraflufen | 1006 | Hexazinone | Diclosulam | Bromacil |
| 977 | Hexazinone | Metazachlor | Carfentrazone | 1007 | Hexazinone | Diclosulam | Saflufenacil |
| 978 | Hexazinone | Metazachlor | Flucarbazone | 1008 | Hexazinone | Diclosulam | Flumioxazin |
| 979 | Hexazinone | Metazachlor | Sulfentrazone | 1009 | Hexazinone | Diclosulam | Metazachlor |
| 980 | Hexazinone | Metazachlor | Bromacil | 1010 | Hexazinone | Diclosulam | Pinoxaden |
| 981 | Hexazinone | Metazachlor | Saflufenacil | 1011 | Hexazinone | Diclosulam | Pyraflufen |
| 982 | Hexazinone | Metazachlor | Flumioxazin | 1012 | Hexazinone | Penoxsulam | Carfentrazone |
| 983 | Hexazinone | Metazachlor | Metazachlor | 1013 | Hexazinone | Penoxsulam | Flucarbazone |
| 984 | Hexazinone | Metazachlor | Pinoxaden | 1014 | Hexazinone | Penoxsulam | Sulfentrazone |
| 985 | Hexazinone | Metazachlor | Pyraflufen | 1015 | Hexazinone | Penoxsulam | Bromacil |
| 986 | Hexazinone | Pinoxaden | Carfentrazone | 1016 | Hexazinone | Penoxsulam | Saflufenacil |
| 987 | Hexazinone | Pinoxaden | Flucarbazone | 1017 | Hexazinone | Penoxsulam | Flumioxazin |
| 988 | Hexazinone | Pinoxaden | Sulfentrazone | 1018 | Hexazinone | Penoxsulam | Metazachlor |
| 989 | Hexazinone | Pinoxaden | Bromacil | 1019 | Hexazinone | Penoxsulam | Pinoxaden |
| 990 | Hexazinone | Pinoxaden | Saflufenacil | 1020 | Hexazinone | Penoxsulam | Pyraflufen |
| 1021 | Metamitron | Imazamox | Carfentrazone | 1051 | Metamitron | Imazethapyr | Bromacil |
| 1022 | Metamitron | Imazamox | Flucarbazone | 1052 | Metamitron | Imazethapyr | Saflufenacil |
| 1023 | Metamitron | Imazamox | Sulfentrazone | 1053 | Metamitron | Imazethapyr | Flumioxazin |
| 1024 | Metamitron | Imazamox | Bromacil | 1054 | Metamitron | Imazethapyr | Metazachlor |
| 1025 | Metamitron | Imazamox | Saflufenacil | 1055 | Metamitron | Imazethapyr | Pinoxaden |
| 1026 | Metamitron | Imazamox | Flumioxazin | 1056 | Metamitron | Imazethapyr | Pyraflufen |
| 1027 | Metamitron | Imazamox | Metazachlor | 1057 | Metamitron | Carfentrazone | Carfentrazone |
| 1028 | Metamitron | Imazamox | Pinoxaden | 1058 | Metamitron | Carfentrazone | Flucarbazone |
| 1029 | Metamitron | Imazamox | Pyraflufen | 1059 | Metamitron | Carfentrazone | Sulfentrazone |
| 1030 | Metamitron | Imazapic | Carfentrazone | 1060 | Metamitron | Carfentrazone | Bromacil |
| 1031 | Metamitron | Imazapic | Flucarbazone | 1061 | Metamitron | Carfentrazone | Saflufenacil |
| 1032 | Metamitron | Imazapic | Sulfentrazone | 1062 | Metamitron | Carfentrazone | Flumioxazin |
| 1033 | Metamitron | Imazapic | Bromacil | 1063 | Metamitron | Carfentrazone | Metazachlor |
| 1034 | Metamitron | Imazapic | Saflufenacil | 1064 | Metamitron | Carfentrazone | Pinoxaden |
| 1035 | Metamitron | Imazapic | Flumioxazin | 1065 | Metamitron | Carfentrazone | Pyraflufen |
| 1036 | Metamitron | Imazapic | Metazachlor | 1066 | Metamitron | Flucarbazone | Carfentrazone |
| 1037 | Metamitron | Imazapic | Pinoxaden | 1067 | Metamitron | Flucarbazone | Flucarbazone |
| 1038 | Metamitron | Imazapic | Pyraflufen | 1068 | Metamitron | Flucarbazone | Sulfentrazone |
| 1039 | Metamitron | Imazapyr | Carfentrazone | 1069 | Metamitron | Flucarbazone | Bromacil |
| 1040 | Metamitron | Imazapyr | Flucarbazone | 1070 | Metamitron | Flucarbazone | Saflufenacil |
| 1041 | Metamitron | Imazapyr | Sulfentrazone | 1071 | Metamitron | Flucarbazone | Flumioxazin |
| 1042 | Metamitron | Imazapyr | Bromacil | 1072 | Metamitron | Flucarbazone | Metazachlor |
| 1043 | Metamitron | Imazapyr | Saflufenacil | 1073 | Metamitron | Flucarbazone | Pinoxaden |
| 1044 | Metamitron | Imazapyr | Flumioxazin | 1074 | Metamitron | Flucarbazone | Pyraflufen |
| 1045 | Metamitron | Imazapyr | Metazachlor | 1075 | Metamitron | Sulfentrazone | Carfentrazone |
| 1046 | Metamitron | Imazapyr | Pinoxaden | 1076 | Metamitron | Sulfentrazone | Flucarbazone |
| 1047 | Metamitron | Imazapyr | Pyraflufen | 1077 | Metamitron | Sulfentrazone | Amicarbazone |
| 1048 | Metamitron | Imazethapyr | Carfentrazone | 1078 | Metamitron | Sulfentrazone | Bromacil |
| 1049 | Metamitron | Imazethapyr | Flucarbazone | 1079 | Metamitron | Sulfentrazone | Saflufenacil |
| 1050 | Metamitron | Imazethapyr | Sulfentrazone | 1080 | Metamitron | Sulfentrazone | Flumioxazin |
| 1081 | Metamitron | Sulfentrazone | Metazachlor | 1111 | Metamitron | Pyrazosulfuron | Carfentrazone |
| 1082 | Metamitron | Sulfentrazone | Pinoxaden | 1112 | Metamitron | Pyrazosulfuron | Flucarbazone |
| 1083 | Metamitron | Sulfentrazone | Pyraflufen | 1113 | Metamitron | Pyrazosulfuron | Sulfentrazone |
| 1084 | Metamitron | Flucarbazone-sodium | Carfentrazone | 1114 | Metamitron | Pyrazosulfuron | Bromacil |
| 1085 | Metamitron | Flucarbazone-sodium | Flucarbazone | 1115 | Metamitron | Pyrazosulfuron | Saflufenacil |
| 1086 | Metamitron | Flucarbazone-sodium | Sulfentrazone | 1116 | Metamitron | Pyrazosulfuron | Flumioxazin |
| 1087 | Metamitron | Flucarbazone-sodium | Bromacil | 1117 | Metamitron | Pyrazosulfuron | Metazachlor |
| 1088 | Metamitron | Flucarbazone-sodium | Saflufenacil | 1118 | Metamitron | Pyrazosulfuron | Pinoxaden |
| 1089 | Metamitron | Flucarbazone-sodium | Flumioxazin | 1119 | Metamitron | Pyrazosulfuron | Pyraflufen |
| 1090 | Metamitron | Flucarbazone-sodium | Metazachlor | 1120 | Metamitron | Sulfosulfuron | Carfentrazone |

TABLE 1-continued

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 1091 | Metamitron | Flucarbazone-sodium | Pinoxaden | 1121 | Metamitron | Sulfosulfuron | Flucarbazone |
| 1092 | Metamitron | Flucarbazone-sodium | Pyraflufen | 1122 | Metamitron | Sulfosulfuron | Sulfentrazone |
| 1093 | Metamitron | Bensulfuron | Carfentrazone | 1123 | Metamitron | Sulfosulfuron | Bromacil |
| 1094 | Metamitron | Bensulfuron | Flucarbazone | 1124 | Metamitron | Sulfosulfuron | Saflufenacil |
| 1095 | Metamitron | Bensulfuron | Sulfentrazone | 1125 | Metamitron | Sulfosulfuron | Flumioxazin |
| 1096 | Metamitron | Bensulfuron | Bromacil | 1126 | Metamitron | Sulfosulfuron | Metazachlor |
| 1097 | Metamitron | Bensulfuron | Saflufenacil | 1127 | Metamitron | Sulfosulfuron | Pinoxaden |
| 1098 | Metamitron | Bensulfuron | Flumioxazin | 1128 | Metamitron | Sulfosulfuron | Pyraflufen |
| 1099 | Metamitron | Bensulfuron | Metazachlor | 1129 | Metamitron | Trifloxysulfuron | Carfentrazone |
| 1100 | Metamitron | Bensulfuron | Pinoxaden | 1130 | Metamitron | Trifloxysulfuron | Flucarbazone |
| 1101 | Metamitron | Bensulfuron | Pyraflufen | 1131 | Metamitron | Trifloxysulfuron | Sulfentrazone |
| 1102 | Metamitron | Halosulfuron | Carfentrazone | 1132 | Metamitron | Trifloxysulfuron | Bromacil |
| 1103 | Metamitron | Halosulfuron | Flucarbazone | 1133 | Metamitron | Trifloxysulfuron | Saflufenacil |
| 1104 | Metamitron | Halosulfuron | Sulfentrazone | 1134 | Metamitron | Trifloxysulfuron | Flumioxazin |
| 1105 | Metamitron | Halosulfuron | Bromacil | 1135 | Metamitron | Trifloxysulfuron | Metazachlor |
| 1106 | Metamitron | Halosulfuron | Saflufenacil | 1136 | Metamitron | Trifloxysulfuron | Pinoxaden |
| 1107 | Metamitron | Halosulfuron | Flumioxazin | 1137 | Metamitron | Trifloxysulfuron | Pyraflufen |
| 1108 | Metamitron | Halosulfuron | Metazachlor | 1138 | Metamitron | Metsulfuron | Carfentrazone |
| 1109 | Metamitron | Halosulfuron | Pinoxaden | 1139 | Metamitron | Metsulfuron | Flucarbazone |
| 1110 | Metamitron | Halosulfuron | Pyraflufen | 1140 | Metamitron | Metsulfuron | Sulfentrazone |
| 1141 | Metamitron | Metsulfuron | Bromacil | 1171 | Metamitron | Pyraflufen | Metazachlor |
| 1142 | Metamitron | Metsulfuron | Saflufenacil | 1172 | Metamitron | Pyraflufen | Pinoxaden |
| 1143 | Metamitron | Metsulfuron | Flumioxazin | 1173 | Metamitron | Diclosulam | Carfentrazone |
| 1144 | Metamitron | Metsulfuron | Metazachlor | 1174 | Metamitron | Diclosulam | Flucarbazone |
| 1145 | Metamitron | Metsulfuron | Pinoxaden | 1175 | Metamitron | Diclosulam | Sulfentrazone |
| 1146 | Metamitron | Metsulfuron | Pyraflufen | 1176 | Metamitron | Diclosulam | Bromacil |
| 1147 | Metamitron | Metazachlor | Carfentrazone | 1177 | Metamitron | Diclosulam | Saflufenacil |
| 1148 | Metamitron | Metazachlor | Flucarbazone | 1178 | Metamitron | Diclosulam | Flumioxazin |
| 1149 | Metamitron | Metazachlor | Sulfentrazone | 1179 | Metamitron | Diclosulam | Metazachlor |
| 1150 | Metamitron | Metazachlor | Bromacil | 1180 | Metamitron | Diclosulam | Pinoxaden |
| 1151 | Metamitron | Metazachlor | Saflufenacil | 1181 | Metamitron | Diclosulam | Pyraflufen |
| 1152 | Metamitron | Metazachlor | Flumioxazin | 1182 | Metamitron | Penoxsulam | Carfentrazone |
| 1153 | Metamitron | Metazachlor | Metazachlor | 1183 | Metamitron | Penoxsulam | Flucarbazone |
| 1154 | Metamitron | Metazachlor | Pinoxaden | 1184 | Metamitron | Penoxsulam | Sulfentrazone |
| 1155 | Metamitron | Metazachlor | Pyraflufen | 1185 | Metamitron | Penoxsulam | Bromacil |
| 1156 | Metamitron | Pinoxaden | Carfentrazone | 1186 | Metamitron | Penoxsulam | Saflufenacil |
| 1157 | Metamitron | Pinoxaden | Flucarbazone | 1187 | Metamitron | Penoxsulam | Flumioxazin |
| 1158 | Metamitron | Pinoxaden | Sulfentrazone | 1188 | Metamitron | Penoxsulam | Metazachlor |
| 1159 | Metamitron | Pinoxaden | Bromacil | 1189 | Metamitron | Penoxsulam | Pinoxaden |
| 1160 | Metamitron | Pinoxaden | Saflufenacil | 1190 | Metamitron | Penoxsulam | Pyraflufen |
| 1161 | Metamitron | Pinoxaden | Flumioxazin | 1191 | Metribuzin | Imazamox | Carfentrazone |
| 1162 | Metamitron | Pinoxaden | Metazachlor | 1192 | Metribuzin | Imazamox | Flucarbazone |
| 1163 | Metamitron | Pinoxaden | Pinoxaden | 1193 | Metribuzin | Imazamox | Sulfentrazone |
| 1164 | Metamitron | Pinoxaden | Pyraflufen | 1194 | Metribuzin | Imazamox | Bromacil |
| 1165 | Metamitron | Pyraflufen | Carfentrazone | 1195 | Metribuzin | Imazamox | Saflufenacil |
| 1166 | Metamitron | Pyraflufen | Flucarbazone | 1196 | Metribuzin | Imazamox | Flumioxazin |
| 1167 | Metamitron | Pyraflufen | Sulfentrazone | 1197 | Metribuzin | Imazamox | Metazachlor |
| 1168 | Metamitron | Pyraflufen | Bromacil | 1198 | Metribuzin | Imazamox | Pinoxaden |
| 1169 | Metamitron | Pyraflufen | Saflufenacil | 1199 | Metribuzin | Imazamox | Pyraflufen |
| 1170 | Metamitron | Pyraflufen | Flumioxazin | 1200 | Metribuzin | Imazapic | Carfentrazone |
| 1201 | Metribuzin | Imazapic | Flucarbazone | 1231 | Metribuzin | Carfentrazone | Saflufenacil |
| 1202 | Metribuzin | Imazapic | Sulfentrazone | 1232 | Metribuzin | Carfentrazone | Flumioxazin |
| 1203 | Metribuzin | Imazapic | Bromacil | 1233 | Metribuzin | Carfentrazone | Metazachlor |
| 1204 | Metribuzin | Imazapic | Saflufenacil | 1234 | Metribuzin | Carfentrazone | Pinoxaden |
| 1205 | Metribuzin | Imazapic | Flumioxazin | 1235 | Metribuzin | Carfentrazone | Pyraflufen |
| 1206 | Metribuzin | Imazapic | Metazachlor | 1236 | Metribuzin | Flucarbazone | Carfentrazone |
| 1207 | Metribuzin | Imazapic | Pinoxaden | 1237 | Metribuzin | Flucarbazone | Flucarbazone |
| 1208 | Metribuzin | Imazapic | Pyraflufen | 1238 | Metribuzin | Flucarbazone | Sulfentrazone |
| 1209 | Metribuzin | Imazapyr | Carfentrazone | 1239 | Metribuzin | Flucarbazone | Bromacil |
| 1210 | Metribuzin | Imazapyr | Flucarbazone | 1240 | Metribuzin | Flucarbazone | Saflufenacil |
| 1211 | Metribuzin | Imazapyr | Sulfentrazone | 1241 | Metribuzin | Flucarbazone | Flumioxazin |
| 1212 | Metribuzin | Imazapyr | Bromacil | 1242 | Metribuzin | Flucarbazone | Metazachlor |
| 1213 | Metribuzin | Imazapyr | Saflufenacil | 1243 | Metribuzin | Flucarbazone | Pinoxaden |
| 1214 | Metribuzin | Imazapyr | Flumioxazin | 1244 | Metribuzin | Flucarbazone | Pyraflufen |
| 1215 | Metribuzin | Imazapyr | Metazachlor | 1245 | Metribuzin | Sulfentrazone | Carfentrazone |
| 1216 | Metribuzin | Imazapyr | Pinoxaden | 1246 | Metribuzin | Sulfentrazone | Flucarbazone |
| 1217 | Metribuzin | Imazapyr | Pyraflufen | 1247 | Metribuzin | Sulfentrazone | Amicarbazone |
| 1218 | Metribuzin | Imazethapyr | Carfentrazone | 1248 | Metribuzin | Sulfentrazone | Bromacil |
| 1219 | Metribuzin | Imazethapyr | Flucarbazone | 1249 | Metribuzin | Sulfentrazone | Saflufenacil |
| 1220 | Metribuzin | Imazethapyr | Sulfentrazone | 1250 | Metribuzin | Sulfentrazone | Flumioxazin |
| 1221 | Metribuzin | Imazethapyr | Bromacil | 1251 | Metribuzin | Sulfentrazone | Metazachlor |
| 1222 | Metribuzin | Imazethapyr | Saflufenacil | 1252 | Metribuzin | Sulfentrazone | Pinoxaden |
| 1223 | Metribuzin | Imazethapyr | Flumioxazin | 1253 | Metribuzin | Sulfentrazone | Pyraflufen |

TABLE 1-continued

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 1224 | Metribuzin | Imazethapyr | Metazachlor | 1254 | Metribuzin | Flucarbazone-sodium | Carfentrazone |
| 1225 | Metribuzin | Imazethapyr | Pinoxaden | 1255 | Metribuzin | Flucarbazone-sodium | Flucarbazone |
| 1226 | Metribuzin | Imazethapyr | Pyraflufen | 1256 | Metribuzin | Flucarbazone-sodium | Sulfentrazone |
| 1227 | Metribuzin | Carfentrazone | Carfentrazone | 1257 | Metribuzin | Flucarbazone-sodium | Bromacil |
| 1228 | Metribuzin | Carfentrazone | Flucarbazone | 1258 | Metribuzin | Flucarbazone-sodium | Saflufenacil |
| 1229 | Metribuzin | Carfentrazone | Sulfentrazone | 1259 | Metribuzin | Flucarbazone-sodium | Flumioxazin |
| 1230 | Metribuzin | Carfentrazone | Bromacil | 1260 | Metribuzin | Flucarbazone-sodium | Metazachlor |
| 1261 | Metribuzin | Flucarbazone-sodium | Pinoxaden | 1291 | Metribuzin | Sulfosulfuron | Flucarbazone |
| 1262 | Metribuzin | Flucarbazone-sodium | Pyraflufen | 1292 | Metribuzin | Sulfosulfuron | Sulfentrazone |
| 1263 | Metribuzin | Bensulfuron | Carfentrazone | 1293 | Metribuzin | Sulfosulfuron | Bromacil |
| 1264 | Metribuzin | Bensulfuron | Flucarbazone | 1294 | Metribuzin | Sulfosulfuron | Saflufenacil |
| 1265 | Metribuzin | Bensulfuron | Sulfentrazone | 1295 | Metribuzin | Sulfosulfuron | Flumioxazin |
| 1266 | Metribuzin | Bensulfuron | Bromacil | 1296 | Metribuzin | Sulfosulfuron | Metazachlor |
| 1267 | Metribuzin | Bensulfuron | Saflufenacil | 1297 | Metribuzin | Sulfosulfuron | Pinoxaden |
| 1268 | Metribuzin | Bensulfuron | Flumioxazin | 1298 | Metribuzin | Sulfosulfuron | Pyraflufen |
| 1269 | Metribuzin | Bensulfuron | Metazachlor | 1299 | Metribuzin | Trifloxysulfuron | Carfentrazone |
| 1270 | Metribuzin | Bensulfuron | Pinoxaden | 1300 | Metribuzin | Trifloxysulfuron | Flucarbazone |
| 1271 | Metribuzin | Bensulfuron | Pyraflufen | 1301 | Metribuzin | Trifloxysulfuron | Sulfentrazone |
| 1272 | Metribuzin | Halosulfuron | Carfentrazone | 1302 | Metribuzin | Trifloxysulfuron | Bromacil |
| 1273 | Metribuzin | Halosulfuron | Flucarbazone | 1303 | Metribuzin | Trifloxysulfuron | Saflufenacil |
| 1274 | Metribuzin | Halosulfuron | Sulfentrazone | 1304 | Metribuzin | Trifloxysulfuron | Flumioxazin |
| 1275 | Metribuzin | Halosulfuron | Bromacil | 1305 | Metribuzin | Trifloxysulfuron | Metazachlor |
| 1276 | Metribuzin | Halosulfuron | Saflufenacil | 1306 | Metribuzin | Trifloxysulfuron | Pinoxaden |
| 1277 | Metribuzin | Halosulfuron | Flumioxazin | 1307 | Metribuzin | Trifloxysulfuron | Pyraflufen |
| 1278 | Metribuzin | Halosulfuron | Metazachlor | 1308 | Metribuzin | Metsulfuron | Carfentrazone |
| 1279 | Metribuzin | Halosulfuron | Pinoxaden | 1309 | Metribuzin | Metsulfuron | Flucarbazone |
| 1280 | Metribuzin | Halosulfuron | Pyraflufen | 1310 | Metribuzin | Metsulfuron | Sulfentrazone |
| 1281 | Metribuzin | Pyrazosulfuron | Carfentrazone | 1311 | Metribuzin | Metsulfuron | Bromacil |
| 1282 | Metribuzin | Pyrazosulfuron | Flucarbazone | 1312 | Metribuzin | Metsulfuron | Saflufenacil |
| 1283 | Metribuzin | Pyrazosulfuron | Sulfentrazone | 1313 | Metribuzin | Metsulfuron | Flumioxazin |
| 1284 | Metribuzin | Pyrazosulfuron | Bromacil | 1314 | Metribuzin | Metsulfuron | Metazachlor |
| 1285 | Metribuzin | Pyrazosulfuron | Saflufenacil | 1315 | Metribuzin | Metsulfuron | Pinoxaden |
| 1286 | Metribuzin | Pyrazosulfuron | Flumioxazin | 1316 | Metribuzin | Metsulfuron | Pyraflufen |
| 1287 | Metribuzin | Pyrazosulfuron | Metazachlor | 1317 | Metribuzin | Metazachlor | Carfentrazone |
| 1288 | Metribuzin | Pyrazosulfuron | Pinoxaden | 1318 | Metribuzin | Metazachlor | Flucarbazone |
| 1289 | Metribuzin | Pyrazosulfuron | Pyraflufen | 1319 | Metribuzin | Metazachlor | Sulfentrazone |
| 1290 | Metribuzin | Sulfosulfuron | Carfentrazone | 1320 | Metribuzin | Metazachlor | Bromacil |
| 1321 | Metribuzin | Metazachlor | Saflufenacil | 1351 | Metribuzin | Diclosulam | Pyraflufen |
| 1322 | Metribuzin | Metazachlor | Flumioxazin | 1352 | Metribuzin | Penoxsulam | Carfentrazone |
| 1323 | Metribuzin | Metazachlor | Metazachlor | 1353 | Metribuzin | Penoxsulam | Flucarbazone |
| 1324 | Metribuzin | Metazachlor | Pinoxaden | 1354 | Metribuzin | Penoxsulam | Sulfentrazone |
| 1325 | Metribuzin | Metazachlor | Pyraflufen | 1355 | Metribuzin | Penoxsulam | Bromacil |
| 1326 | Metribuzin | Pinoxaden | Carfentrazone | 1356 | Metribuzin | Penoxsulam | Saflufenacil |
| 1327 | Metribuzin | Pinoxaden | Flucarbazone | 1357 | Metribuzin | Penoxsulam | Flumioxazin |
| 1328 | Metribuzin | Pinoxaden | Sulfentrazone | 1358 | Metribuzin | Penoxsulam | Metazachlor |
| 1329 | Metribuzin | Pinoxaden | Bromacil | 1359 | Metribuzin | Penoxsulam | Pinoxaden |
| 1330 | Metribuzin | Pinoxaden | Saflufenacil | 1360 | Metribuzin | Penoxsulam | Pyraflufen |
| 1331 | Metribuzin | Pinoxaden | Flumioxazin | 1361 | Bromacil | Imazamox | Carfentrazone |
| 1332 | Metribuzin | Pinoxaden | Metazachlor | 1362 | Bromacil | Imazamox | Flucarbazone |
| 1333 | Metribuzin | Pinoxaden | Pinoxaden | 1363 | Bromacil | Imazamox | Sulfentrazone |
| 1334 | Metribuzin | Pinoxaden | Pyraflufen | 1364 | Bromacil | Imazamox | Bromacil |
| 1335 | Metribuzin | Pyraflufen | Carfentrazone | 1365 | Bromacil | Imazamox | Saflufenacil |
| 1336 | Metribuzin | Pyraflufen | Flucarbazone | 1366 | Bromacil | Imazamox | Flumioxazin |
| 1337 | Metribuzin | Pyraflufen | Sulfentrazone | 1367 | Bromacil | Imazamox | Metazachlor |
| 1338 | Metribuzin | Pyraflufen | Bromacil | 1368 | Bromacil | Imazamox | Pinoxaden |
| 1339 | Metribuzin | Pyraflufen | Saflufenacil | 1369 | Bromacil | Imazamox | Pyraflufen |
| 1340 | Metribuzin | Pyraflufen | Flumioxazin | 1370 | Bromacil | Imazapic | Carfentrazone |
| 1341 | Metribuzin | Pyraflufen | Metazachlor | 1371 | Bromacil | Imazapic | Flucarbazone |
| 1342 | Metribuzin | Pyraflufen | Pinoxaden | 1372 | Bromacil | Imazapic | Sulfentrazone |
| 1343 | Metribuzin | Diclosulam | Carfentrazone | 1373 | Bromacil | Imazapic | Bromacil |
| 1344 | Metribuzin | Diclosulam | Flucarbazone | 1374 | Bromacil | Imazapic | Saflufenacil |
| 1345 | Metribuzin | Diclosulam | Sulfentrazone | 1375 | Bromacil | Imazapic | Flumioxazin |
| 1346 | Metribuzin | Diclosulam | Bromacil | 1376 | Bromacil | Imazapic | Metazachlor |
| 1347 | Metribuzin | Diclosulam | Saflufenacil | 1377 | Bromacil | Imazapic | Pinoxaden |
| 1348 | Metribuzin | Diclosulam | Flumioxazin | 1378 | Bromacil | Imazapic | Pyraflufen |
| 1349 | Metribuzin | Diclosulam | Metazachlor | 1379 | Bromacil | Imazapyr | Carfentrazone |

TABLE 1-continued

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 1350 | Metribuzin | Diclosulam | Pinoxaden | 1380 | Bromacil | Imazapyr | Flucarbazone |
| 1381 | Bromacil | Imazapyr | Sulfentrazone | 1411 | Bromacil | Flucarbazone | Flumioxazin |
| 1382 | Bromacil | Imazapyr | Bromacil | 1412 | Bromacil | Flucarbazone | Metazachlor |
| 1383 | Bromacil | Imazapyr | Saflufenacil | 1413 | Bromacil | Flucarbazone | Pinoxaden |
| 1384 | Bromacil | Imazapyr | Flumioxazin | 1414 | Bromacil | Flucarbazone | Pyraflufen |
| 1385 | Bromacil | Imazapyr | Metazachlor | 1415 | Bromacil | Sulfentrazone | Carfentrazone |
| 1386 | Bromacil | Imazapyr | Pinoxaden | 1416 | Bromacil | Sulfentrazone | Flucarbazone |
| 1387 | Bromacil | Imazapyr | Pyraflufen | 1417 | Bromacil | Sulfentrazone | Amicarbazone |
| 1388 | Bromacil | Imazethapyr | Carfentrazone | 1418 | Bromacil | Sulfentrazone | Bromacil |
| 1389 | Bromacil | Imazethapyr | Flucarbazone | 1419 | Bromacil | Sulfentrazone | Saflufenacil |
| 1390 | Bromacil | Imazethapyr | Sulfentrazone | 1420 | Bromacil | Sulfentrazone | Flumioxazin |
| 1391 | Bromacil | Imazethapyr | Bromacil | 1421 | Bromacil | Sulfentrazone | Metazachlor |
| 1392 | Bromacil | Imazethapyr | Saflufenacil | 1422 | Bromacil | Sulfentrazone | Pinoxaden |
| 1393 | Bromacil | Imazethapyr | Flumioxazin | 1423 | Bromacil | Sulfentrazone | Pyraflufen |
| 1394 | Bromacil | Imazethapyr | Metazachlor | 1424 | Bromacil | Flucarbazone-sodium | Carfentrazone |
| 1395 | Bromacil | Imazethapyr | Pinoxaden | 1425 | Bromacil | Flucarbazone-sodium | Flucarbazone |
| 1396 | Bromacil | Imazethapyr | Pyraflufen | 1426 | Bromacil | Flucarbazone-sodium | Sulfentrazone |
| 1397 | Bromacil | Carfentrazone | Carfentrazone | 1427 | Bromacil | Flucarbazone-sodium | Bromacil |
| 1398 | Bromacil | Carfentrazone | Flucarbazone | 1428 | Bromacil | Flucarbazone-sodium | Saflufenacil |
| 1399 | Bromacil | Carfentrazone | Sulfentrazone | 1429 | Bromacil | Flucarbazone-sodium | Flumioxazin |
| 1400 | Bromacil | Carfentrazone | Bromacil | 1430 | Bromacil | Flucarbazone-sodium | Metazachlor |
| 1401 | Bromacil | Carfentrazone | Saflufenacil | 1431 | Bromacil | Flucarbazone-sodium | Pinoxaden |
| 1402 | Bromacil | Carfentrazone | Flumioxazin | 1432 | Bromacil | Flucarbazone-sodium | Pyraflufen |
| 1403 | Bromacil | Carfentrazone | Metazachlor | 1433 | Bromacil | Bensulfuron | Carfentrazone |
| 1404 | Bromacil | Carfentrazone | Pinoxaden | 1434 | Bromacil | Bensulfuron | Flucarbazone |
| 1405 | Bromacil | Carfentrazone | Pyraflufen | 1435 | Bromacil | Bensulfuron | Sulfentrazone |
| 1406 | Bromacil | Flucarbazone | Carfentrazone | 1436 | Bromacil | Bensulfuron | Bromacil |
| 1407 | Bromacil | Flucarbazone | Flucarbazone | 1437 | Bromacil | Bensulfuron | Saflufenacil |
| 1408 | Bromacil | Flucarbazone | Sulfentrazone | 1438 | Bromacil | Bensulfuron | Flumioxazin |
| 1409 | Bromacil | Flucarbazone | Bromacil | 1439 | Bromacil | Bensulfuron | Metazachlor |
| 1410 | Bromacil | Flucarbazone | Saflufenacil | 1440 | Bromacil | Bensulfuron | Pinoxaden |
| 1441 | Bromacil | Bensulfuron | Pyraflufen | 1471 | Bromacil | Trifloxysulfuron | Sulfentrazone |
| 1442 | Bromacil | Halosulfuron | Carfentrazone | 1472 | Bromacil | Trifloxysulfuron | Bromacil |
| 1443 | Bromacil | Halosulfuron | Flucarbazone | 1473 | Bromacil | Trifloxysulfuron | Saflufenacil |
| 1444 | Bromacil | Halosulfuron | Sulfentrazone | 1474 | Bromacil | Trifloxysulfuron | Flumioxazin |
| 1445 | Bromacil | Halosulfuron | Bromacil | 1475 | Bromacil | Trifloxysulfuron | Metazachlor |
| 1446 | Bromacil | Halosulfuron | Saflufenacil | 1476 | Bromacil | Trifloxysulfuron | Pinoxaden |
| 1447 | Bromacil | Halosulfuron | Flumioxazin | 1477 | Bromacil | Trifloxysulfuron | Pyraflufen |
| 1448 | Bromacil | Halosulfuron | Metazachlor | 1478 | Bromacil | Metsulfuron | Carfentrazone |
| 1449 | Bromacil | Halosulfuron | Pinoxaden | 1479 | Bromacil | Metsulfuron | Flucarbazone |
| 1450 | Bromacil | Halosulfuron | Pyraflufen | 1480 | Bromacil | Metsulfuron | Sulfentrazone |
| 1451 | Bromacil | Pyrazosulfuron | Carfentrazone | 1481 | Bromacil | Metsulfuron | Bromacil |
| 1452 | Bromacil | Pyrazosulfuron | Flucarbazone | 1482 | Bromacil | Metsulfuron | Saflufenacil |
| 1453 | Bromacil | Pyrazosulfuron | Sulfentrazone | 1483 | Bromacil | Metsulfuron | Flumioxazin |
| 1454 | Bromacil | Pyrazosulfuron | Bromacil | 1484 | Bromacil | Metsulfuron | Metazachlor |
| 1455 | Bromacil | Pyrazosulfuron | Saflufenacil | 1485 | Bromacil | Metsulfuron | Pinoxaden |
| 1456 | Bromacil | Pyrazosulfuron | Flumioxazin | 1486 | Bromacil | Metsulfuron | Pyraflufen |
| 1457 | Bromacil | Pyrazosulfuron | Metazachlor | 1487 | Bromacil | Metazachlor | Carfentrazone |
| 1458 | Bromacil | Pyrazosulfuron | Pinoxaden | 1488 | Bromacil | Metazachlor | Flucarbazone |
| 1459 | Bromacil | Pyrazosulfuron | Pyraflufen | 1489 | Bromacil | Metazachlor | Sulfentrazone |
| 1460 | Bromacil | Sulfosulfuron | Carfentrazone | 1490 | Bromacil | Metazachlor | Bromacil |
| 1461 | Bromacil | Sulfosulfuron | Flucarbazone | 1491 | Bromacil | Metazachlor | Saflufenacil |
| 1462 | Bromacil | Sulfosulfuron | Sulfentrazone | 1492 | Bromacil | Metazachlor | Flumioxazin |
| 1463 | Bromacil | Sulfosulfuron | Bromacil | 1493 | Bromacil | Metazachlor | Metazachlor |
| 1464 | Bromacil | Sulfosulfuron | Saflufenacil | 1494 | Bromacil | Metazachlor | Pinoxaden |
| 1465 | Bromacil | Sulfosulfuron | Flumioxazin | 1495 | Bromacil | Metazachlor | Pyraflufen |
| 1466 | Bromacil | Sulfosulfuron | Metazachlor | 1496 | Bromacil | Pinoxaden | Carfentrazone |
| 1467 | Bromacil | Sulfosulfuron | Pinoxaden | 1497 | Bromacil | Pinoxaden | Flucarbazone |
| 1468 | Bromacil | Sulfosulfuron | Pyraflufen | 1498 | Bromacil | Pinoxaden | Sulfentrazone |
| 1469 | Bromacil | Trifloxysulfuron | Carfentrazone | 1499 | Bromacil | Pinoxaden | Bromacil |
| 1470 | Bromacil | Trifloxysulfuron | Flucarbazone | 1500 | Bromacil | Pinoxaden | Saflufenacil |
| 1501 | Bromacil | Pinoxaden | Flumioxazin | 1531 | Saflufenacil | Imazamox | Carfentrazone |
| 1502 | Bromacil | Pinoxaden | Metazachlor | 1532 | Saflufenacil | Imazamox | Flucarbazone |
| 1503 | Bromacil | Pinoxaden | Pinoxaden | 1533 | Saflufenacil | Imazamox | Sulfentrazone |
| 1504 | Bromacil | Pinoxaden | Pyraflufen | 1534 | Saflufenacil | Imazamox | Bromacil |
| 1505 | Bromacil | Pyraflufen | Carfentrazone | 1535 | Saflufenacil | Imazamox | Saflufenacil |

TABLE 1-continued

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 1506 | Bromacil | Pyraflufen | Flucarbazone | 1536 | Saflufenacil | Imazamox | Flumioxazin |
| 1507 | Bromacil | Pyraflufen | Sulfentrazone | 1537 | Saflufenacil | Imazamox | Metazachlor |
| 1508 | Bromacil | Pyraflufen | Bromacil | 1538 | Saflufenacil | Imazamox | Pinoxaden |
| 1509 | Bromacil | Pyraflufen | Saflufenacil | 1539 | Saflufenacil | Imazamox | Pyraflufen |
| 1510 | Bromacil | Pyraflufen | Flumioxazin | 1540 | Saflufenacil | Imazapic | Carfentrazone |
| 1511 | Bromacil | Pyraflufen | Metazachlor | 1541 | Saflufenacil | Imazapic | Flucarbazone |
| 1512 | Bromacil | Pyraflufen | Pinoxaden | 1542 | Saflufenacil | Imazapic | Sulfentrazone |
| 1513 | Bromacil | Diclosulam | Carfentrazone | 1543 | Saflufenacil | Imazapic | Bromacil |
| 1514 | Bromacil | Diclosulam | Flucarbazone | 1544 | Saflufenacil | Imazapic | Saflufenacil |
| 1515 | Bromacil | Diclosulam | Sulfentrazone | 1545 | Saflufenacil | Imazapic | Flumioxazin |
| 1516 | Bromacil | Diclosulam | Bromacil | 1546 | Saflufenacil | Imazapic | Metazachlor |
| 1517 | Bromacil | Diclosulam | Saflufenacil | 1547 | Saflufenacil | Imazapic | Pinoxaden |
| 1518 | Bromacil | Diclosulam | Flumioxazin | 1548 | Saflufenacil | Imazapic | Pyraflufen |
| 1519 | Bromacil | Diclosulam | Metazachlor | 1549 | Saflufenacil | Imazapyr | Carfentrazone |
| 1520 | Bromacil | Diclosulam | Pinoxaden | 1550 | Saflufenacil | Imazapyr | Flucarbazone |
| 1521 | Bromacil | Diclosulam | Pyraflufen | 1551 | Saflufenacil | Imazapyr | Sulfentrazone |
| 1522 | Bromacil | Penoxsulam | Carfentrazone | 1552 | Saflufenacil | Imazapyr | Bromacil |
| 1523 | Bromacil | Penoxsulam | Flucarbazone | 1553 | Saflufenacil | Imazapyr | Saflufenacil |
| 1524 | Bromacil | Penoxsulam | Sulfentrazone | 1554 | Saflufenacil | Imazapyr | Flumioxazin |
| 1525 | Bromacil | Penoxsulam | Bromacil | 1555 | Saflufenacil | Imazapyr | Metazachlor |
| 1526 | Bromacil | Penoxsulam | Saflufenacil | 1556 | Saflufenacil | Imazapyr | Pinoxaden |
| 1527 | Bromacil | Penoxsulam | Flumioxazin | 1557 | Saflufenacil | Imazapyr | Pyraflufen |
| 1528 | Bromacil | Penoxsulam | Metazachlor | 1558 | Saflufenacil | Imazethapyr | Carfentrazone |
| 1529 | Bromacil | Penoxsulam | Pinoxaden | 1559 | Saflufenacil | Imazethapyr | Flucarbazone |
| 1530 | Bromacil | Penoxsulam | Pyraflufen | 1560 | Saflufenacil | Imazethapyr | Sulfentrazone |
| 1561 | Saflufenacil | Imazethapyr | Bromacil | 1591 | Saflufenacil | Sulfentrazone | Metazachlor |
| 1562 | Saflufenacil | Imazethapyr | Saflufenacil | 1592 | Saflufenacil | Sulfentrazone | Pinoxaden |
| 1563 | Saflufenacil | Imazethapyr | Flumioxazin | 1593 | Saflufenacil | Sulfentrazone | Pyraflufen |
| 1564 | Saflufenacil | Imazethapyr | Metazachlor | 1594 | Saflufenacil | Flucarbazone-sodium | Carfentrazone |
| 1565 | Saflufenacil | Imazethapyr | Pinoxaden | 1595 | Saflufenacil | Flucarbazone-sodium | Flucarbazone |
| 1566 | Saflufenacil | Imazethapyr | Pyraflufen | 1596 | Saflufenacil | Flucarbazone-sodium | Sulfentrazone |
| 1567 | Saflufenacil | Carfentrazone | Carfentrazone | 1597 | Saflufenacil | Flucarbazone-sodium | Bromacil |
| 1568 | Saflufenacil | Carfentrazone | Flucarbazone | 1598 | Saflufenacil | Flucarbazone-sodium | Saflufenacil |
| 1569 | Saflufenacil | Carfentrazone | Sulfentrazone | 1599 | Saflufenacil | Flucarbazone-sodium | Flumioxazin |
| 1570 | Saflufenacil | Carfentrazone | Bromacil | 1600 | Saflufenacil | Flucarbazone-sodium | Metazachlor |
| 1571 | Saflufenacil | Carfentrazone | Saflufenacil | 1601 | Saflufenacil | Flucarbazone-sodium | Pinoxaden |
| 1572 | Saflufenacil | Carfentrazone | Flumioxazin | 1602 | Saflufenacil | Flucarbazone-sodium | Pyraflufen |
| 1573 | Saflufenacil | Carfentrazone | Metazachlor | 1603 | Saflufenacil | Bensulfuron | Carfentrazone |
| 1574 | Saflufenacil | Carfentrazone | Pinoxaden | 1604 | Saflufenacil | Bensulfuron | Flucarbazone |
| 1575 | Saflufenacil | Carfentrazone | Pyraflufen | 1605 | Saflufenacil | Bensulfuron | Sulfentrazone |
| 1576 | Saflufenacil | Flucarbazone | Carfentrazone | 1606 | Saflufenacil | Bensulfuron | Bromacil |
| 1577 | Saflufenacil | Flucarbazone | Flucarbazone | 1607 | Saflufenacil | Bensulfuron | Saflufenacil |
| 1578 | Saflufenacil | Flucarbazone | Sulfentrazone | 1608 | Saflufenacil | Bensulfuron | Flumioxazin |
| 1579 | Saflufenacil | Flucarbazone | Bromacil | 1609 | Saflufenacil | Bensulfuron | Metazachlor |
| 1580 | Saflufenacil | Flucarbazone | Saflufenacil | 1610 | Saflufenacil | Bensulfuron | Pinoxaden |
| 1581 | Saflufenacil | Flucarbazone | Flumioxazin | 16111 | Saflufenacil | Bensulfuron | Pyraflufen |
| 1582 | Saflufenacil | Flucarbazone | Metazachlor | 1612 | Saflufenacil | Halosulfuron | Carfentrazone |
| 1583 | Saflufenacil | Flucarbazone | Pinoxaden | 1613 | Saflufenacil | Halosulfuron | Flucarbazone |
| 1584 | Saflufenacil | Flucarbazone | Pyraflufen | 1614 | Saflufenacil | Halosulfuron | Sulfentrazone |
| 1585 | Saflufenacil | Sulfentrazone | Carfentrazone | 1615 | Saflufenacil | Halosulfuron | Bromacil |
| 1586 | Saflufenacil | Sulfentrazone | Flucarbazone | 1616 | Saflufenacil | Halosulfuron | Saflufenacil |
| 1587 | Saflufenacil | Sulfentrazone | Amicarbazone | 1617 | Saflufenacil | Halosulfuron | Flumioxazin |
| 1588 | Saflufenacil | Sulfentrazone | Bromacil | 1618 | Saflufenacil | Halosulfuron | Metazachlor |
| 1589 | Saflufenacil | Sulfentrazone | Saflufenacil | 1619 | Saflufenacil | Halosulfuron | Pinoxaden |
| 1590 | Saflufenacil | Sulfentrazone | Flumioxazin | 1620 | Saflufenacil | Halosulfuron | Pyraflufen |
| 1621 | Saflufenacil | Pyrazosulfuron | Carfentrazone | 1651 | Saflufenacil | Metsulfuron | Bromacil |
| 1622 | Saflufenacil | Pyrazosulfuron | Flucarbazone | 1652 | Saflufenacil | Metsulfuron | Saflufenacil |
| 1623 | Saflufenacil | Pyrazosulfuron | Sulfentrazone | 1653 | Saflufenacil | Metsulfuron | Flumioxazin |
| 1624 | Saflufenacil | Pyrazosulfuron | Bromacil | 1654 | Saflufenacil | Metsulfuron | Metazachlor |
| 1625 | Saflufenacil | Pyrazosulfuron | Saflufenacil | 1655 | Saflufenacil | Metsulfuron | Pinoxaden |
| 1626 | Saflufenacil | Pyrazosulfuron | Flumioxazin | 1656 | Saflufenacil | Metsulfuron | Pyraflufen |
| 1627 | Saflufenacil | Pyrazosulfuron | Metazachlor | 1657 | Saflufenacil | Metazachlor | Carfentrazone |
| 1628 | Saflufenacil | Pyrazosulfuron | Pinoxaden | 1658 | Saflufenacil | Metazachlor | Flucarbazone |
| 1629 | Saflufenacil | Pyrazosulfuron | Pyraflufen | 1659 | Saflufenacil | Metazachlor | Sulfentrazone |
| 1630 | Saflufenacil | Sulfosulfuron | Carfentrazone | 1660 | Saflufenacil | Metazachlor | Bromacil |
| 1631 | Saflufenacil | Sulfosulfuron | Flucarbazone | 1661 | Saflufenacil | Metazachlor | Saflufenacil |

TABLE 1-continued

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 1632 | Saflufenacil | Sulfosulfuron | Sulfentrazone | 1662 | Saflufenacil | Metazachlor | Flumioxazin |
| 1633 | Saflufenacil | Sulfosulfuron | Bromacil | 1663 | Saflufenacil | Metazachlor | Metazachlor |
| 1634 | Saflufenacil | Sulfosulfuron | Saflufenacil | 1664 | Saflufenacil | Metazachlor | Pinoxaden |
| 1635 | Saflufenacil | Sulfosulfuron | Flumioxazin | 1665 | Saflufenacil | Metazachlor | Pyraflufen |
| 1636 | Saflufenacil | Sulfosulfuron | Metazachlor | 1666 | Saflufenacil | Pinoxaden | Carfentrazone |
| 1637 | Saflufenacil | Sulfosulfuron | Pinoxaden | 1667 | Saflufenacil | Pinoxaden | Flucarbazone |
| 1638 | Saflufenacil | Sulfosulfuron | Pyraflufen | 1668 | Saflufenacil | Pinoxaden | Sulfentrazone |
| 1639 | Saflufenacil | Trifloxysulfuron | Carfentrazone | 1669 | Saflufenacil | Pinoxaden | Bromacil |
| 1640 | Saflufenacil | Trifloxysulfuron | Flucarbazone | 1670 | Saflufenacil | Pinoxaden | Saflufenacil |
| 1641 | Saflufenacil | Trifloxysulfuron | Sulfentrazone | 1671 | Saflufenacil | Pinoxaden | Flumioxazin |
| 1642 | Saflufenacil | Trifloxysulfuron | Bromacil | 1672 | Saflufenacil | Pinoxaden | Metazachlor |
| 1643 | Saflufenacil | Trifloxysulfuron | Saflufenacil | 1673 | Saflufenacil | Pinoxaden | Pinoxaden |
| 1644 | Saflufenacil | Trifloxysulfuron | Flumioxazin | 1674 | Saflufenacil | Pinoxaden | Pyraflufen |
| 1645 | Saflufenacil | Trifloxysulfuron | Metazachlor | 1675 | Saflufenacil | Pyraflufen | Carfentrazone |
| 1646 | Saflufenacil | Trifloxysulfuron | Pinoxaden | 1676 | Saflufenacil | Pyraflufen | Flucarbazone |
| 1647 | Saflufenacil | Trifloxysulfuron | Pyraflufen | 1677 | Saflufenacil | Pyraflufen | Sulfentrazone |
| 1648 | Saflufenacil | Metsulfuron | Carfentrazone | 1678 | Saflufenacil | Pyraflufen | Bromacil |
| 1649 | Saflufenacil | Metsulfuron | Flucarbazone | 1679 | Saflufenacil | Pyraflufen | Saflufenacil |
| 1650 | Saflufenacil | Metsulfuron | Sulfentrazone | 1680 | Saflufenacil | Pyraflufen | Flumioxazin |
| 1681 | Saflufenacil | Pyraflufen | Metazachlor | 1711 | Bentazone | Imazapic | Flucarbazone |
| 1682 | Saflufenacil | Pyraflufen | Pinoxaden | 1712 | Bentazone | Imazapic | Sulfentrazone |
| 1683 | Saflufenacil | Diclosulam | Carfentrazone | 1713 | Bentazone | Imazapic | Bromacil |
| 1684 | Saflufenacil | Diclosulam | Flucarbazone | 1714 | Bentazone | Imazapic | Saflufenacil |
| 1685 | Saflufenacil | Diclosulam | Sulfentrazone | 1715 | Bentazone | Imazapic | Flumioxazin |
| 1686 | Saflufenacil | Diclosulam | Bromacil | 1716 | Bentazone | Imazapic | Metazachlor |
| 1687 | Saflufenacil | Diclosulam | Saflufenacil | 1717 | Bentazone | Imazapic | Pinoxaden |
| 1688 | Saflufenacil | Diclosulam | Flumioxazin | 1718 | Bentazone | Imazapic | Pyraflufen |
| 1689 | Saflufenacil | Diclosulam | Metazachlor | 1719 | Bentazone | Imazapyr | Carfentrazone |
| 1690 | Saflufenacil | Diclosulam | Pinoxaden | 1720 | Bentazone | Imazapyr | Flucarbazone |
| 1691 | Saflufenacil | Diclosulam | Pyraflufen | 1721 | Bentazone | Imazapyr | Sulfentrazone |
| 1692 | Saflufenacil | Penoxsulam | Carfentrazone | 1722 | Bentazone | Imazapyr | Bromacil |
| 1693 | Saflufenacil | Penoxsulam | Flucarbazone | 1723 | Bentazone | Imazapyr | Saflufenacil |
| 1694 | Saflufenacil | Penoxsulam | Sulfentrazone | 1724 | Bentazone | Imazapyr | Flumioxazin |
| 1695 | Saflufenacil | Penoxsulam | Bromacil | 1725 | Bentazone | Imazapyr | Metazachlor |
| 1696 | Saflufenacil | Penoxsulam | Saflufenacil | 1726 | Bentazone | Imazapyr | Pinoxaden |
| 1697 | Saflufenacil | Penoxsulam | Flumioxazin | 1727 | Bentazone | Imazapyr | Pyraflufen |
| 1698 | Saflufenacil | Penoxsulam | Metazachlor | 1728 | Bentazone | Imazethapyr | Carfentrazone |
| 1699 | Saflufenacil | Penoxsulam | Pinoxaden | 1729 | Bentazone | Imazethapyr | Flucarbazone |
| 1700 | Saflufenacil | Penoxsulam | Pyraflufen | 1730 | Bentazone | Imazethapyr | Sulfentrazone |
| 1701 | Bentazone | Imazamox | Carfentrazone | 1731 | Bentazone | Imazethapyr | Bromacil |
| 1702 | Bentazone | Imazamox | Flucarbazone | 1732 | Bentazone | Imazethapyr | Saflufenacil |
| 1703 | Bentazone | Imazamox | Sulfentrazone | 1733 | Bentazone | Imazethapyr | Flumioxazin |
| 1704 | Bentazone | Imazamox | Bromacil | 1734 | Bentazone | Imazethapyr | Metazachlor |
| 1705 | Bentazone | Imazamox | Saflufenacil | 1735 | Bentazone | Imazethapyr | Pinoxaden |
| 1706 | Bentazone | Imazamox | Flumioxazin | 1736 | Bentazone | Imazethapyr | Pyraflufen |
| 1707 | Bentazone | Imazamox | Metazachlor | 1737 | Bentazone | Carfentrazone | Carfentrazone |
| 1708 | Bentazone | Imazamox | Pinoxaden | 1738 | Bentazone | Carfentrazone | Flucarbazone |
| 1709 | Bentazone | Imazamox | Pyraflufen | 1739 | Bentazone | Carfentrazone | Sulfentrazone |
| 1710 | Bentazone | Imazapic | Carfentrazone | 1740 | Bentazone | Carfentrazone | Bromacil |
| 1741 | Bentazone | Carfentrazone | Saflufenacil | 1771 | Bentazone | Flucarbazone-sodium | Pinoxaden |
| 1742 | Bentazone | Carfentrazone | Flumioxazin | 1772 | Bentazone | Flucarbazone-sodium | Pyraflufen |
| 1743 | Bentazone | Carfentrazone | Metazachlor | 1773 | Bentazone | Bensulfuron | Carfentrazone |
| 1744 | Bentazone | Carfentrazone | Pinoxaden | 1774 | Bentazone | Bensulfuron | Flucarbazone |
| 1745 | Bentazone | Carfentrazone | Pyraflufen | 1775 | Bentazone | Bensulfuron | Sulfentrazone |
| 1746 | Bentazone | Flucarbazone | Carfentrazone | 1776 | Bentazone | Bensulfuron | Bromacil |
| 1747 | Bentazone | Flucarbazone | Flucarbazone | 1777 | Bentazone | Bensulfuron | Saflufenacil |
| 1748 | Bentazone | Flucarbazone | Sulfentrazone | 1778 | Bentazone | Bensulfuron | Flumioxazin |
| 1749 | Bentazone | Flucarbazone | Bromacil | 1779 | Bentazone | Bensulfuron | Metazachlor |
| 1750 | Bentazone | Flucarbazone | Saflufenacil | 1780 | Bentazone | Bensulfuron | Pinoxaden |
| 1751 | Bentazone | Flucarbazone | Flumioxazin | 1781 | Bentazone | Bensulfuron | Pyraflufen |
| 1752 | Bentazone | Flucarbazone | Metazachlor | 1782 | Bentazone | Halosulfuron | Carfentrazone |
| 1753 | Bentazone | Flucarbazone | Pinoxaden | 1783 | Bentazone | Halosulfuron | Flucarbazone |
| 1754 | Bentazone | Flucarbazone | Pyraflufen | 1784 | Bentazone | Halosulfuron | Sulfentrazone |
| 1755 | Bentazone | Sulfentrazone | Carfentrazone | 1785 | Bentazone | Halosulfuron | Bromacil |
| 1756 | Bentazone | Sulfentrazone | Flucarbazone | 1786 | Bentazone | Halosulfuron | Saflufenacil |
| 1757 | Bentazone | Sulfentrazone | Amicarbazone | 1787 | Bentazone | Halosulfuron | Flumioxazin |
| 1758 | Bentazone | Sulfentrazone | Bromacil | 1788 | Bentazone | Halosulfuron | Metazachlor |
| 1759 | Bentazone | Sulfentrazone | Saflufenacil | 1789 | Bentazone | Halosulfuron | Pinoxaden |
| 1760 | Bentazone | Sulfentrazone | Flumioxazin | 1790 | Bentazone | Halosulfuron | Pyraflufen |
| 1761 | Bentazone | Sulfentrazone | Metazachlor | 1791 | Bentazone | Pyrazosulfuron | Carfentrazone |
| 1762 | Bentazone | Sulfentrazone | Pinoxaden | 1792 | Bentazone | Pyrazosulfuron | Flucarbazone |
| 1763 | Bentazone | Sulfentrazone | Pyraflufen | 1793 | Bentazone | Pyrazosulfuron | Sulfentrazone |

TABLE 1-continued

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 1764 | Bentazone | Flucarbazone-sodium | Carfentrazone | 1794 | Bentazone | Pyrazosulfuron | Bromacil |
| 1765 | Bentazone | Flucarbazone-sodium | Flucarbazone | 1795 | Bentazone | Pyrazosulfuron | Saflufenacil |
| 1766 | Bentazone | Flucarbazone-sodium | Sulfentrazone | 1796 | Bentazone | Pyrazosulfuron | Flumioxazin |
| 1767 | Bentazone | Flucarbazone-sodium | Bromacil | 1797 | Bentazone | Pyrazosulfuron | Metazachlor |
| 1768 | Bentazone | Flucarbazone-sodium | Saflufenacil | 1798 | Bentazone | Pyrazosulfuron | Pinoxaden |
| 1769 | Bentazone | Flucarbazone-sodium | Flumioxazin | 1799 | Bentazone | Pyrazosulfuron | Pyraflufen |
| 1770 | Bentazone | Flucarbazone-sodium | Metazachlor | 1800 | Bentazone | Sulfosulfuron | Carfentrazone |
| 1801 | Bentazone | Sulfosulfuron | Flucarbazone | 1831 | Bentazone | Metazachlor | Saflufenacil |
| 1802 | Bentazone | Sulfosulfuron | Sulfentrazone | 1832 | Bentazone | Metazachlor | Flumioxazin |
| 1803 | Bentazone | Sulfosulfuron | Bromacil | 1833 | Bentazone | Metazachlor | Metazachlor |
| 1804 | Bentazone | Sulfosulfuron | Saflufenacil | 1834 | Bentazone | Metazachlor | Pinoxaden |
| 1805 | Bentazone | Sulfosulfuron | Flumioxazin | 1835 | Bentazone | Metazachlor | Pyraflufen |
| 1806 | Bentazone | Sulfosulfuron | Metazachlor | 1836 | Bentazone | Pinoxaden | Carfentrazone |
| 1807 | Bentazone | Sulfosulfuron | Pinoxaden | 1837 | Bentazone | Pinoxaden | Flucarbazone |
| 1808 | Bentazone | Sulfosulfuron | Pyraflufen | 1838 | Bentazone | Pinoxaden | Sulfentrazone |
| 1809 | Bentazone | Trifloxysulfuron | Carfentrazone | 1839 | Bentazone | Pinoxaden | Bromacil |
| 1810 | Bentazone | Trifloxysulfuron | Flucarbazone | 1840 | Bentazone | Pinoxaden | Saflufenacil |
| 1811 | Bentazone | Trifloxysulfuron | Sulfentrazone | 1841 | Bentazone | Pinoxaden | Flumioxazin |
| 1812 | Bentazone | Trifloxysulfuron | Bromacil | 1842 | Bentazone | Pinoxaden | Metazachlor |
| 1813 | Bentazone | Trifloxysulfuron | Saflufenacil | 1843 | Bentazone | Pinoxaden | Pinoxaden |
| 1814 | Bentazone | Trifloxysulfuron | Flumioxazin | 1844 | Bentazone | Pinoxaden | Pyraflufen |
| 1815 | Bentazone | Trifloxysulfuron | Metazachlor | 1845 | Bentazone | Pyraflufen | Carfentrazone |
| 1816 | Bentazone | Trifloxysulfuron | Pinoxaden | 1846 | Bentazone | Pyraflufen | Flucarbazone |
| 1817 | Bentazone | Trifloxysulfuron | Pyraflufen | 1847 | Bentazone | Pyraflufen | Sulfentrazone |
| 1818 | Bentazone | Metsulfuron | Carfentrazone | 1848 | Bentazone | Pyraflufen | Bromacil |
| 1819 | Bentazone | Metsulfuron | Flucarbazone | 1849 | Bentazone | Pyraflufen | Saflufenacil |
| 1820 | Bentazone | Metsulfuron | Sulfentrazone | 1850 | Bentazone | Pyraflufen | Flumioxazin |
| 1821 | Bentazone | Metsulfuron | Bromacil | 1851 | Bentazone | Pyraflufen | Metazachlor |
| 1822 | Bentazone | Metsulfuron | Saflufenacil | 1852 | Bentazone | Pyraflufen | Pinoxaden |
| 1823 | Bentazone | Metsulfuron | Flumioxazin | 1853 | Bentazone | Diclosulam | Carfentrazone |
| 1824 | Bentazone | Metsulfuron | Metazachlor | 1854 | Bentazone | Diclosulam | Flucarbazone |
| 1825 | Bentazone | Metsulfuron | Pinoxaden | 1855 | Bentazone | Diclosulam | Sulfentrazone |
| 1826 | Bentazone | Metsulfuron | Pyraflufen | 1856 | Bentazone | Diclosulam | Bromacil |
| 1827 | Bentazone | Metazachlor | Carfentrazone | 1857 | Bentazone | Diclosulam | Saflufenacil |
| 1828 | Bentazone | Metazachlor | Flucarbazone | 1858 | Bentazone | Diclosulam | Flumioxazin |
| 1829 | Bentazone | Metazachlor | Sulfentrazone | 1859 | Bentazone | Diclosulam | Metazachlor |
| 1830 | Bentazone | Metazachlor | Bromacil | 1860 | Bentazone | Diclosulam | Pinoxaden |
| 1861 | Bentazone | Diclosulam | Pyraflufen | 1891 | Bentazone-sodium | Imazapyr | Sulfentrazone |
| 1862 | Bentazone | Penoxsulam | Carfentrazone | 1892 | Bentazone-sodium | Imazapyr | Bromacil |
| 1863 | Bentazone | Penoxsulam | Flucarbazone | 1893 | Bentazone-sodium | Imazapyr | Saflufenacil |
| 1864 | Bentazone | Penoxsulam | Sulfentrazone | 1894 | Bentazone-sodium | Imazapyr | Flumioxazin |
| 1865 | Bentazone | Penoxsulam | Bromacil | 1895 | Bentazone-sodium | Imazapyr | Metazachlor |
| 1866 | Bentazone | Penoxsulam | Saflufenacil | 1896 | Bentazone-sodium | Imazapyr | Pinoxaden |
| 1867 | Bentazone | Penoxsulam | Flumioxazin | 1897 | Bentazone-sodium | Imazapyr | Pyraflufen |
| 1868 | Bentazone | Penoxsulam | Metazachlor | 1898 | Bentazone-sodium | Imazethapyr | Carfentrazone |
| 1869 | Bentazone | Penoxsulam | Pinoxaden | 1899 | Bentazone-sodium | Imazethapyr | Flucarbazone |
| 1870 | Bentazone | Penoxsulam | Pyraflufen | 1900 | Bentazone-sodium | Imazethapyr | Sulfentrazone |
| 1871 | Bentazone-sodium | Imazamox | Carfentrazone | 1901 | Bentazone-sodium | Imazethapyr | Bromacil |
| 1872 | Bentazone-sodium | Imazamox | Flucarbazone | 1902 | Bentazone-sodium | Imazethapyr | Saflufenacil |
| 1873 | Bentazone-sodium | Imazamox | Sulfentrazone | 1903 | Bentazone-sodium | Imazethapyr | Flumioxazin |
| 1874 | Bentazone-sodium | Imazamox | Bromacil | 1904 | Bentazone-sodium | Imazethapyr | Metazachlor |
| 1875 | Bentazone-sodium | Imazamox | Saflufenacil | 1905 | Bentazone-sodium | Imazethapyr | Pinoxaden |

TABLE 1-continued

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 1876 | Bentazone-sodium | Imazamox | Flumioxazin | 1906 | Bentazone-sodium | Imazethapyr | Pyraflufen |
| 1877 | Bentazone-sodium | Imazamox | Metazachlor | 1907 | Bentazone-sodium | Carfentrazone | Carfentrazone |
| 1878 | Bentazone-sodium | Imazamox | Pinoxaden | 1908 | Bentazone-sodium | Carfentrazone | Flucarbazone |
| 1879 | Bentazone-sodium | Imazamox | Pyraflufen | 1909 | Bentazone-sodium | Carfentrazone | Sulfentrazone |
| 1880 | Bentazone-sodium | Imazapic | Carfentrazone | 1910 | Bentazone-sodium | Carfentrazone | Bromacil |
| 1881 | Bentazone-sodium | Imazapic | Flucarbazone | 1911 | Bentazone-sodium | Carfentrazone | Saflufenacil |
| 1882 | Bentazone-sodium | Imazapic | Sulfentrazone | 1912 | Bentazone-sodium | Carfentrazone | Flumioxazin |
| 1883 | Bentazone-sodium | Imazapic | Bromacil | 1913 | Bentazone-sodium | Carfentrazone | Metazachlor |
| 1884 | Bentazone-sodium | Imazapic | Saflufenacil | 1914 | Bentazone-sodium | Carfentrazone | Pinoxaden |
| 1885 | Bentazone-sodium | Imazapic | Flumioxazin | 1915 | Bentazone-sodium | Carfentrazone | Pyraflufen |
| 1886 | Bentazone-sodium | Imazapic | Metazachlor | 1916 | Bentazone-sodium | Flucarbazone | Carfentrazone |
| 1887 | Bentazone-sodium | Imazapic | Pinoxaden | 1917 | Bentazone-sodium | Flucarbazone | Flucarbazone |
| 1888 | Bentazone-sodium | Imazapic | Pyraflufen | 1918 | Bentazone-sodium | Flucarbazone | Sulfentrazone |
| 1889 | Bentazone-sodium | Imazapyr | Carfentrazone | 1919 | Bentazone-sodium | Flucarbazone | Bromacil |
| 1890 | Bentazone-sodium | Imazapyr | Flucarbazone | 1920 | Bentazone-sodium | Flucarbazone | Saflufenacil |
| 1921 | Bentazone-sodium | Flucarbazone | Flumioxazin | 1951 | Bentazone-sodium | Bensulfuron | Pyraflufen |
| 1922 | Bentazone-sodium | Flucarbazone | Metazachlor | 1952 | Bentazone-sodium | Halosulfuron | Carfentrazone |
| 1923 | Bentazone-sodium | Flucarbazone | Pinoxaden | 1953 | Bentazone-sodium | Halosulfuron | Flucarbazone |
| 1924 | Bentazone-sodium | Flucarbazone | Pyraflufen | 1954 | Bentazone-sodium | Halosulfuron | Sulfentrazone |
| 1925 | Bentazone-sodium | Sulfentrazone | Carfentrazone | 1955 | Bentazone-sodium | Halosulfuron | Bromacil |
| 1926 | Bentazone-sodium | Sulfentrazone | Flucarbazone | 1956 | Bentazone-sodium | Halosulfuron | Saflufenacil |
| 1927 | Bentazone-sodium | Sulfentrazone | Amicarbazone | 1957 | Bentazone-sodium | Halosulfuron | Flumioxazin |
| 1928 | Bentazone-sodium | Sulfentrazone | Bromacil | 1958 | Bentazone-sodium | Halosulfuron | Metazachlor |
| 1929 | Bentazone-sodium | Sulfentrazone | Saflufenacil | 1959 | Bentazone-sodium | Halosulfuron | Pinoxaden |
| 1930 | Bentazone-sodium | Sulfentrazone | Flumioxazin | 1960 | Bentazone-sodium | Halosulfuron | Pyraflufen |
| 1931 | Bentazone-sodium | Sulfentrazone | Metazachlor | 1961 | Bentazone-sodium | Pyrazosulfuron | Carfentrazone |
| 1932 | Bentazone-sodium | Sulfentrazone | Pinoxaden | 1962 | Bentazone-sodium | Pyrazosulfuron | Flucarbazone |
| 1933 | Bentazone-sodium | Sulfentrazone | Pyraflufen | 1963 | Bentazone-sodium | Pyrazosulfuron | Sulfentrazone |
| 1934 | Bentazone-sodium | Flucarbazone-sodium | Carfentrazone | 1964 | Bentazone-sodium | Pyrazosulfuron | Bromacil |
| 1935 | Bentazone-sodium | Flucarbazone-sodium | Flucarbazone | 1965 | Bentazone-sodium | Pyrazosulfuron | Saflufenacil |
| 1936 | Bentazone-sodium | Flucarbazone-sodium | Sulfentrazone | 1966 | Bentazone-sodium | Pyrazosulfuron | Flumioxazin |
| 1937 | Bentazone-sodium | Flucarbazone-sodium | Bromacil | 1967 | Bentazone-sodium | Pyrazosulfuron | Metazachlor |
| 1938 | Bentazone-sodium | Flucarbazone-sodium | Saflufenacil | 1968 | Bentazone-sodium | Pyrazosulfuron | Pinoxaden |
| 1939 | Bentazone-sodium | Flucarbazone-sodium | Flumioxazin | 1969 | Bentazone-sodium | Pyrazosulfuron | Pyraflufen |
| 1940 | Bentazone-sodium | Flucarbazone-sodium | Metazachlor | 1970 | Bentazone-sodium | Sulfosulfuron | Carfentrazone |
| 1941 | Bentazone-sodium | Flucarbazone-sodium | Pinoxaden | 1971 | Bentazone-sodium | Sulfosulfuron | Flucarbazone |
| 1942 | Bentazone-sodium | Flucarbazone-sodium | Pyraflufen | 1972 | Bentazone-sodium | Sulfosulfuron | Sulfentrazone |

TABLE 1-continued

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 1943 | Bentazone-sodium | Bensulfuron | Carfentrazone | 1973 | Bentazone-sodium | Sulfosulfuron | Bromacil |
| 1944 | Bentazone-sodium | Bensulfuron | Flucarbazone | 1974 | Bentazone-sodium | Sulfosulfuron | Saflufenacil |
| 1945 | Bentazone-sodium | Bensulfuron | Sulfentrazone | 1975 | Bentazone-sodium | Sulfosulfuron | Flumioxazin |
| 1946 | Bentazone-sodium | Bensulfuron | Bromacil | 1976 | Bentazone-sodium | Sulfosulfuron | Metazachlor |
| 1947 | Bentazone-sodium | Bensulfuron | Saflufenacil | 1977 | Bentazone-sodium | Sulfosulfuron | Pinoxaden |
| 1948 | Bentazone-sodium | Bensulfuron | Flumioxazin | 1978 | Bentazone-sodium | Sulfosulfuron | Pyraflufen |
| 1949 | Bentazone-sodium | Bensulfuron | Metazachlor | 1979 | Bentazone-sodium | Trifloxysulfuron | Carfentrazone |
| 1950 | Bentazone-sodium | Bensulfuron | Pinoxaden | 1980 | Bentazone-sodium | Trifloxysulfuron | Flucarbazone |
| 1981 | Bentazone-sodium | Trifloxysulfuron | Sulfentrazone | 2011 | Bentazone-sodium | Pinoxaden | Flumioxazin |
| 1982 | Bentazone-sodium | Trifloxysulfuron | Bromacil | 2012 | Bentazone-sodium | Pinoxaden | Metazachlor |
| 1983 | Bentazone-sodium | Trifloxysulfuron | Saflufenacil | 2013 | Bentazone-sodium | Pinoxaden | Pinoxaden |
| 1984 | Bentazone-sodium | Trifloxysulfuron | Flumioxazin | 2014 | Bentazone-sodium | Pinoxaden | Pyraflufen |
| 1985 | Bentazone-sodium | Trifloxysulfuron | Metazachlor | 2015 | Bentazone-sodium | Pyraflufen | Carfentrazone |
| 1986 | Bentazone-sodium | Trifloxysulfuron | Pinoxaden | 2016 | Bentazone-sodium | Pyraflufen | Flucarbazone |
| 1987 | Bentazone-sodium | Trifloxysulfuron | Pyraflufen | 2017 | Bentazone-sodium | Pyraflufen | Sulfentrazone |
| 1988 | Bentazone-sodium | Metsulfuron | Carfentrazone | 2018 | Bentazone-sodium | Pyraflufen | Bromacil |
| 1989 | Bentazone-sodium | Metsulfuron | Flucarbazone | 2019 | Bentazone-sodium | Pyraflufen | Saflufenacil |
| 1990 | Bentazone-sodium | Metsulfuron | Sulfentrazone | 2020 | Bentazone-sodium | Pyraflufen | Flumioxazin |
| 1991 | Bentazone-sodium | Metsulfuron | Bromacil | 2021 | Bentazone-sodium | Pyraflufen | Metazachlor |
| 1992 | Bentazone-sodium | Metsulfuron | Saflufenacil | 2022 | Bentazone-sodium | Pyraflufen | Pinoxaden |
| 1993 | Bentazone-sodium | Metsulfuron | Flumioxazin | 2023 | Bentazone-sodium | Diclosulam | Carfentrazone |
| 1994 | Bentazone-sodium | Metsulfuron | Metazachlor | 2024 | Bentazone-sodium | Diclosulam | Flucarbazone |
| 1995 | Bentazone-sodium | Metsulfuron | Pinoxaden | 2025 | Bentazone-sodium | Diclosulam | Sulfentrazone |
| 1996 | Bentazone-sodium | Metsulfuron | Pyraflufen | 2026 | Bentazone-sodium | Diclosulam | Bromacil |
| 1997 | Bentazone-sodium | Metazachlor | Carfentrazone | 2027 | Bentazone-sodium | Diclosulam | Saflufenacil |
| 1998 | Bentazone-sodium | Metazachlor | Flucarbazone | 2028 | Bentazone-sodium | Diclosulam | Flumioxazin |
| 1999 | Bentazone-sodium | Metazachlor | Sulfentrazone | 2029 | Bentazone-sodium | Diclosulam | Metazachlor |
| 2000 | Bentazone-sodium | Metazachlor | Bromacil | 2030 | Bentazone-sodium | Diclosulam | Pinoxaden |
| 2001 | Bentazone-sodium | Metazachlor | Saflufenacil | 2031 | Bentazone-sodium | Diclosulam | Pyraflufen |
| 2002 | Bentazone-sodium | Metazachlor | Flumioxazin | 2032 | Bentazone-sodium | Penoxsulam | Carfentrazone |
| 2003 | Bentazone-sodium | Metazachlor | Metazachlor | 2033 | Bentazone-sodium | Penoxsulam | Flucarbazone |
| 2004 | Bentazone-sodium | Metazachlor | Pinoxaden | 2034 | Bentazone-sodium | Penoxsulam | Sulfentrazone |
| 2005 | Bentazone-sodium | Metazachlor | Pyraflufen | 2035 | Bentazone-sodium | Penoxsulam | Bromacil |
| 2006 | Bentazone-sodium | Pinoxaden | Carfentrazone | 2036 | Bentazone-sodium | Penoxsulam | Saflufenacil |
| 2007 | Bentazone-sodium | Pinoxaden | Flucarbazone | 2037 | Bentazone-sodium | Penoxsulam | Flumioxazin |
| 2008 | Bentazone-sodium | Pinoxaden | Sulfentrazone | 2038 | Bentazone-sodium | Penoxsulam | Metazachlor |
| 2009 | Bentazone-sodium | Pinoxaden | Bromacil | 2039 | Bentazone-sodium | Penoxsulam | Pinoxaden |

TABLE 1-continued

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 2010 | Bentazone-sodium | Pinoxaden | Saflufenacil | 2040 | Bentazone-sodium | Penoxsulam | Pyraflufen |
| 2041 | Bromoxynil | Imazamox | Carfentrazone | 2071 | Bromoxynil | Imazethapyr | Bromacil |
| 2042 | Bromoxynil | Imazamox | Flucarbazone | 2072 | Bromoxynil | Imazethapyr | Saflufenacil |
| 2043 | Bromoxynil | Imazamox | Sulfentrazone | 2073 | Bromoxynil | Imazethapyr | Flumioxazin |
| 2044 | Bromoxynil | Imazamox | Bromacil | 2074 | Bromoxynil | Imazethapyr | Metazachlor |
| 2045 | Bromoxynil | Imazamox | Saflufenacil | 2075 | Bromoxynil | Imazethapyr | Pinoxaden |
| 2046 | Bromoxynil | Imazamox | Flumioxazin | 2076 | Bromoxynil | Imazethapyr | Pyraflufen |
| 2047 | Bromoxynil | Imazamox | Metazachlor | 2077 | Bromoxynil | Carfentrazone | Carfentrazone |
| 2048 | Bromoxynil | Imazamox | Pinoxaden | 2078 | Bromoxynil | Carfentrazone | Flucarbazone |
| 2049 | Bromoxynil | Imazamox | Pyraflufen | 2079 | Bromoxynil | Carfentrazone | Sulfentrazone |
| 2050 | Bromoxynil | Imazapic | Carfentrazone | 2080 | Bromoxynil | Carfentrazone | Bromacil |
| 2051 | Bromoxynil | Imazapic | Flucarbazone | 2081 | Bromoxynil | Carfentrazone | Saflufenacil |
| 2052 | Bromoxynil | Imazapic | Sulfentrazone | 2082 | Bromoxynil | Carfentrazone | Flumioxazin |
| 2053 | Bromoxynil | Imazapic | Bromacil | 2083 | Bromoxynil | Carfentrazone | Metazachlor |
| 2054 | Bromoxynil | Imazapic | Saflufenacil | 2084 | Bromoxynil | Carfentrazone | Pinoxaden |
| 2055 | Bromoxynil | Imazapic | Flumioxazin | 2085 | Bromoxynil | Carfentrazone | Pyraflufen |
| 2056 | Bromoxynil | Imazapic | Metazachlor | 2086 | Bromoxynil | Flucarbazone | Carfentrazone |
| 2057 | Bromoxynil | Imazapic | Pinoxaden | 2087 | Bromoxynil | Flucarbazone | Flucarbazone |
| 2058 | Bromoxynil | Imazapic | Pyraflufen | 2088 | Bromoxynil | Flucarbazone | Sulfentrazone |
| 2059 | Bromoxynil | Imazapyr | Carfentrazone | 2089 | Bromoxynil | Flucarbazone | Bromacil |
| 2060 | Bromoxynil | Imazapyr | Flucarbazone | 2090 | Bromoxynil | Flucarbazone | Saflufenacil |
| 2061 | Bromoxynil | Imazapyr | Sulfentrazone | 2091 | Bromoxynil | Flucarbazone | Flumioxazin |
| 2062 | Bromoxynil | Imazapyr | Bromacil | 2092 | Bromoxynil | Flucarbazone | Metazachlor |
| 2063 | Bromoxynil | Imazapyr | Saflufenacil | 2093 | Bromoxynil | Flucarbazone | Pinoxaden |
| 2064 | Bromoxynil | Imazapyr | Flumioxazin | 2094 | Bromoxynil | Flucarbazone | Pyraflufen |
| 2065 | Bromoxynil | Imazapyr | Metazachlor | 2095 | Bromoxynil | Sulfentrazone | Carfentrazone |
| 2066 | Bromoxynil | Imazapyr | Pinoxaden | 2096 | Bromoxynil | Sulfentrazone | Flucarbazone |
| 2067 | Bromoxynil | Imazapyr | Pyraflufen | 2097 | Bromoxynil | Sulfentrazone | Amicarbazone |
| 2068 | Bromoxynil | Imazethapyr | Carfentrazone | 2098 | Bromoxynil | Sulfentrazone | Bromacil |
| 2069 | Bromoxynil | Imazethapyr | Flucarbazone | 2099 | Bromoxynil | Sulfentrazone | Saflufenacil |
| 2070 | Bromoxynil | Imazethapyr | Sulfentrazone | 2100 | Bromoxynil | Sulfentrazone | Flumioxazin |
| 2101 | Bromoxynil | Sulfentrazone | Metazachlor | 2131 | Bromoxynil | Pyrazosulfuron | Carfentrazone |
| 2102 | Bromoxynil | Sulfentrazone | Pinoxaden | 2132 | Bromoxynil | Pyrazosulfuron | Flucarbazone |
| 2103 | Bromoxynil | Sulfentrazone | Pyraflufen | 2133 | Bromoxynil | Pyrazosulfuron | Sulfentrazone |
| 2104 | Bromoxynil | Flucarbazone-sodium | Carfentrazone | 2134 | Bromoxynil | Pyrazosulfuron | Bromacil |
| 2105 | Bromoxynil | Flucarbazone-sodium | Flucarbazone | 2135 | Bromoxynil | Pyrazosulfuron | Saflufenacil |
| 2106 | Bromoxynil | Flucarbazone-sodium | Sulfentrazone | 2136 | Bromoxynil | Pyrazosulfuron | Flumioxazin |
| 2107 | Bromoxynil | Flucarbazone-sodium | Bromacil | 2137 | Bromoxynil | Pyrazosulfuron | Metazachlor |
| 2108 | Bromoxynil | Flucarbazone-sodium | Saflufenacil | 2138 | Bromoxynil | Pyrazosulfuron | Pinoxaden |
| 2109 | Bromoxynil | Flucarbazone-sodium | Flumioxazin | 2139 | Bromoxynil | Pyrazosulfuron | Pyraflufen |
| 2110 | Bromoxynil | Flucarbazone-sodium | Metazachlor | 2140 | Bromoxynil | Sulfosulfuron | Carfentrazone |
| 2111 | Bromoxynil | Flucarbazone-sodium | Pinoxaden | 2141 | Bromoxynil | Sulfosulfuron | Flucarbazone |
| 2112 | Bromoxynil | Flucarbazone-sodium | Pyraflufen | 2142 | Bromoxynil | Sulfosulfuron | Sulfentrazone |
| 2113 | Bromoxynil | Bensulfuron | Carfentrazone | 2143 | Bromoxynil | Sulfosulfuron | Bromacil |
| 2114 | Bromoxynil | Bensulfuron | Flucarbazone | 2144 | Bromoxynil | Sulfosulfuron | Saflufenacil |
| 2115 | Bromoxynil | Bensulfuron | Sulfentrazone | 2145 | Bromoxynil | Sulfosulfuron | Flumioxazin |
| 2116 | Bromoxynil | Bensulfuron | Bromacil | 2146 | Bromoxynil | Sulfosulfuron | Metazachlor |
| 2117 | Bromoxynil | Bensulfuron | Saflufenacil | 2147 | Bromoxynil | Sulfosulfuron | Pinoxaden |
| 2118 | Bromoxynil | Bensulfuron | Flumioxazin | 2148 | Bromoxynil | Sulfosulfuron | Pyraflufen |
| 2119 | Bromoxynil | Bensulfuron | Metazachlor | 2149 | Bromoxynil | Trifloxysulfuron | Carfentrazone |
| 2120 | Bromoxynil | Bensulfuron | Pinoxaden | 2150 | Bromoxynil | Trifloxysulfuron | Flucarbazone |
| 2121 | Bromoxynil | Bensulfuron | Pyraflufen | 2151 | Bromoxynil | Trifloxysulfuron | Sulfentrazone |
| 2122 | Bromoxynil | Halosulfuron | Carfentrazone | 2152 | Bromoxynil | Trifloxysulfuron | Bromacil |
| 2123 | Bromoxynil | Halosulfuron | Flucarbazone | 2153 | Bromoxynil | Trifloxysulfuron | Saflufenacil |
| 2124 | Bromoxynil | Halosulfuron | Sulfentrazone | 2154 | Bromoxynil | Trifloxysulfuron | Flumioxazin |
| 2125 | Bromoxynil | Halosulfuron | Bromacil | 2155 | Bromoxynil | Trifloxysulfuron | Metazachlor |
| 2126 | Bromoxynil | Halosulfuron | Saflufenacil | 2156 | Bromoxynil | Trifloxysulfuron | Pinoxaden |
| 2127 | Bromoxynil | Halosulfuron | Flumioxazin | 2157 | Bromoxynil | Trifloxysulfuron | Pyraflufen |
| 2128 | Bromoxynil | Halosulfuron | Metazachlor | 2158 | Bromoxynil | Metsulfuron | Carfentrazone |
| 2129 | Bromoxynil | Halosulfuron | Pinoxaden | 2159 | Bromoxynil | Metsulfuron | Flucarbazone |
| 2130 | Bromoxynil | Halosulfuron | Pyraflufen | 2160 | Bromoxynil | Metsulfuron | Sulfentrazone |
| 2161 | Bromoxynil | Metsulfuron | Bromacil | 2191 | Bromoxynil | Pyraflufen | Metazachlor |
| 2162 | Bromoxynil | Metsulfuron | Saflufenacil | 2192 | Bromoxynil | Pyraflufen | Pinoxaden |
| 2163 | Bromoxynil | Metsulfuron | Flumioxazin | 2193 | Bromoxynil | Diclosulam | Carfentrazone |
| 2164 | Bromoxynil | Metsulfuron | Metazachlor | 2194 | Bromoxynil | Diclosulam | Flucarbazone |

TABLE 1-continued

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 2165 | Bromoxynil | Metsulfuron | Pinoxaden | 2195 | Bromoxynil | Diclosulam | Sulfentrazone |
| 2166 | Bromoxynil | Metsulfuron | Pyraflufen | 2196 | Bromoxynil | Diclosulam | Bromacil |
| 2167 | Bromoxynil | Metazachlor | Carfentrazone | 2197 | Bromoxynil | Diclosulam | Saflufenacil |
| 2168 | Bromoxynil | Metazachlor | Flucarbazone | 2198 | Bromoxynil | Diclosulam | Flumioxazin |
| 2169 | Bromoxynil | Metazachlor | Sulfentrazone | 2199 | Bromoxynil | Diclosulam | Metazachlor |
| 2170 | Bromoxynil | Metazachlor | Bromacil | 2200 | Bromoxynil | Diclosulam | Pinoxaden |
| 2171 | Bromoxynil | Metazachlor | Saflufenacil | 2201 | Bromoxynil | Diclosulam | Pyraflufen |
| 2172 | Bromoxynil | Metazachlor | Flumioxazin | 2202 | Bromoxynil | Penoxsulam | Carfentrazone |
| 2173 | Bromoxynil | Metazachlor | Metazachlor | 2203 | Bromoxynil | Penoxsulam | Flucarbazone |
| 2174 | Bromoxynil | Metazachlor | Pinoxaden | 2204 | Bromoxynil | Penoxsulam | Sulfentrazone |
| 2175 | Bromoxynil | Metazachlor | Pyraflufen | 2205 | Bromoxynil | Penoxsulam | Bromacil |
| 2176 | Bromoxynil | Pinoxaden | Carfentrazone | 2206 | Bromoxynil | Penoxsulam | Saflufenacil |
| 2177 | Bromoxynil | Pinoxaden | Flucarbazone | 2207 | Bromoxynil | Penoxsulam | Flumioxazin |
| 2178 | Bromoxynil | Pinoxaden | Sulfentrazone | 2208 | Bromoxynil | Penoxsulam | Metazachlor |
| 2179 | Bromoxynil | Pinoxaden | Bromacil | 2209 | Bromoxynil | Penoxsulam | Pinoxaden |
| 2180 | Bromoxynil | Pinoxaden | Saflufenacil | 2210 | Bromoxynil | Penoxsulam | Pyraflufen |
| 2181 | Bromoxynil | Pinoxaden | Flumioxazin | 2211 | Diuron | Imazamox | Carfentrazone |
| 2182 | Bromoxynil | Pinoxaden | Metazachlor | 2212 | Diuron | Imazamox | Flucarbazone |
| 2183 | Bromoxynil | Pinoxaden | Pinoxaden | 2213 | Diuron | Imazamox | Sulfentrazone |
| 2184 | Bromoxynil | Pinoxaden | Pyraflufen | 2214 | Diuron | Imazamox | Bromacil |
| 2185 | Bromoxynil | Pyraflufen | Carfentrazone | 2215 | Diuron | Imazamox | Saflufenacil |
| 2186 | Bromoxynil | Pyraflufen | Flucarbazone | 2216 | Diuron | Imazamox | Flumioxazin |
| 2187 | Bromoxynil | Pyraflufen | Sulfentrazone | 2217 | Diuron | Imazamox | Metazachlor |
| 2188 | Bromoxynil | Pyraflufen | Bromacil | 2218 | Diuron | Imazamox | Pinoxaden |
| 2189 | Bromoxynil | Pyraflufen | Saflufenacil | 2219 | Diuron | Imazamox | Pyraflufen |
| 2190 | Bromoxynil | Pyraflufen | Flumioxazin | 2220 | Diuron | Imazapic | Carfentrazone |
| 2221 | Diuron | Imazapic | Flucarbazone | 2251 | Diuron | Carfentrazone | Saflufenacil |
| 2222 | Diuron | Imazapic | Sulfentrazone | 2252 | Diuron | Carfentrazone | Flumioxazin |
| 2223 | Diuron | Imazapic | Bromacil | 2253 | Diuron | Carfentrazone | Metazachlor |
| 2224 | Diuron | Imazapic | Saflufenacil | 2254 | Diuron | Carfentrazone | Pinoxaden |
| 2225 | Diuron | Imazapic | Flumioxazin | 2255 | Diuron | Carfentrazone | Pyraflufen |
| 2226 | Diuron | Imazapic | Metazachlor | 2256 | Diuron | Flucarbazone | Carfentrazone |
| 2227 | Diuron | Imazapic | Pinoxaden | 2257 | Diuron | Flucarbazone | Flucarbazone |
| 2228 | Diuron | Imazapic | Pyraflufen | 2258 | Diuron | Flucarbazone | Sulfentrazone |
| 2229 | Diuron | Imazapyr | Carfentrazone | 2259 | Diuron | Flucarbazone | Bromacil |
| 2230 | Diuron | Imazapyr | Flucarbazone | 2260 | Diuron | Flucarbazone | Saflufenacil |
| 2231 | Diuron | Imazapyr | Sulfentrazone | 2261 | Diuron | Flucarbazone | Flumioxazin |
| 2232 | Diuron | Imazapyr | Bromacil | 2262 | Diuron | Flucarbazone | Metazachlor |
| 2233 | Diuron | Imazapyr | Saflufenacil | 2263 | Diuron | Flucarbazone | Pinoxaden |
| 2234 | Diuron | Imazapyr | Flumioxazin | 2264 | Diuron | Flucarbazone | Pyraflufen |
| 2235 | Diuron | Imazapyr | Metazachlor | 2265 | Diuron | Sulfentrazone | Carfentrazone |
| 2236 | Diuron | Imazapyr | Pinoxaden | 2266 | Diuron | Sulfentrazone | Flucarbazone |
| 2237 | Diuron | Imazapyr | Pyraflufen | 2267 | Diuron | Sulfentrazone | Amicarbazone |
| 2238 | Diuron | Imazethapyr | Carfentrazone | 2268 | Diuron | Sulfentrazone | Bromacil |
| 2239 | Diuron | Imazethapyr | Flucarbazone | 2269 | Diuron | Sulfentrazone | Saflufenacil |
| 2240 | Diuron | Imazethapyr | Sulfentrazone | 2270 | Diuron | Sulfentrazone | Flumioxazin |
| 2241 | Diuron | Imazethapyr | Bromacil | 2271 | Diuron | Sulfentrazone | Metazachlor |
| 2242 | Diuron | Imazethapyr | Saflufenacil | 2272 | Diuron | Sulfentrazone | Pinoxaden |
| 2243 | Diuron | Imazethapyr | Flumioxazin | 2273 | Diuron | Sulfentrazone | Pyraflufen |
| 2244 | Diuron | Imazethapyr | Metazachlor | 2274 | Diuron | Flucarbazone-sodium | Carfentrazone |
| 2245 | Diuron | Imazethapyr | Pinoxaden | 2275 | Diuron | Flucarbazone-sodium | Flucarbazone |
| 2246 | Diuron | Imazethapyr | Pyraflufen | 2276 | Diuron | Flucarbazone-sodium | Sulfentrazone |
| 2247 | Diuron | Carfentrazone | Carfentrazone | 2277 | Diuron | Flucarbazone-sodium | Bromacil |
| 2248 | Diuron | Carfentrazone | Flucarbazone | 2278 | Diuron | Flucarbazone-sodium | Saflufenacil |
| 2249 | Diuron | Carfentrazone | Sulfentrazone | 2279 | Diuron | Flucarbazone-sodium | Flumioxazin |
| 2250 | Diuron | Carfentrazone | Bromacil | 2280 | Diuron | Flucarbazone-sodium | Metazachlor |
| 2281 | Diuron | Flucarbazone-sodium | Pinoxaden | 2311 | Diuron | Sulfosulfuron | Flucarbazone |
| 2282 | Diuron | Flucarbazone-sodium | Pyraflufen | 2312 | Diuron | Sulfosulfuron | Sulfentrazone |
| 2283 | Diuron | Bensulfuron | Carfentrazone | 2313 | Diuron | Sulfosulfuron | Bromacil |
| 2284 | Diuron | Bensulfuron | Flucarbazone | 2314 | Diuron | Sulfosulfuron | Saflufenacil |
| 2285 | Diuron | Bensulfuron | Sulfentrazone | 2315 | Diuron | Sulfosulfuron | Flumioxazin |
| 2286 | Diuron | Bensulfuron | Bromacil | 2316 | Diuron | Sulfosulfuron | Metazachlor |
| 2287 | Diuron | Bensulfuron | Saflufenacil | 2317 | Diuron | Sulfosulfuron | Pinoxaden |
| 2288 | Diuron | Bensulfuron | Flumioxazin | 2318 | Diuron | Sulfosulfuron | Pyraflufen |
| 2289 | Diuron | Bensulfuron | Metazachlor | 2319 | Diuron | Trifloxysulfuron | Carfentrazone |
| 2290 | Diuron | Bensulfuron | Pinoxaden | 2320 | Diuron | Trifloxysulfuron | Flucarbazone |

TABLE 1-continued

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 2291 | Diuron | Bensulfuron | Pyraflufen | 2321 | Diuron | Trifloxysulfuron | Sulfentrazone |
| 2292 | Diuron | Halosulfuron | Carfentrazone | 2322 | Diuron | Trifloxysulfuron | Bromacil |
| 2293 | Diuron | Halosulfuron | Flucarbazone | 2323 | Diuron | Trifloxysulfuron | Saflufenacil |
| 2294 | Diuron | Halosulfuron | Sulfentrazone | 2324 | Diuron | Trifloxysulfuron | Flumioxazin |
| 2295 | Diuron | Halosulfuron | Bromacil | 2325 | Diuron | Trifloxysulfuron | Metazachlor |
| 2296 | Diuron | Halosulfuron | Saflufenacil | 2326 | Diuron | Trifloxysulfuron | Pinoxaden |
| 2297 | Diuron | Halosulfuron | Flumioxazin | 2327 | Diuron | Trifloxysulfuron | Pyraflufen |
| 2298 | Diuron | Halosulfuron | Metazachlor | 2328 | Diuron | Metsulfuron | Carfentrazone |
| 2299 | Diuron | Halosulfuron | Pinoxaden | 2329 | Diuron | Metsulfuron | Flucarbazone |
| 2300 | Diuron | Halosulfuron | Pyraflufen | 2330 | Diuron | Metsulfuron | Sulfentrazone |
| 2301 | Diuron | Pyrazosulfuron | Carfentrazone | 2331 | Diuron | Metsulfuron | Bromacil |
| 2302 | Diuron | Pyrazosulfuron | Flucarbazone | 2332 | Diuron | Metsulfuron | Saflufenacil |
| 2303 | Diuron | Pyrazosulfuron | Sulfentrazone | 2333 | Diuron | Metsulfuron | Flumioxazin |
| 2304 | Diuron | Pyrazosulfuron | Bromacil | 2334 | Diuron | Metsulfuron | Metazachlor |
| 2305 | Diuron | Pyrazosulfuron | Saflufenacil | 2335 | Diuron | Metsulfuron | Pinoxaden |
| 2306 | Diuron | Pyrazosulfuron | Flumioxazin | 2336 | Diuron | Metsulfuron | Pyraflufen |
| 2307 | Diuron | Pyrazosulfuron | Metazachlor | 2337 | Diuron | Metazachlor | Carfentrazone |
| 2308 | Diuron | Pyrazosulfuron | Pinoxaden | 2338 | Diuron | Metazachlor | Flucarbazone |
| 2309 | Diuron | Pyrazosulfuron | Pyraflufen | 2339 | Diuron | Metazachlor | Sulfentrazone |
| 2310 | Diuron | Sulfosulfuron | Carfentrazone | 2340 | Diuron | Metazachlor | Bromacil |
| 2341 | Diuron | Metazachlor | Saflufenacil | 2371 | Diuron | Diclosulam | Pyraflufen |
| 2342 | Diuron | Metazachlor | Flumioxazin | 2372 | Diuron | Penoxsulam | Carfentrazone |
| 2343 | Diuron | Metazachlor | Metazachlor | 2373 | Diuron | Penoxsulam | Flucarbazone |
| 2344 | Diuron | Metazachlor | Pinoxaden | 2374 | Diuron | Penoxsulam | Sulfentrazone |
| 2345 | Diuron | Metazachlor | Pyraflufen | 2375 | Diuron | Penoxsulam | Bromacil |
| 2346 | Diuron | Pinoxaden | Carfentrazone | 2376 | Diuron | Penoxsulam | Saflufenacil |
| 2347 | Diuron | Pinoxaden | Flucarbazone | 2377 | Diuron | Penoxsulam | Flumioxazin |
| 2348 | Diuron | Pinoxaden | Sulfentrazone | 2378 | Diuron | Penoxsulam | Metazachlor |
| 2349 | Diuron | Pinoxaden | Bromacil | 2379 | Diuron | Penoxsulam | Pinoxaden |
| 2350 | Diuron | Pinoxaden | Saflufenacil | 2380 | Diuron | Penoxsulam | Pyraflufen |
| 2351 | Diuron | Pinoxaden | Flumioxazin | 2381 | Linuron | Imazamox | Carfentrazone |
| 2352 | Diuron | Pinoxaden | Metazachlor | 2382 | Linuron | Imazamox | Flucarbazone |
| 2353 | Diuron | Pinoxaden | Pinoxaden | 2383 | Linuron | Imazamox | Sulfentrazone |
| 2354 | Diuron | Pinoxaden | Pyraflufen | 2384 | Linuron | Imazamox | Bromacil |
| 2355 | Diuron | Pyraflufen | Carfentrazone | 2385 | Linuron | Imazamox | Saflufenacil |
| 2356 | Diuron | Pyraflufen | Flucarbazone | 2386 | Linuron | Imazamox | Flumioxazin |
| 2357 | Diuron | Pyraflufen | Sulfentrazone | 2387 | Linuron | Imazamox | Metazachlor |
| 2358 | Diuron | Pyraflufen | Bromacil | 2388 | Linuron | Imazamox | Pinoxaden |
| 2359 | Diuron | Pyraflufen | Saflufenacil | 2389 | Linuron | Imazamox | Pyraflufen |
| 2360 | Diuron | Pyraflufen | Flumioxazin | 2390 | Linuron | Imazapic | Carfentrazone |
| 2361 | Diuron | Pyraflufen | Metazachlor | 2391 | Linuron | Imazapic | Flucarbazone |
| 2362 | Diuron | Pyraflufen | Pinoxaden | 2392 | Linuron | Imazapic | Sulfentrazone |
| 2363 | Diuron | Diclosulam | Carfentrazone | 2393 | Linuron | Imazapic | Bromacil |
| 2364 | Diuron | Diclosulam | Flucarbazone | 2394 | Linuron | Imazapic | Saflufenacil |
| 2365 | Diuron | Diclosulam | Sulfentrazone | 2395 | Linuron | Imazapic | Flumioxazin |
| 2366 | Diuron | Diclosulam | Bromacil | 2396 | Linuron | Imazapic | Metazachlor |
| 2367 | Diuron | Diclosulam | Saflufenacil | 2397 | Linuron | Imazapic | Pinoxaden |
| 2368 | Diuron | Diclosulam | Flumioxazin | 2398 | Linuron | Imazapic | Pyraflufen |
| 2369 | Diuron | Diclosulam | Metazachlor | 2399 | Linuron | Imazapyr | Carfentrazone |
| 2370 | Diuron | Diclosulam | Pinoxaden | 2400 | Linuron | Imazapyr | Flucarbazone |
| 2401 | Linuron | Imazapyr | Sulfentrazone | 2431 | Linuron | Flucarbazone | Flumioxazin |
| 2402 | Linuron | Imazapyr | Bromacil | 2432 | Linuron | Flucarbazone | Metazachlor |
| 2403 | Linuron | Imazapyr | Saflufenacil | 2433 | Linuron | Flucarbazone | Pinoxaden |
| 2404 | Linuron | Imazapyr | Flumioxazin | 2434 | Linuron | Flucarbazone | Pyraflufen |
| 2405 | Linuron | Imazapyr | Metazachlor | 2435 | Linuron | Sulfentrazone | Carfentrazone |
| 2406 | Linuron | Imazapyr | Pinoxaden | 2436 | Linuron | Sulfentrazone | Flucarbazone |
| 2407 | Linuron | Imazapyr | Pyraflufen | 2437 | Linuron | Sulfentrazone | Amicarbazone |
| 2408 | Linuron | Imazethapyr | Carfentrazone | 2438 | Linuron | Sulfentrazone | Bromacil |
| 2409 | Linuron | Imazethapyr | Flucarbazone | 2439 | Linuron | Sulfentrazone | Saflufenacil |
| 2410 | Linuron | Imazethapyr | Sulfentrazone | 2440 | Linuron | Sulfentrazone | Flumioxazin |
| 2411 | Linuron | Imazethapyr | Bromacil | 2441 | Linuron | Sulfentrazone | Metazachlor |
| 2412 | Linuron | Imazethapyr | Saflufenacil | 2442 | Linuron | Sulfentrazone | Pinoxaden |
| 2413 | Linuron | Imazethapyr | Flumioxazin | 2443 | Linuron | Sulfentrazone | Pyraflufen |
| 2414 | Linuron | Imazethapyr | Metazachlor | 2444 | Linuron | Flucarbazone-sodium | Carfentrazone |
| 2415 | Linuron | Imazethapyr | Pinoxaden | 2445 | Linuron | Flucarbazone-sodium | Flucarbazone |
| 2416 | Linuron | Imazethapyr | Pyraflufen | 2446 | Linuron | Flucarbazone-sodium | Sulfentrazone |
| 2417 | Linuron | Carfentrazone | Carfentrazone | 2447 | Linuron | Flucarbazone-sodium | Bromacil |
| 2418 | Linuron | Carfentrazone | Flucarbazone | 2448 | Linuron | Flucarbazone-sodium | Saflufenacil |
| 2419 | Linuron | Carfentrazone | Sulfentrazone | 2449 | Linuron | Flucarbazone-sodium | Flumioxazin |

TABLE 1-continued

| S No. | Photosystem II inhibitor | ALS inhibitor | Chlorophyll and Heme biosynthesis inhibitor | S No. | Photosystem II inhibitor | ALS inhibitor | Chlorophyll and Heme biosynthesis inhibitor |
|---|---|---|---|---|---|---|---|
| 2420 | Linuron | Carfentrazone | Bromacil | 2450 | Linuron | Flucarbazone-sodium | Metazachlor |
| 2421 | Linuron | Carfentrazone | Saflufenacil | 2451 | Linuron | Flucarbazone-sodium | Pinoxaden |
| 2422 | Linuron | Carfentrazone | Flumioxazin | 2452 | Linuron | Flucarbazone-sodium | Pyraflufen |
| 2423 | Linuron | Carfentrazone | Metazachlor | 2453 | Linuron | Bensulfuron | Carfentrazone |
| 2424 | Linuron | Carfentrazone | Pinoxaden | 2454 | Linuron | Bensulfuron | Flucarbazone |
| 2425 | Linuron | Carfentrazone | Pyraflufen | 2455 | Linuron | Bensulfuron | Sulfentrazone |
| 2426 | Linuron | Flucarbazone | Carfentrazone | 2456 | Linuron | Bensulfuron | Bromacil |
| 2427 | Linuron | Flucarbazone | Flucarbazone | 2457 | Linuron | Bensulfuron | Saflufenacil |
| 2428 | Linuron | Flucarbazone | Sulfentrazone | 2458 | Linuron | Bensulfuron | Flumioxazin |
| 2429 | Linuron | Flucarbazone | Bromacil | 2459 | Linuron | Bensulfuron | Metazachlor |
| 2430 | Linuron | Flucarbazone | Saflufenacil | 2460 | Linuron | Bensulfuron | Pinoxaden |
| 2461 | Linuron | Bensulfuron | Pyraflufen | 2491 | Linuron | Trifloxysulfuron | Sulfentrazone |
| 2462 | Linuron | Halosulfuron | Carfentrazone | 2492 | Linuron | Trifloxysulfuron | Bromacil |
| 2463 | Linuron | Halosulfuron | Flucarbazone | 2493 | Linuron | Trifloxysulfuron | Saflufenacil |
| 2464 | Linuron | Halosulfuron | Sulfentrazone | 2494 | Linuron | Trifloxysulfuron | Flumioxazin |
| 2465 | Linuron | Halosulfuron | Bromacil | 2495 | Linuron | Trifloxysulfuron | Metazachlor |
| 2466 | Linuron | Halosulfuron | Saflufenacil | 2496 | Linuron | Trifloxysulfuron | Pinoxaden |
| 2467 | Linuron | Halosulfuron | Flumioxazin | 2497 | Linuron | Trifloxysulfuron | Pyraflufen |
| 2468 | Linuron | Halosulfuron | Metazachlor | 2498 | Linuron | Metsulfuron | Carfentrazone |
| 2469 | Linuron | Halosulfuron | Pinoxaden | 2499 | Linuron | Metsulfuron | Flucarbazone |
| 2470 | Linuron | Halosulfuron | Pyraflufen | 2500 | Linuron | Metsulfuron | Sulfentrazone |
| 2471 | Linuron | Pyrazosulfuron | Carfentrazone | 2501 | Linuron | Metsulfuron | Bromacil |
| 2472 | Linuron | Pyrazosulfuron | Flucarbazone | 2502 | Linuron | Metsulfuron | Saflufenacil |
| 2473 | Linuron | Pyrazosulfuron | Sulfentrazone | 2503 | Linuron | Metsulfuron | Flumioxazin |
| 2474 | Linuron | Pyrazosulfuron | Bromacil | 2504 | Linuron | Metsulfuron | Metazachlor |
| 2475 | Linuron | Pyrazosulfuron | Saflufenacil | 2505 | Linuron | Metsulfuron | Pinoxaden |
| 2476 | Linuron | Pyrazosulfuron | Flumioxazin | 2506 | Linuron | Metsulfuron | Pyraflufen |
| 2477 | Linuron | Pyrazosulfuron | Metazachlor | 2507 | Linuron | Metazachlor | Carfentrazone |
| 2478 | Linuron | Pyrazosulfuron | Pinoxaden | 2508 | Linuron | Metazachlor | Flucarbazone |
| 2479 | Linuron | Pyrazosulfuron | Pyraflufen | 2509 | Linuron | Metazachlor | Sulfentrazone |
| 2480 | Linuron | Sulfosulfuron | Carfentrazone | 2510 | Linuron | Metazachlor | Bromacil |
| 2481 | Linuron | Sulfosulfuron | Flucarbazone | 2511 | Linuron | Metazachlor | Saflufenacil |
| 2482 | Linuron | Sulfosulfuron | Sulfentrazone | 2512 | Linuron | Metazachlor | Flumioxazin |
| 2483 | Linuron | Sulfosulfuron | Bromacil | 2513 | Linuron | Metazachlor | Metazachlor |
| 2484 | Linuron | Sulfosulfuron | Saflufenacil | 2514 | Linuron | Metazachlor | Pinoxaden |
| 2485 | Linuron | Sulfosulfuron | Flumioxazin | 2515 | Linuron | Metazachlor | Pyraflufen |
| 2486 | Linuron | Sulfosulfuron | Metazachlor | 2516 | Linuron | Pinoxaden | Carfentrazone |
| 2487 | Linuron | Sulfosulfuron | Pinoxaden | 2517 | Linuron | Pinoxaden | Flucarbazone |
| 2488 | Linuron | Sulfosulfuron | Pyraflufen | 2518 | Linuron | Pinoxaden | Sulfentrazone |
| 2489 | Linuron | Trifloxysulfuron | Carfentrazone | 2519 | Linuron | Pinoxaden | Bromacil |
| 2490 | Linuron | Trifloxysulfuron | Flucarbazone | 2520 | Linuron | Pinoxaden | Saflufenacil |
| 2521 | Linuron | Pinoxaden | Flumioxazin | 2536 | Linuron | Diclosulam | Bromacil |
| 2522 | Linuron | Pinoxaden | Metazachlor | 2537 | Linuron | Diclosulam | Saflufenacil |
| 2523 | Linuron | Pinoxaden | Pinoxaden | 2538 | Linuron | Diclosulam | Flumioxazin |
| 2524 | Linuron | Pinoxaden | Pyraflufen | 2539 | Linuron | Diclosulam | Metazachlor |
| 2525 | Linuron | Pyraflufen | Carfentrazone | 2540 | Linuron | Diclosulam | Pinoxaden |
| 2526 | Linuron | Pyraflufen | Flucarbazone | 2541 | Linuron | Diclosulam | Pyraflufen |
| 2527 | Linuron | Pyraflufen | Sulfentrazone | 2542 | Linuron | Penoxsulam | Carfentrazone |
| 2528 | Linuron | Pyraflufen | Bromacil | 2543 | Linuron | Penoxsulam | Flucarbazone |
| 2529 | Linuron | Pyraflufen | Saflufenacil | 2544 | Linuron | Penoxsulam | Sulfentrazone |
| 2530 | Linuron | Pyraflufen | Flumioxazin | 2545 | Linuron | Penoxsulam | Bromacil |
| 2531 | Linuron | Pyraflufen | Metazachlor | 2546 | Linuron | Penoxsulam | Saflufenacil |
| 2532 | Linuron | Pyraflufen | Pinoxaden | 2547 | Linuron | Penoxsulam | Flumioxazin |
| 2533 | Linuron | Diclosulam | Carfentrazone | 2548 | Linuron | Penoxsulam | Metazachlor |
| 2534 | Linuron | Diclosulam | Flucarbazone | 2549 | Linuron | Penoxsulam | Pinoxaden |
| 2535 | Linuron | Diclosulam | Sulfentrazone | 2550 | Linuron | Penoxsulam | Pyraflufen |

In an embodiment, the present invention provides an herbicidal combination comprising:
(a) bentazone or bentazone-sodium;
(b) pyraflufen; and
(c) a chlorophyll and heme biosynthesis inhibitor is selected from the group consisting of carfentrazone, amicarbazone, flucarbazone, sulfentrazone, bromacil, saflufenacil, flumioxazin, metazachlor, pinoxaden, and pyraflufen.

In an embodiment, the present invention provides an herbicidal combination comprising:
(a) bentazone or bentazone-sodium;
(b) diclosulam; and
(c) a chlorophyll and heme biosynthesis inhibitor is selected from the group consisting of carfentrazone, amicarbazone, flucarbazone, sulfentrazone, bromacil, saflufenacil, flumioxazin, metazachlor, pinoxaden, and pyraflufen.

In an embodiment, the present invention provides an herbicidal combination comprising:
(a) bentazone or bentazone-sodium;
(b) penoxsulam; and
(c) a chlorophyll and heme biosynthesis inhibitor is selected from the group consisting of carfentrazone, amicarbazone, flucarbazone, sulfentrazone, bromacil, saflufenacil, flumioxazin, metazachlor, pinoxaden, and pyraflufen.

In an embodiment, the present invention provides an herbicidal combination comprising:
(a) ametryn;
(b) sulfentrazone; and
(c) amicarbazone.

In an embodiment, the present invention provides an herbicidal composition comprising:
(a) ametryn;
(b) sulfentrazone;
(c) amicarbazone; and
(d) at least one agrochemically acceptable excipient.

In an embodiment, the present invention provides an herbicidal combination comprising:
(a) diuron;
(b) sulfentrazone; and
(c) amicarbazone.

In an embodiment, the present invention provides an herbicidal composition comprising:
(a) diuron;
(b) sulfentrazone;
(c) amicarbazone; and
(d) at least one agrochemically acceptable excipient.

In an embodiment, the present invention provides an herbicidal combination comprising:
(a) ametryn;
(b) halosulfuron-methyl; and
(c) amicarbazone.

In an embodiment, the present invention provides an herbicidal composition comprising:
(a) ametryn;
(b) halosulfuron-methyl;
(c) amicarbazone; and
(d) at least one agrochemically acceptable excipient.

In an embodiment, the present invention provides an herbicidal combination comprising:
(a) diuron;
(b) halosulfuron-methyl; and
(c) amicarbazone.

In an embodiment, the present invention provides an herbicidal composition comprising:
(a) diuron;
(b) halosulfuron-methyl;
(c) amicarbazone; and
(d) at least one agrochemically acceptable excipient.

In an embodiment, the present invention provides an herbicidal combination comprising:
(a) ametryn;
(b) imazapic; and
(c) amicarbazone.

In an embodiment, the present invention provides an herbicidal composition comprising:
(a) ametryn;
(b) imazapic;
(c) amicarbazone; and
(d) at least one agrochemically acceptable excipient.

In an embodiment, the present invention provides an herbicidal combination comprising:
(a) diuron;
(b) imazapic; and
(c) amicarbazone.

In an embodiment, the present invention provides an herbicidal composition comprising:
(a) diuron;
(b) imazapic;
(c) amicarbazone; and
(d) at least one agrochemically acceptable excipient.

In an embodiment, the present invention provides an herbicidal combination comprising:
(a) ametryn;
(b) trifloxysulfuron-sodium; and
(c) amicarbazone.

In an embodiment, the present invention provides an herbicidal composition comprising:
(a) ametryn;
(b) trifloxysulfuron-sodium;
(c) amicarbazone; and
(d) at least one agrochemically acceptable excipient.

In an embodiment, the present invention provides an herbicidal combination comprising:
(a) ametryn;
(b) indaziflam; and
(c) amicarbazone.

In an embodiment, the present invention provides an herbicidal composition comprising:
(a) ametryn;
(b) indaziflam;
(c) amicarbazone; and
(d) at least one agrochemically acceptable excipient.

In an embodiment, the present invention provides an herbicidal combination comprising:
(a) diuron;
(b) indaziflam; and
(c) amicarbazone.

In an embodiment, the present invention provides an herbicidal composition comprising:
(a) diuron;
(b) indaziflam;
(c) amicarbazone; and
(d) at least one agrochemically acceptable excipient.

In an embodiment, each individual row appearing in Table 1 below represents the combinations in an embodiment of the present invention.

In an embodiment, the present invention may provide a combination comprising the three herbicides as listed in each individual row from row 1 to row 2550 in Table 1.

In an embodiment, the present invention may provide a composition comprising the three herbicides as listed in each individual row from row 1 to row 2550 in the Table 1, and at least one agrochemically acceptable excipient.

These combinations may be applied to the locus of the weeds, in an herbicidally effective amount.

In an embodiment, the combination of the present invention may be combined with at least another active ingredient such as those selected from but not limited to herbicide, insecticide, fungicide, biological agent, plant growth activator, fertilizers, or combinations thereof.

Thus, in an embodiment, the combination of the present invention may be combined with another herbicide. Exemplary herbicides that may be combined with the combination of the present invention may be selected from but not limited to herbicides belonging to classes such as EPSP synthase inhibitors, synthetic auxins, auxin transport inhibitors, glutamate synthase inhibitors, HPPD inhibitors, lipid synthesis inhibitors, long chain fatty acid inhibitors, as well as herbicides with unknown modes of action.

In an embodiment, the total amount of photosystem II inhibitor in the composition may be in the range of 0.1 to 99% by weight, preferably 0.2 to 90% by weight.

In an embodiment, the total amount of ALS inhibitor in the composition may be in the range of 0.1 to 99% by weight.

In an embodiment, the total amount of chlorophyll and heme biosynthesis inhibitor in the composition may be in the range of 0.1 to 99% by weight.

In an embodiment, the constituent herbicides of the combination of the present invention may be admixed in ratio of (1-80):(1-80):(1-80) of the three herbicides respectively.

The herbicidal combination of the present invention maybe used to target weeds among the crops such corn, rice, wheat, barley, rye, oat, sorghum, cotton, soybean, peanut, buckwheat, beet, rapeseed, sunflower, sugar cane, tobacco, etc.; vegetables: solanaceous vegetables such as eggplant, tomato, pimento, pepper, potato, etc., cucurbit vegetables such as cucumber, pumpkin, zucchini, water melon, melon, squash, etc., cruciferous vegetables such as radish, white turnip, horseradish, kohlrabi, Chinese cabbage, cabbage, leaf mustard, broccoli, cauliflower, etc., asteraceous vegetables such as burdock, crown daisy, artichoke, lettuce, etc, liliaceous vegetables such as green onion, onion, garlic, and asparagus, ammiaceous vegetables such as carrot, parsley, celery, parsnip, etc., chenopodiaceous vegetables such as spinach, Swiss chard, etc., lamiaceous vegetables such as *Perilla frutescens*, mint, basil, etc, strawberry, sweet potato, *Dioscorea japonica, colocasia*, etc., flowers, foliage plants, turf grasses, fruits: pome fruits such apple, pear, quince, etc, stone fleshy fruits such as peach, plum, nectarine, *Prunus mume*, cherry fruit, apricot, prune, etc., citrus fruits such as orange, lemon, rime, grapefruit, etc., nuts such as chestnuts, walnuts, hazelnuts, almond, pistachio, cashew nuts, macadamia nuts, etc. berries such as blueberry, cranberry, blackberry, raspberry, etc., grape, kaki fruit, olive, plum, banana, coffee, date palm, coconuts, etc., trees other than fruit trees; tea, mulberry, flowering plant, trees such as ash, birch, dogwood, *Eucalyptus, Ginkgo biloba*, lilac, maple, *Quercus*, poplar, Judas tree, *Liquidambar formosana*, plane tree, *zelkova*, Japanese arborvitae, fir wood, hemlock, juniper, *Pinus, Picea*, and *Taxus* cuspidate, and the like.

In an embodiment, the composition of the present invention may contain agriculturally acceptable adjuvants, carriers, diluents, emulsifiers, fillers, anti-foaming agents, thickening agents, anti-freezing agents, freezing agents and the like. The compositions may be either solid or liquids. They can be solids, such as, for example, dusts, granules, water-dispersible granules, microcapsules or wettable powders, or liquids, such as, for example, emulsifiable concentrates, solutions, emulsions or suspensions, ZC formulations. They can also be provided as a pre-mix or tank mixed.

Exemplary agricultural adjuvants and carriers may include, but are not limited to, crop oil concentrates; methylated seed oils, emulsified methylated seed oil, nonylphenol ethoxylate; benzylcocoalkyldimethyl quaternary ammonium salt; blend of petroleum hydrocarbon, alkyl esters, organic acid, and anionic surfactant; C9-C11 alkylpolyglycoside; phosphated alcohol ethoxylate; natural primary alcohol (C12-C16) ethoxylate; di-sec-butylphenol EO-PO block copolymer; polysiloxane-methyl cap; nonylphenol ethoxylate, urea ammonium nitrate; tridecyl alcohol (synthetic) ethoxylate (8E0); tallow amine ethoxylate; PEG(400) dioleate-99, alkyl sulfates, such as diethanolammonium lauryl sulfate; alkylarylsulfonate salts, such as calcium dodecylbenzenesulfonate; alkylphenol-alkylene oxide addition products, such as nonylphenol-$C_{18}$ ethoxylate; alcohol-alkylene oxide addition products, such as tridecyl alcohol-$C_{16}$ ethoxylate; soaps, such as sodium stearate; alkyl-naphthalene-sulfonate salts, such as sodium dibutylnaphthalenesulfonate; dialkyl esters of sulfosuccinate salts, such as sodium di(2-ethylhexyl)sulfosuccinate; sorbitol esters, such as sorbitol oleate; quaternary amines, such as lauryl trimethylammonium chloride; polyethylene glycol esters of fatty acids, such as polyethylene glycol stearate; block copolymers of ethylene oxide and propylene oxide; salts of mono and dialkyl phosphate esters; vegetable or seed oils such as soybean oil, rapeseed/canola oil, olive oil, castor oil, sunflower seed oil, coconut oil, corn oil, cottonseed oil, linseed oil, palm oil, peanut oil, safflower oil, sesame oil, tung oil and the like; and esters of the above vegetable oils, and in certain embodiments, methyl esters.

Exemplary liquid carriers that may be employed in a composition of the present invention may include water or organic solvents. The organic solvents include, but are not limited to, petroleum fractions or hydrocarbons such as mineral oil, aromatic solvents, paraffinic oils, and the like; vegetable oils such as soybean oil, rapeseed oil, olive oil, castor oil, sunflower seed oil, coconut oil, corn oil, cottonseed oil, linseed oil, palm oil, peanut oil, safflower oil, sesame oil, tung oil and the like; esters of the above vegetable oils; esters of monoalcohols or dihydric, trihydric, or other lower polyalcohols (4-6 hydroxy containing), such as 2-ethyl hexyl stearate, n-butyl oleate, isopropyl myristate, propylene glycol dioleate, di-octyl succinate, di-butyl adipate, di-octyl phthalate and the like; esters of mono, di and polycarboxylic acids and the like. Organic solvents include, but are not limited to toluene, xylene, petroleum naphtha, crop oil, acetone, methyl ethyl ketone, cyclohexanone, trichloroethylene, perchloroethylene, ethyl acetate, amyl acetate, butyl acetate, propylene glycol monomethyl ether and diethylene glycol monomethyl ether, methyl alcohol, ethyl alcohol, isopropyl alcohol, amyl alcohol, ethylene glycol, propylene glycol, glycerine, N-methyl-2-pyrrolidinone, N,N-dimethyl alkylamides, dimethyl sulfoxide.

Solid carriers that may be employed in the compositions of the present invention may include but are not limited to attapulgite, pyrophyllite clay, silica, kaolin clay, kieselguhr, chalk, diatomaceous earth, lime, calcium carbonate, bentonite clay, Fuller's earth, talc, cottonseed hulls, wheat flour, soybean flour, pumice, wood flour, walnut shell flour, lignin, cellulose etc.

The target weeds may be selected from *Alopecurus myosuroides* Huds. (blackgrass, ALOMY), *Amaranthus palmeri* (Palmer amaranth, AMAPA) *Amaranthus viridis* (slender amaranth, AMAVI), *Avena fatua* (wild oat, AVEFA), *Brachiaria decumbens* Staff. or *Urochloa decumbens* (Stapp, *Brachiaria brizantha* or *Urochloa brizantha, Brachiaria platyphylla* (Groseb.) Nash or *Urochloa platyphylla* (broadleaf signalgrass, BRAPP), *Brachiaria plantaginea*. or *Urochloa plantaginea* (alexandergrass, BRAPL), *Cenchrus echinatus* (southern sandbur, CENEC), *Digitaria horizontalis* Willd. (Jamaican crabgrass, DIGHO), *Digitaria insularis* (sourgrass, TRCIN), *Digitaria sanguinalis* (large crabgrass, DIGSA), *Echinochloa crus-galli* (barnyardgrass, ECHCG), *Echinochloa colonum* (junglerice, ECHCO), *Eleusine indica* Gaertn. (goosegrass, ELEIN), *Lolium multiflorum* Lam. (Italian ryegrass, LOLMU), *Panicum dichotomiflorum* Michx. (fall *panicum*, PANDI), *Panicum miliaceum* L. (wild-proso millet, PANMI), *Sesbania exaltata* (hemp sesbania, SEBEX), *Setaria faberi* Herrm. (giant foxtail, SETFA), *Setaria viridis* (green foxtail, SETVI), *Sorghum halepense* (Johnsongrass, SORHA), *Sorghum bicolor*, Moench ssp., *Arundinaceum* (shattercane, SORVU), *Cyperus esculentus* (yellow nutsedge, CYPES), *Cyperus rotundus* (purple nutsedge, CYPRO), *Abutilon theophrasti* (velvetleaf, ABUTH), *Amaranthus* species (pigweeds and amaranths, AMASS), *Ambrosia artemisiifolia* L. (common ragweed, AMBEL), *Ambrosia psilostachya* DC. (western ragweed, AMBPS), *Ambrosia trifida* (giant ragweed, AMBTR), *Anoda cristata* (spurred *anoda*, ANVCR), *Asclepias syriaca* (common milkweed, ASCSY), *Bidens pilosa* (hairy beggarticks, BIDPI), Borreria species (BOISS), Borreria *alata* or Spermacoce *alata* Aubl. or Spermacoce *latifolia* (broadleaf buttonweed, BOILF), *Chenopodium album* L. (common lambsquarters, CHEAL), *Cirsium arvense* (Canada thistle, CIRAR), *Commelina benghalensis* (tropical spiderwort, COMBE), *Datura stramonium* (jimsonweed, DATST), *Daucus carota* (wild carrot, DAUCA), *Euphorbia heterophylla* (wild poinsettia, EPHHL), *Euphorbia hirta* or Chamaesyce *hirta* (garden spurge, EPHHI), *Euphorbia dentata* Michx. (toothed spurge, EPHDE), Erigeron *bonariensis* or *Conyza bonariensis* (hairy fleabane, ERIBO), Erigeron *canadensis* or *Conyza canadensis* (horseweed, ERICA), *Conyza sumatrensis* (tall fleabane, ERIFL), *Helianthus annuus* (common sunflower, HELAN), Jacquemontia tamnifolia (smallflower morningglory, IAQTA), *Ipomoea hederacea* (ivyleaf morningglory, IPOHE), *Ipomoea lacunosa* (white morningglory, IPOLA), *Lactuca serriola* (prickly lettuce, LACSE), *Portulaca oleracea* (common purslane, POROL), Richardia species (pusley, RCHSS), *Salsola tragus* (Russian thistle, SASKR), *Sida* species (*sida*, SIDSS), *Sida spinosa* (prickly *sida*, SIDSP), *Sinapis arvensis* (wild mustard, SINAR), *Solanum* ptychanthum (eastern black nightshade, SOLPT), Tridax *procumbens* (coat buttons, TRQPR), *Rumex dentatus* (RUMDE) or *Xanthium strumarium* (common cocklebur, XANST).

In an embodiment, the combinations of the present invention may be applied to the locus either simultaneously or sequentially, such that the three herbicides may be applied in a tank mix or as a pre-mixed composition.

Thus, in this aspect, the present invention provides a tank-mix combination comprising:
  (a) at least one photosystem II inhibitor selected from the group consisting of (i) a phenylcarbamate herbicide; (ii) a triazine herbicide; (iii) a triazinone herbicide; (iv) an uracil herbicide; (v) a benthiadiazole herbicide; (vi) a nitrile herbicide; and (vii) an urea herbicide;
  (b) at least one ALS inhibitor selected from the group consisting of (i) an imidazolinone herbicide; (ii) a sulfonylamino-carbonyltriazolinone herbicide; (iii) a sulfonylurea herbicide; (iv) a pyrazole herbicide; (v) a triazolpyramidine herbicide; and (vi) a triazolone herbicide; and
  (c) at least one chlorophyll and heme biosynthesis inhibitor herbicide.

In an embodiment, the present invention may be applied either pre or post emergent weed applications. The advantage of the combination is surprisingly good residual effects, when applied in pre-emergent as well as quick knockdown when applied post emergent leading to quick control of weeds. In another embodiment, the present invention may be applied for quick burndown of weeds. Another advantage is quick knockdown in the case of burndown.

The method of control of the present invention may be carried out by spraying the suggested tank mixes, or the individual herbicides may be formulated as a kit-of-parts containing various components that may be mixed as instructed prior to spraying.

In an embodiment, the present invention provides a kit-of-parts comprising a plurality of components, wherein said plurality of components comprises:
  (a) a first component comprising at least one photosystem II inhibitor selected from the group consisting of (i) a phenylcarbamate herbicide; (ii) a triazine herbicide; (iii) a triazinone herbicide; (iv) an uracil herbicide; (v) a benthiadiazole herbicide; (vi) a nitrile herbicide; and (vii) an urea herbicide;
  (b) a second component comprising at least one ALS inhibitor selected from the group consisting of (i) an imidazolinone herbicide; (ii) a sulfonylamino-carbonyltriazolinone herbicide; (iii) a sulfonylurea herbicide; (iv) a pyrazole herbicide; (v) a triazolpyramidine herbicide; and (vi) a triazolone herbicide; and
  (c) a third component comprising at least one chlorophyll and heme biosynthesis inhibitor herbicide.

In an embodiment, the kit-of-parts comprises an instructions manual, said instructions manual comprising instructions directing a user to admix the components before being used.

In an embodiment, the components of the present invention may be packaged such that the photosystem II inhibitor, the ALS inhibitor and the chlorophyll and heme biosynthesis inhibitor may be packaged separately and then tank mixed before the spraying.

In another embodiment, the components of the present invention may be packaged such that the photosystem II inhibitor, the ALS inhibitor and the chlorophyll and heme biosynthesis inhibitor may be packaged separately, whereas other additives are packaged separately, such that the two maybe tank mixed at the time of spraying.

In another embodiment, the components of the present invention may be packaged as composition such that the photosystem II inhibitor, the ALS inhibitor and the chlorophyll and heme biosynthesis inhibitor are formulated into one composition and other additives are packaged separately, such that the two maybe tank mixed at the time of spraying.

Surprisingly, it has been found by the present inventors, that the photosystem II inhibitor, the ALS inhibitor and the chlorophyll and heme biosynthesis inhibitor of the present invention, when applied individually, was ineffective in the control of weeds, but demonstrated excellent synergistic control on when applied together. The combination controlled the weed both pre and post emergently. As will be demonstrated by the examples, the combination of clodinafop propargyl, the first herbicide and the second herbicide synergistically controlled broadleaf as well as grasses and sedges at a locus. The current invention therefore provides advantageous methods of controlling weeds both pre and post emergently. The present method also provides a broader spectrum of controlling weeds that helps in resistance management, thus preventing the weed from becoming resistant to either of the herbicides while providing a broader spectrum of control at lower use rates.

It was also found that bentazon alone did not provide sufficient weed control of yellow nutsedge. The addition of halosulfuron to sulfentrazone antagonized initial yellow nutsedge control compared to sulfentrazone alone; thereby, requiring a second application to achieve>90% control. In an aspect, the combinations described herein can provide>90% weed control after a single application.

It was surprisingly also found that the presence of an ALS inhibitor safened the herbicidal effect of the combination of a photosystem II inhibitor, and a chlorophyll and heme biosynthesis inhibitor. Therefore, the combination of the present invention was a non-phytotoxic combination providing a synergistic weed control.

The invention is illustrated by the following non-limiting examples.

EXAMPLES

An exemplary combination according to the invention was used for sedge and broadleaf weed control for agricultural crops, turf, ornamentals, and landscape. The exemplary combination was used for the post-emergence control of sedges, as well as the control/suppression of various broadleaf and grassy weeds.

A field trial was conducted to evaluate the effectiveness of the combinations of three active ingredients according to the invention when used post emergence, at different rates, compared to industry standards—stand alone and 2 way mixture of compounds for efficacy of yellow nutsedge. The active ingredient combination used in the trial was bentazon+halosulfuron+sulfentrazone. The trial was conducted in Blacksburg, Va. and was initiated on June 6 under Protocol #BRLM-62-US-VA-18-10-BTC. The plots were in fallow area primarily covered with yellow nutsedge and tall fescue, and were sprayed at 4 week intervals. (2 applications total). The application dosages of the herbicides, when used in isolation and when used in the combinations were as follows:

TABLE 2

| S No. | Combination | Concentration used | Formulation type | Rate |
|---|---|---|---|---|
| 1 | Bentazon | 4 lb/gal | L | 0.375 oz ai/1000 sq ft |
| 2 | Sulfentrazone | 4.16 lb/gal | L | 0.048 oz ai/1000 sq ft |
| 3 | Halosulfuron-methyl | 75% | SC | 0.024 oz ai/1000 sq ft |
| 4 | Bentazon + Halosulfuron-methyl + Sulfentrazone | 4 lb/gal + 75% SC + 4.16 lb/gal | L | 0.125 + 0.008 + 0.016 oz ai/1000 sq ft |

The following results were noted from these trials:

TABLE 3

| | | | Yellow nut sedge at 29 DAT (Percentage Control) | | |
|---|---|---|---|---|---|
| S No. | Herbicide used | Dosage | 13/06 | 20/6 | 05/07 |
| 1 | Untreated | — | 0 | 0 | 0 |
| 2 | Bentazone | 1X | 65 | 75 | 76 |
| 3 | Sulfentrazone | 1X | 58 | 73 | 75 |
| 4 | Halosulfuron | 1X | 36 | 60 | 81 |
| 5 | Bentazone + Sulfentrazone | 0.5X | 61 | 65 | 49 |
| 6 | Bentazone + Halosulfuron | 0.5X | 50 | 73 | 84 |
| 7 | Sulfentrazone + Halosulfuron | 0.5X | 48 | 65 | 85 |
| 8 | Bentazone + Sulfentrazone + Halosulfuron | 0.33X | 56 | 74 | 90 |

The percentage weed cover in these treatment trials were observed and tabulated as hereunder:

TABLE 4

| | | | Yellow nut sedge at 29 DAT (Percentage weed cover) | | |
|---|---|---|---|---|---|
| S No. | Herbicide used | Dosage | 13/06 | 20/6 | 05/07 |
| 1 | Untreated | — | 50 | 49 | 59 |
| 2 | Bentazone | 1X | 40 | 8 | 10 |
| 3 | Sulfentrazone | 1X | 44 | 11 | 9 |
| 4 | Halosulfuron | 1X | 50 | 16 | 8 |
| 5 | Bentazone + Sulfentrazone | 0.5X | 43 | 16 | 21 |
| 6 | Bentazone + Halosulfuron | 0.5X | 38 | 10 | 5 |
| 7 | Sulfentrazone + Halosulfuron | 0.5X | 50 | 14 | 6 |
| 8 | Bentazone + Sulfentrazone + Halosulfuron | 0.33X | 53 | 7 | 3 |

It was thus found that the combination of Halosulfuron, Bentazon and Sulfentrazone at each rate, provided superior control of yellow nutsedge compared to each individual product and 2 way mixes. In an aspect, the three-part combinations described herein provide improved weed control, measured for example as burn down and/or residual control, compared to any combination of 2 of the components. A clear rate response with the three-way combination was seen from low to high application rates. The three-way combination provided faster burn down and longer residual control. The use of this three way combination, with three different modes of action, helped provide resistance management and superior weed control Without wishing to be bound by theory, the present inventors believe that there were several ways to suppress, but not fully control, the primary varieties of plants from the sedge family. Bentazon and sulfentrazone provided fairly rapid burn down of some of the sedges, while halosulfuron had a delayed response of up to four weeks before plant necrosis began to take place. As a result, multiple sprays were required throughout the growing season to provide adequate control.

Surprisingly, the combinations of the present invention provided quick suppression/control of the sedges, broadleaves and grassy weeds and allowed for longer residual control. The use of the three herbicidal components of the present invention having three different modes of action prevented sedges, broadleaves and grassy weeds to mature into a reproductive state. In an aspect, a single application of the combinations described herein provides effective weed control for an entire growing season.

The use of the terms "a" and "an" and "the" and similar referents (especially in the context of the following claims) are to be construed to cover both the singular and the plural, unless otherwise indicated herein or clearly contradicted by context. The terms first, second etc. as used herein are not meant to denote any particular ordering, but simply for convenience to denote a plurality of, for example, layers. The terms "comprising", "having", "including", and "containing" are to be construed as open-ended terms (i.e., meaning "including, but not limited to") unless otherwise noted. Recitation of ranges of values are merely intended to serve as a shorthand method of referring individually to each separate value falling within the range, unless otherwise indicated herein, and each separate value is incorporated into the specification as if it were individually recited herein. The endpoints of all ranges are included within the range and independently combinable. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. An herbicidal active ingredient combination consisting of bentazon, sulfentrazone, and halosulfuron.

2. A kit-of-parts comprising a plurality of components, wherein said plurality of components comprises an active ingredient combination consisting of:
   (a) bentazon;
   (b) sulfentrazone; and
   (c) halosulfuron wherein the kit-of-parts is free of other herbicidal active ingredients.

3. A method of controlling yellow nutsedge weeds at a locus, said method comprising applying to the locus the herbicidal active ingredient combination of claim 1.

4. A composition comprising the herbicidal active ingredient combination of claim 1 and at least one agrochemically acceptable excipient.

* * * * *